United States Patent [19]

Uram

[11] 4,010,605
[45] Mar. 8, 1977

[54] ACCURATE, STABLE AND HIGHLY RESPONSIVE GAS TURBINE STARTUP SPEED CONTROL WITH FIXED TIME ACCELERATION ESPECIALLY USEFUL IN COMBINED CYCLE ELECTRIC POWER PLANTS

[75] Inventor: Robert Uram, East Pittsburgh, Pa.
[73] Assignee: Westinghouse Electric Corporation, Pittsburgh, Pa.
[22] Filed: Aug. 8, 1974
[21] Appl. No.: 495,729
[52] U.S. Cl. .................. 60/39.14; 60/39.18 B; 60/39.28 R
[51] Int. Cl.² .......................... F02C 7/26
[58] Field of Search ..... 60/39.14, 39.28 R, 39.28 T

[56] References Cited
UNITED STATES PATENTS

| | | | |
|---|---|---|---|
| 3,382,671 | 5/1968 | Ehni | 60/39.28 R |
| 3,421,317 | 1/1969 | Bedford | 60/39.28 R |
| 3,422,619 | 1/1969 | Hendricks | 60/39.28 R |
| 3,422,800 | 1/1969 | La Haye | 60/39.28 R |
| 3,469,395 | 9/1969 | Spitsbergen | 60/39.28 R |
| 3,686,859 | 8/1972 | White | 60/39.28 T |
| 3,691,759 | 9/1972 | Scheerer | 60/39.14 X |
| 3,797,233 | 3/1974 | Webb | 60/39.28 R |
| 3,834,361 | 9/1974 | Keely | 60/39.28 R |

Primary Examiner—Clarence R. Gordon
Attorney, Agent, or Firm—E. F. Possessky

[57] ABSTRACT

A combined cycle electric power plant includes gas and steam turbines and steam generators and a digital-/analog control system. An automatic digital portion of the control system includes a speed control which generates a speed error from the actual turbine speed and a turbine speed reference, and a proportional plus integral controller acts on the speed error to generate a fuel reference for the gas turbine fuel valve position controls after ignition and during wide range speed control. A speed reference generator includes a stored representation of speed as a function of time with zero time made equal to the point in time at which the flame goes on. The speed versus time characterization is made up of three linear parts having different slopes. Fixed time acceleration is achieved by causing the speed reference to increase to the synchronous value in accordance with the characterization over the fixed time period and by operating the turbine with the speed control so that the actual turbine speed quickly and accurately follows the speed reference. If a speed hold or speed runback occurs during startup acceleration, the speed reference characterization can be adjusted to provide partial or full makeup of time lost during the hold or runback.

30 Claims, 47 Drawing Figures

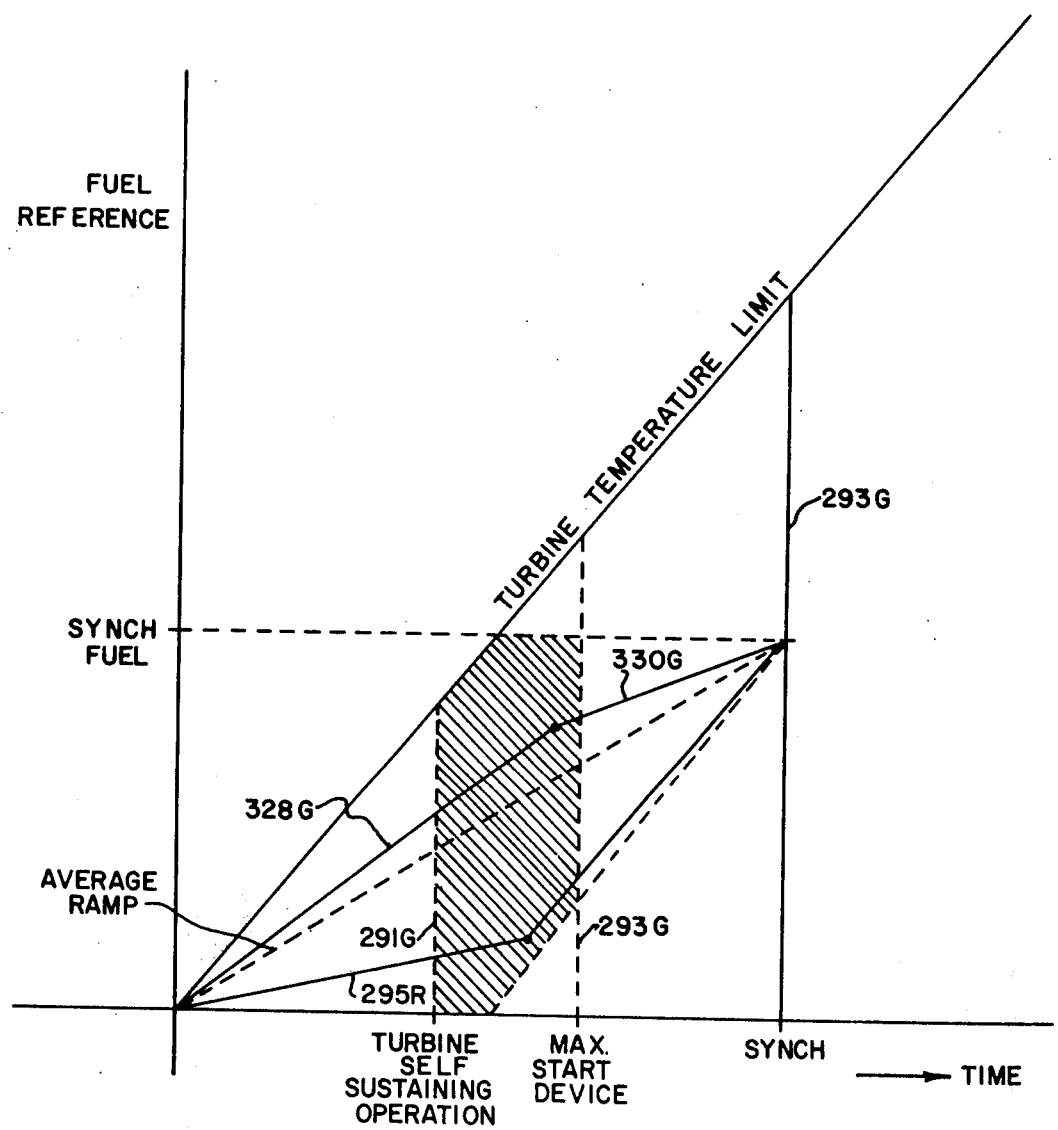

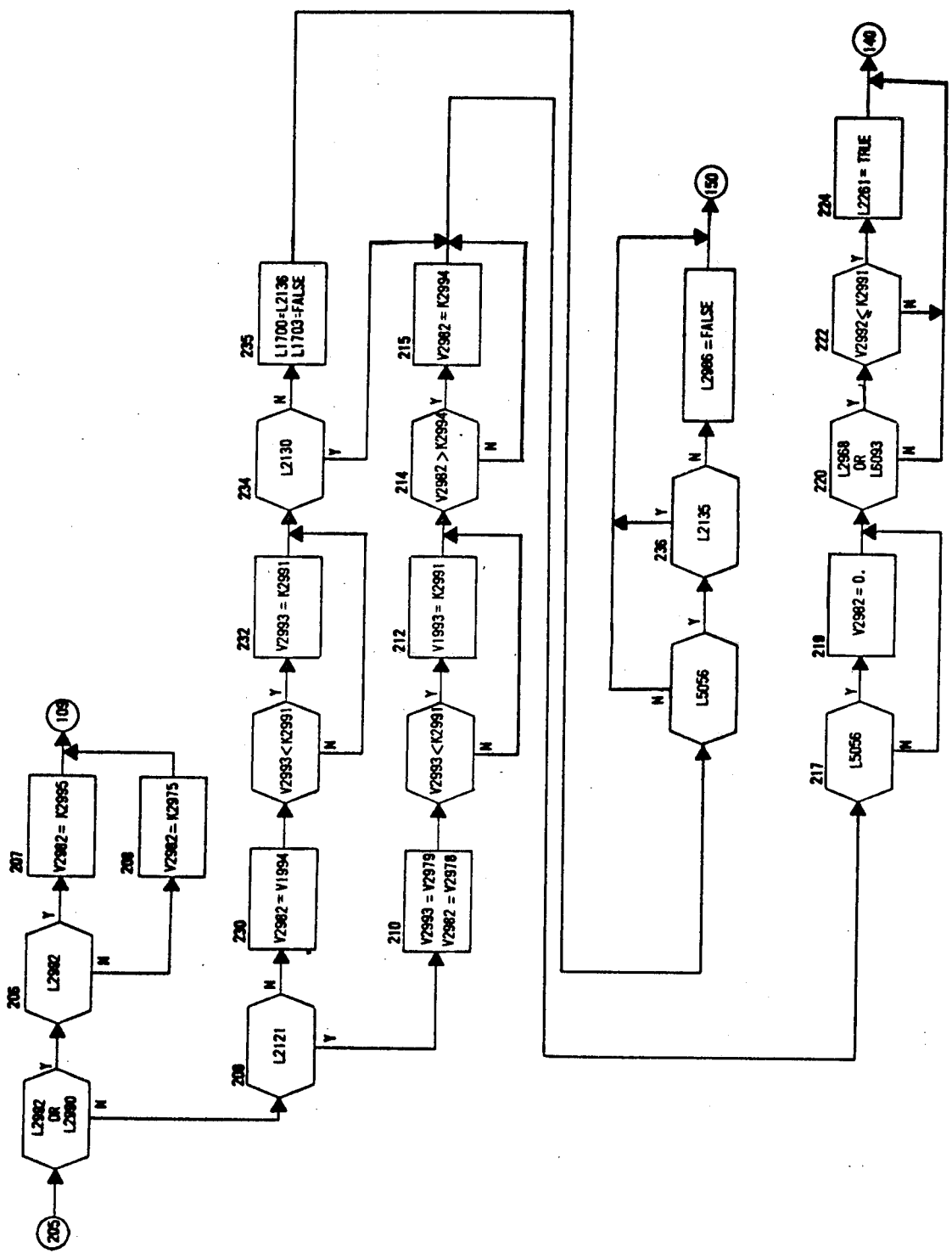
FIG.8A2

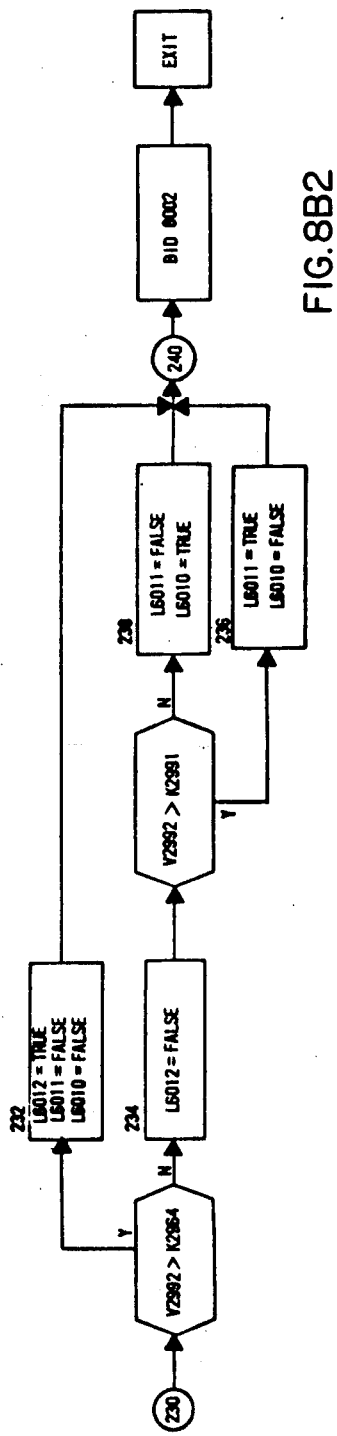
FIG. 8B2

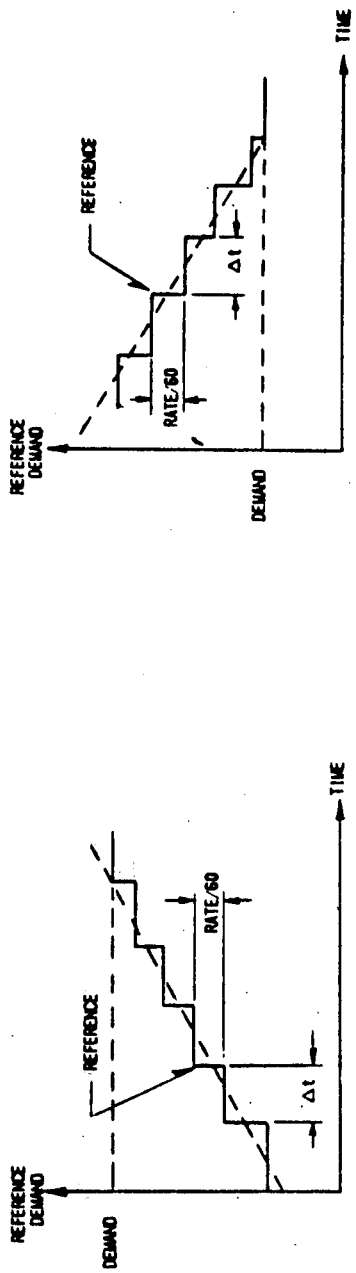
FIG.8E1
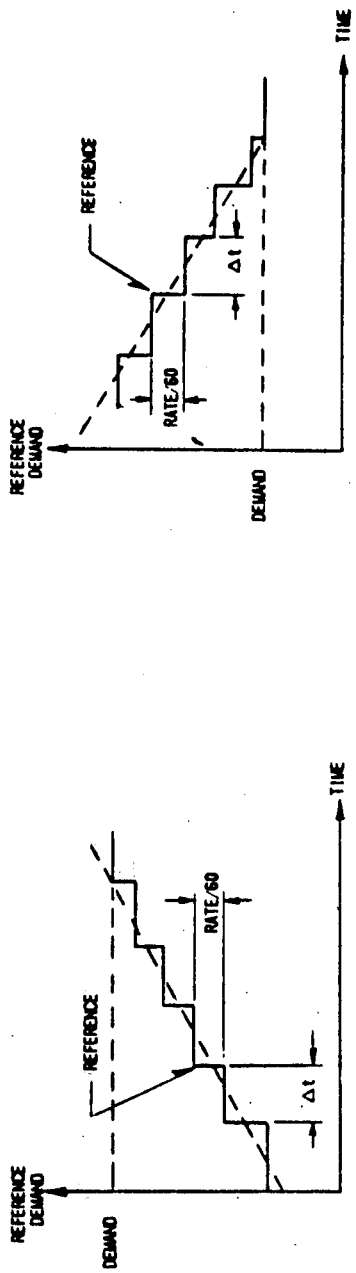
FIG.8E2
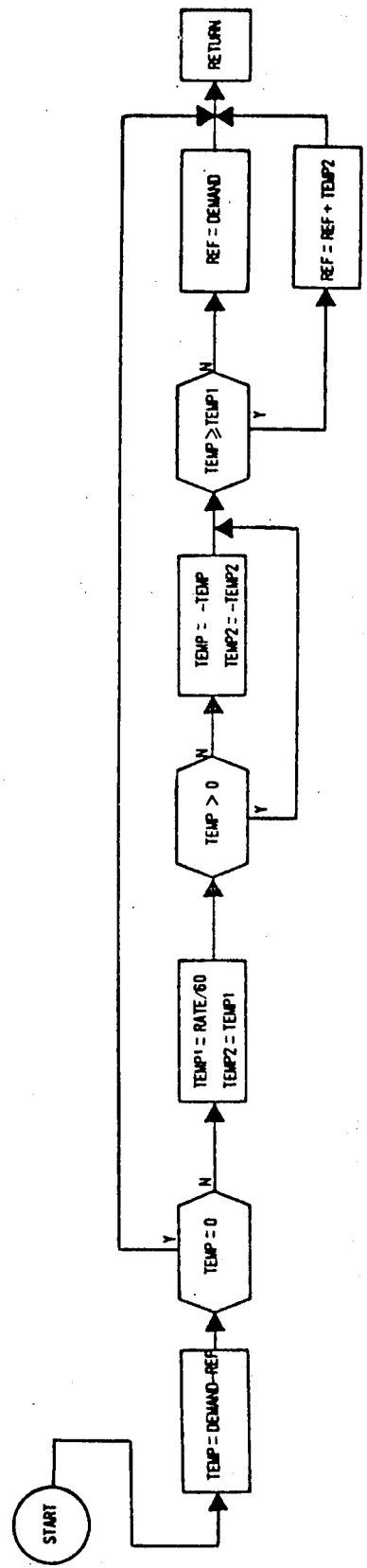
FIG.8E3

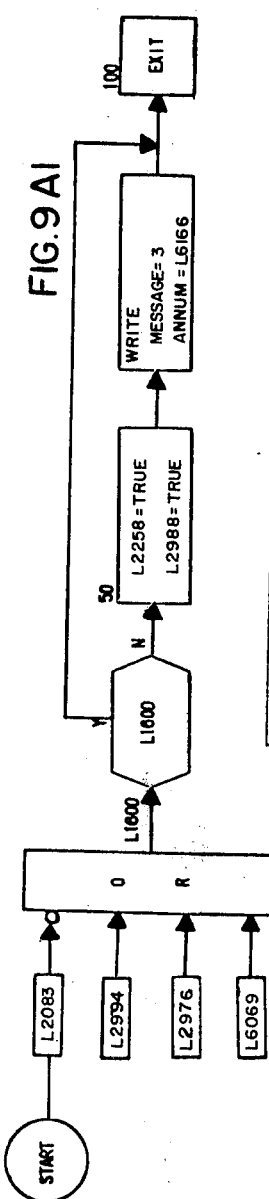
FIG.9 A1
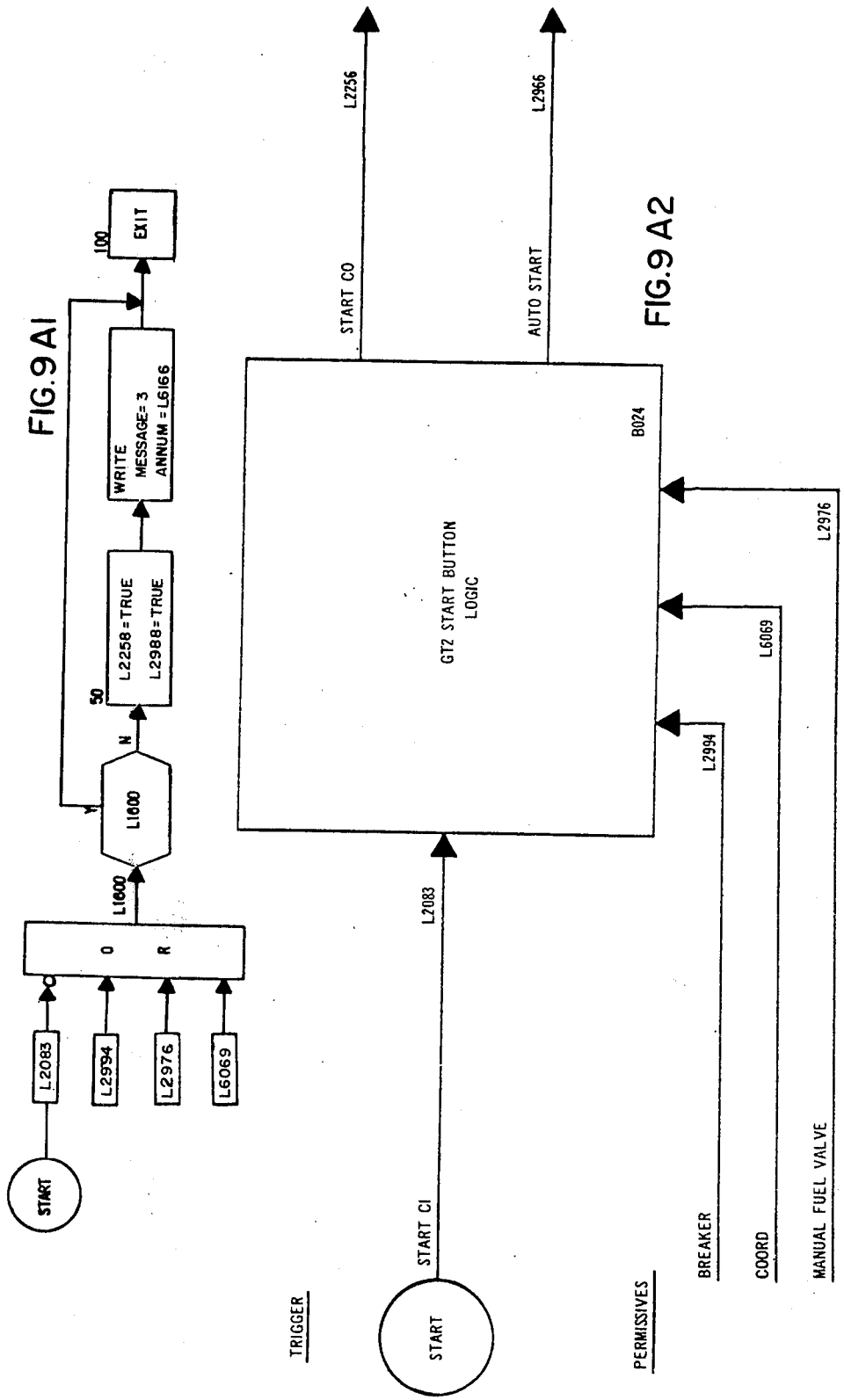
FIG.9 A2

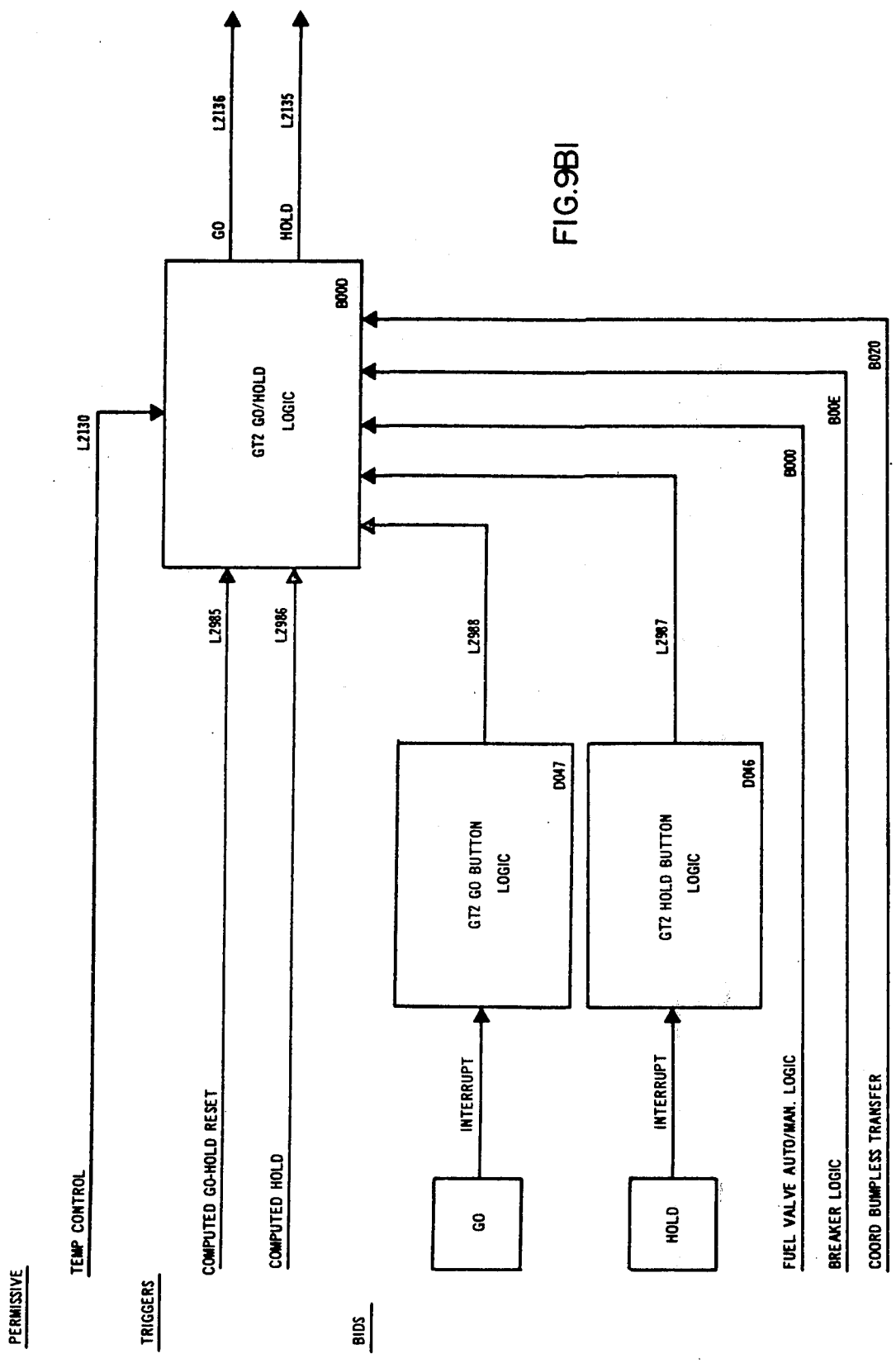
FIG.9B1

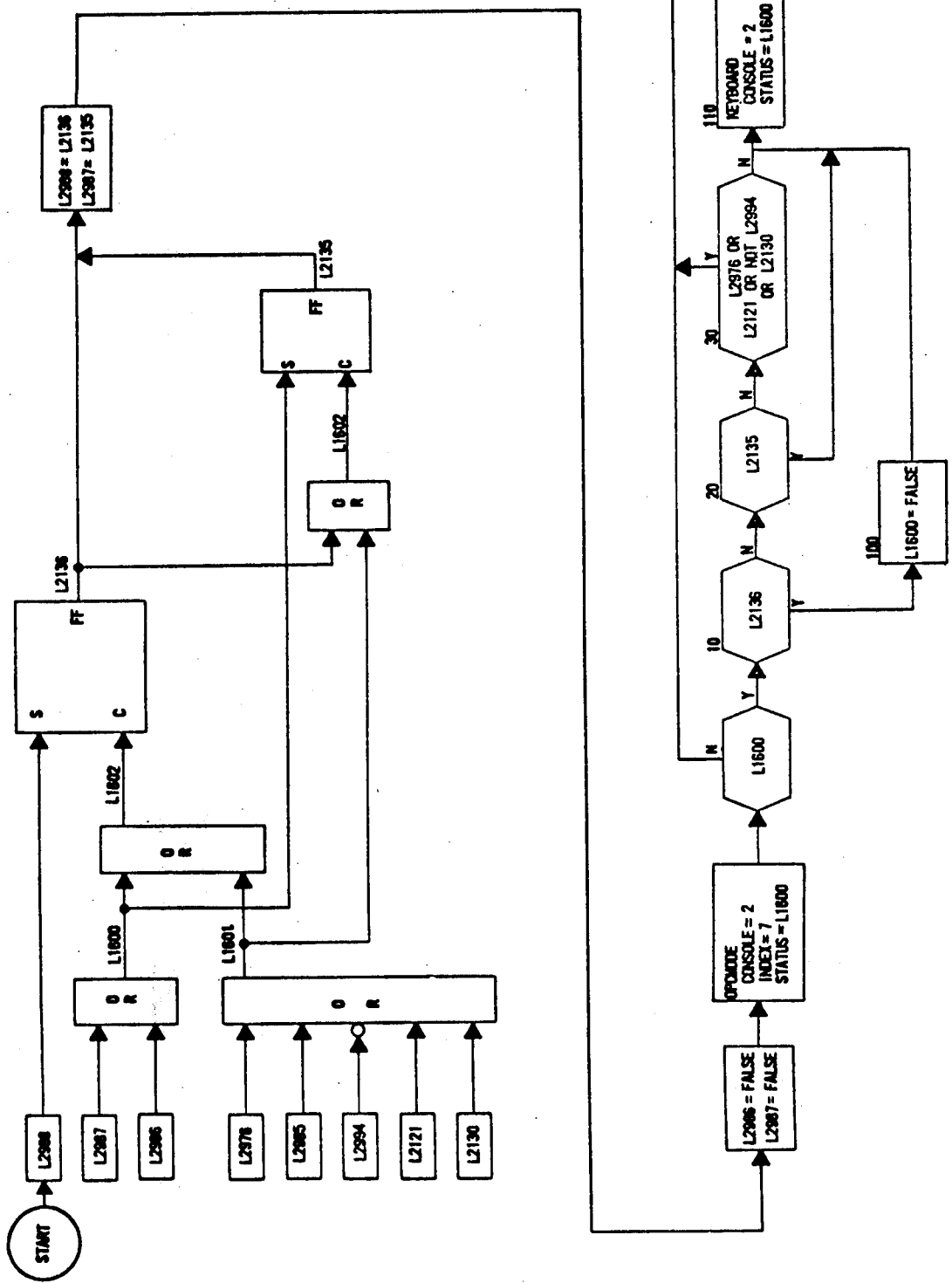
FIG.9B2

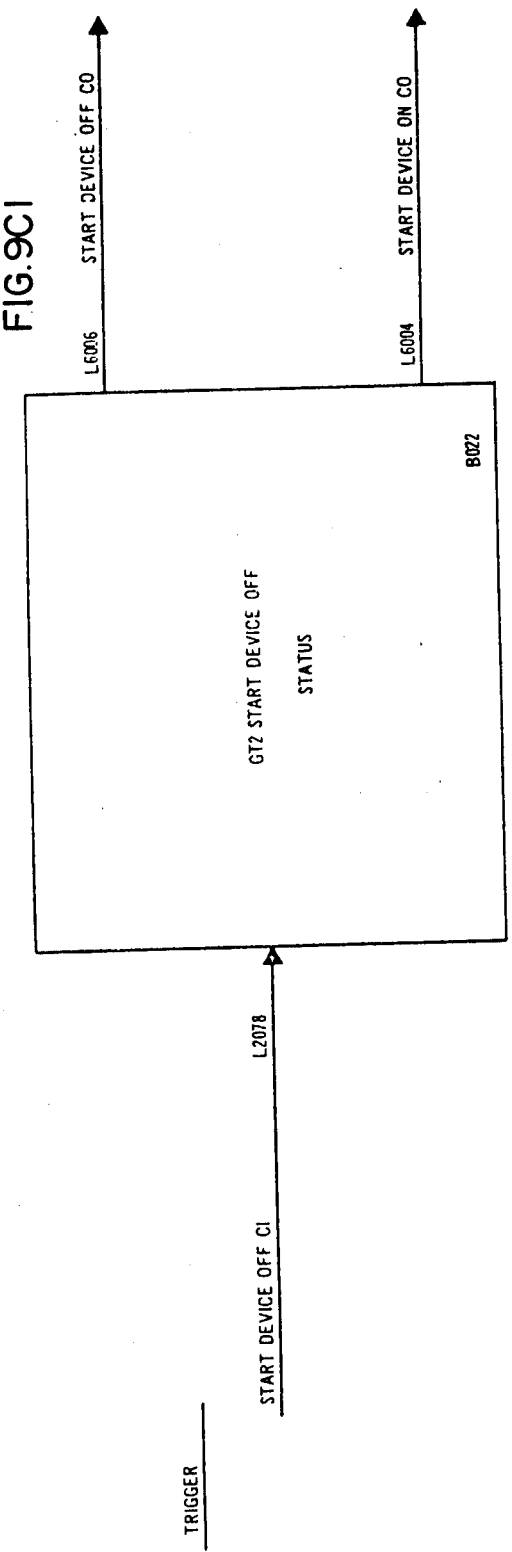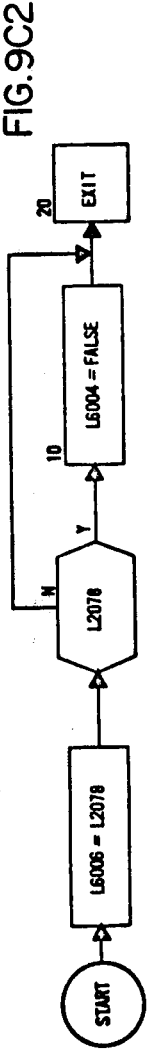

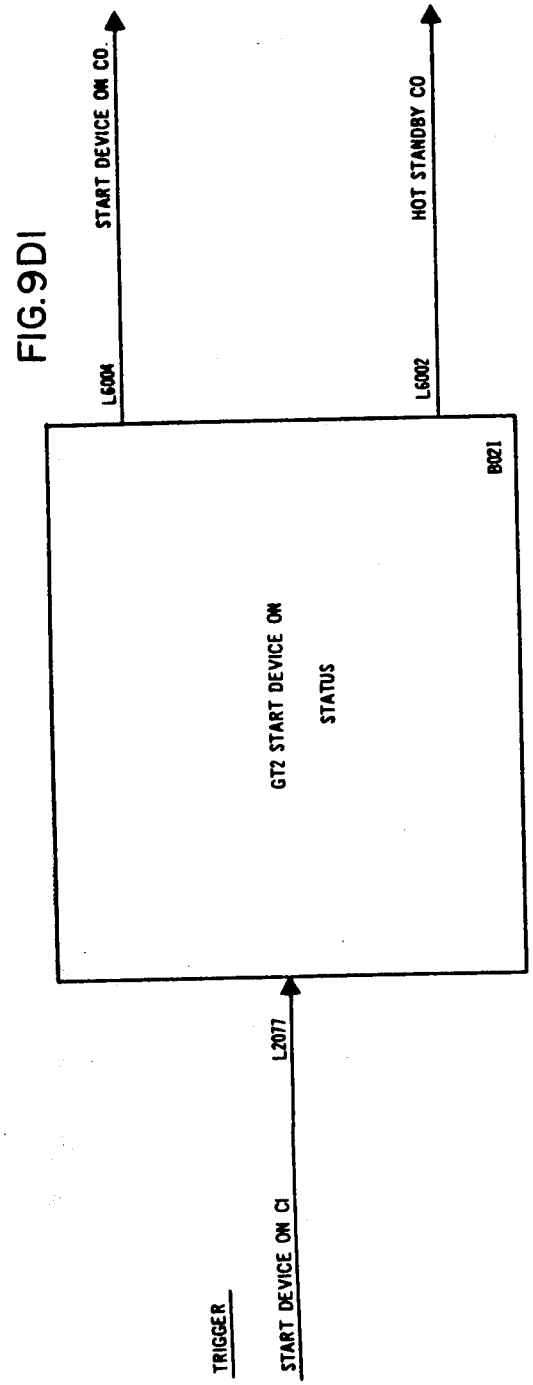
FIG.9D1
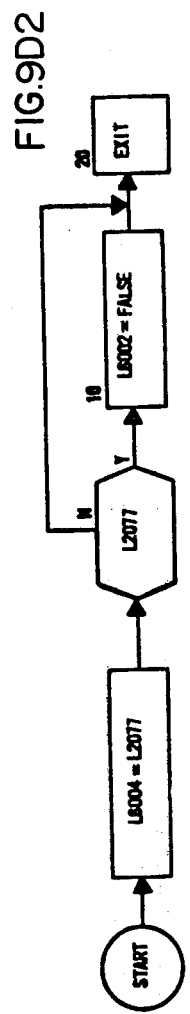
FIG.9D2

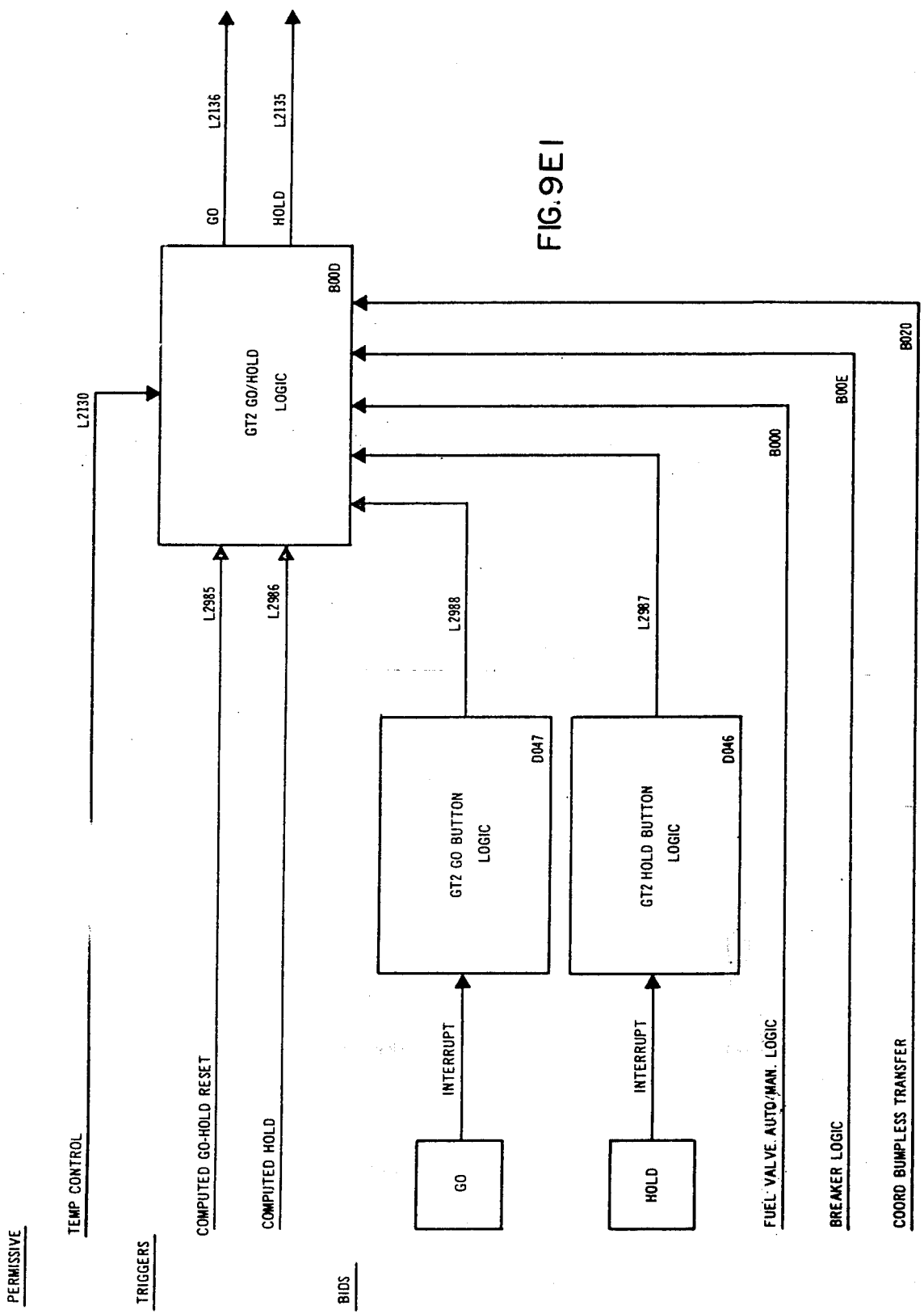

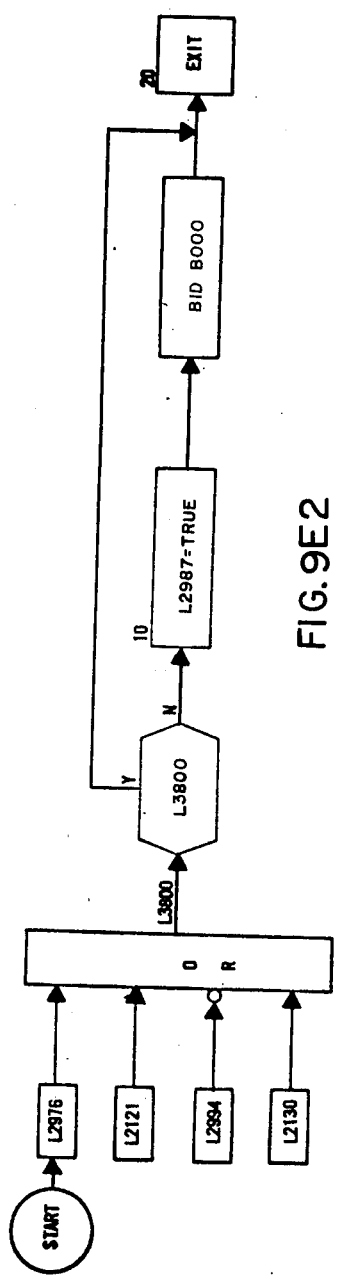
FIG.9E2

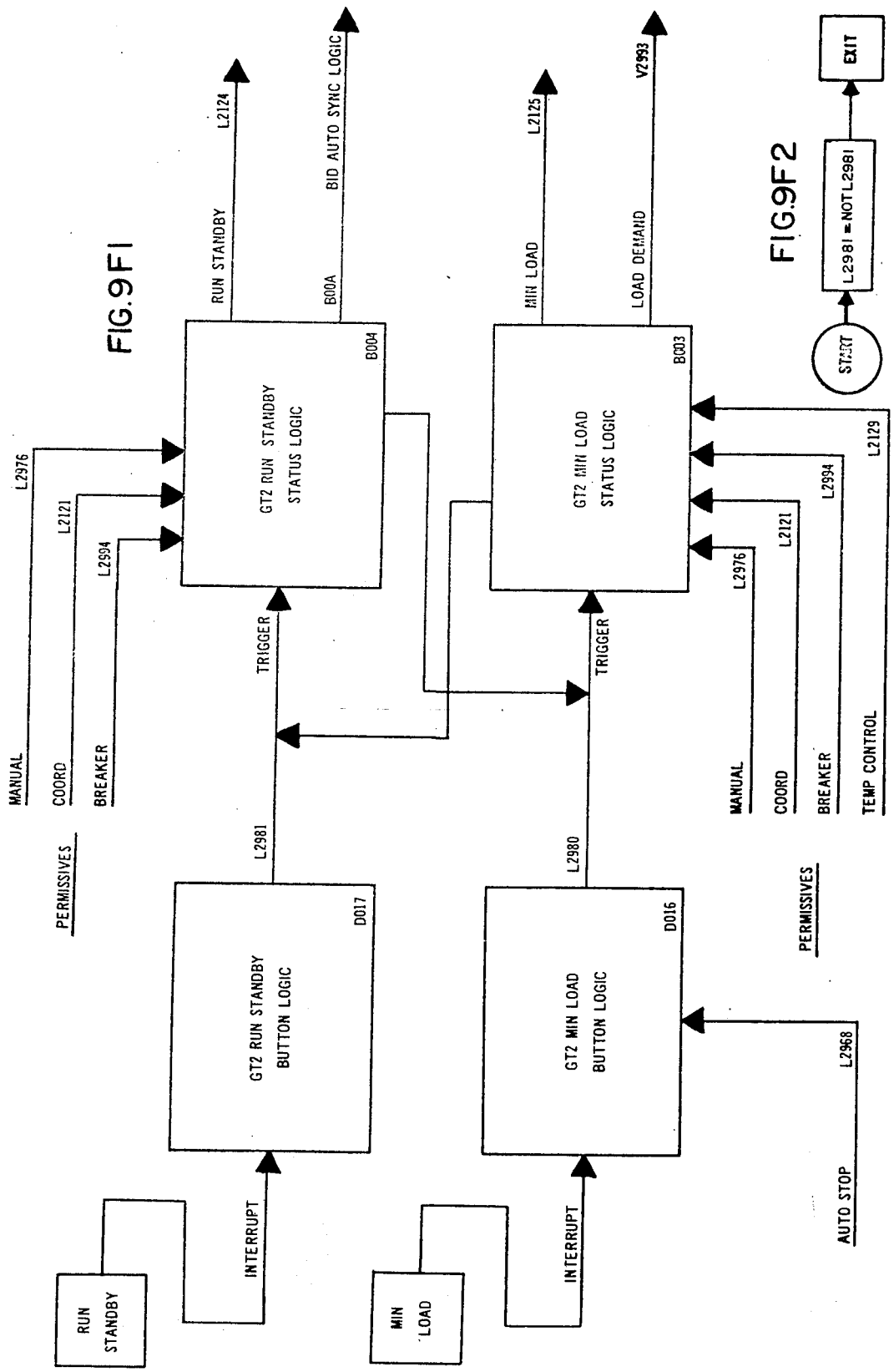

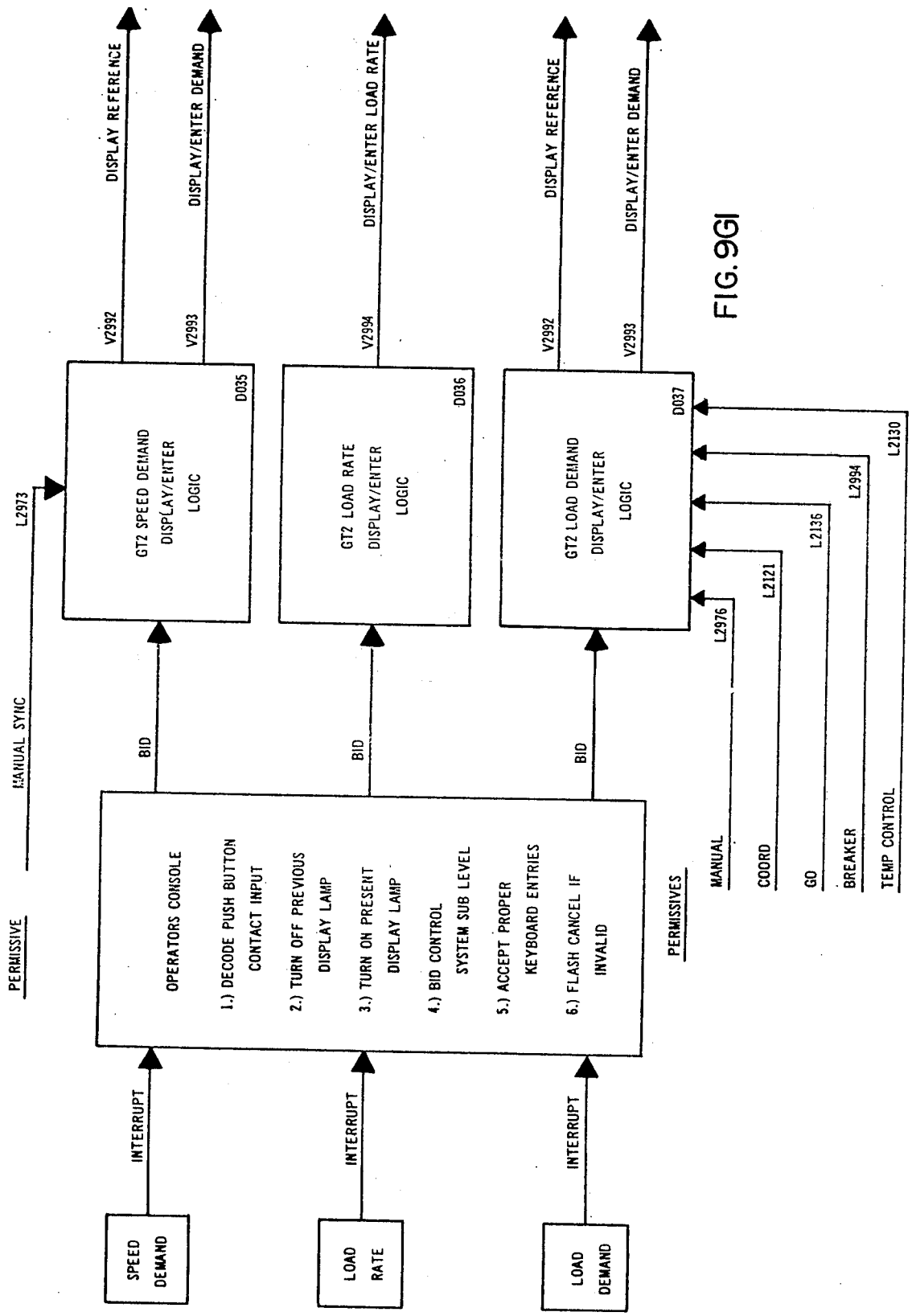

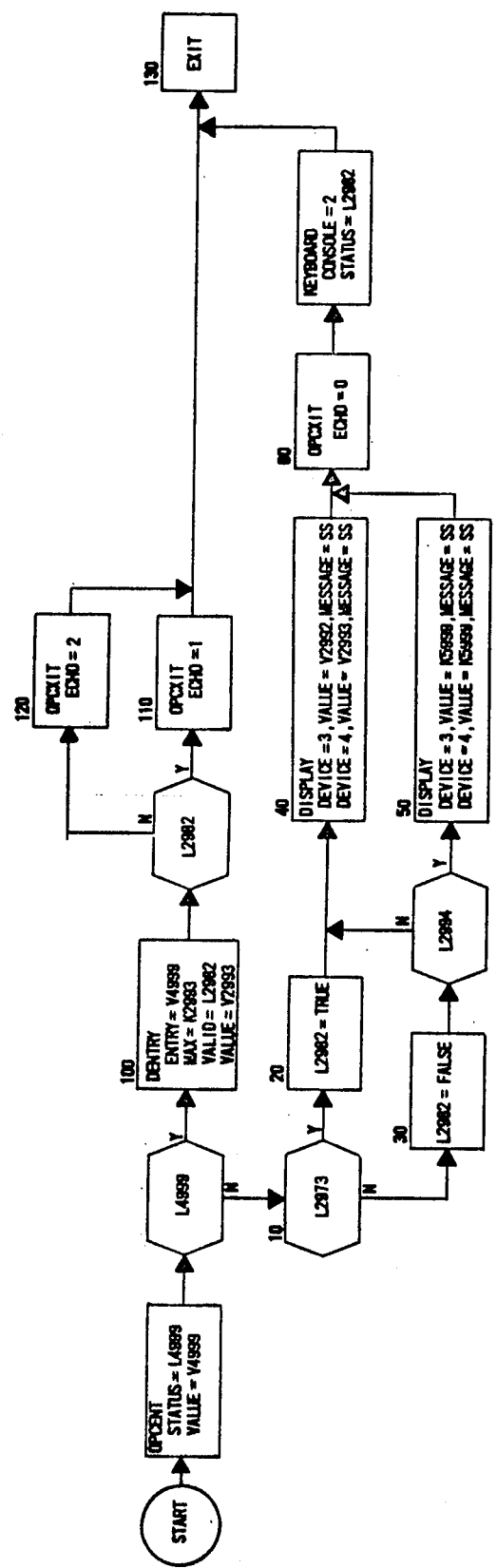
FIG.9G2

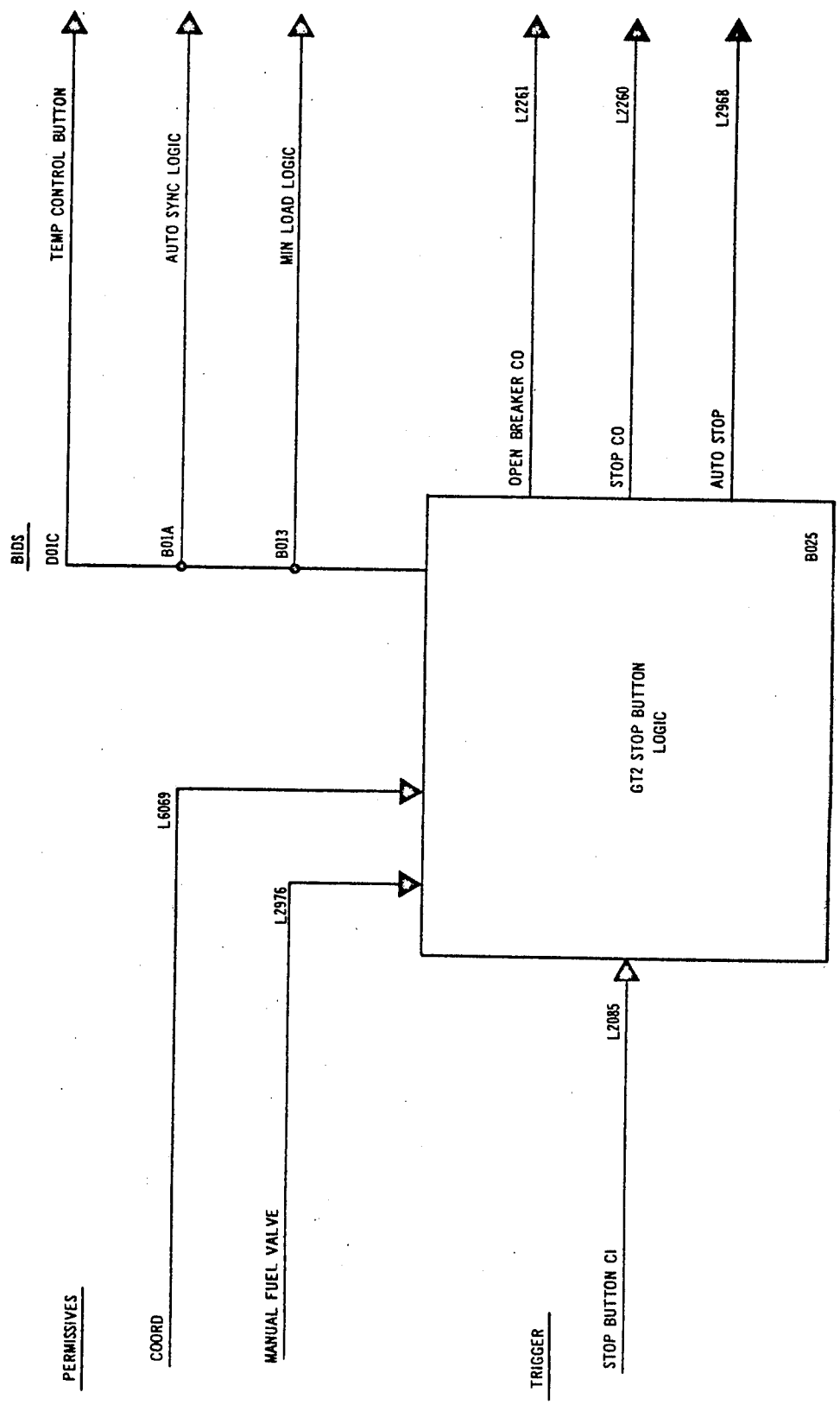
FIG.9H1

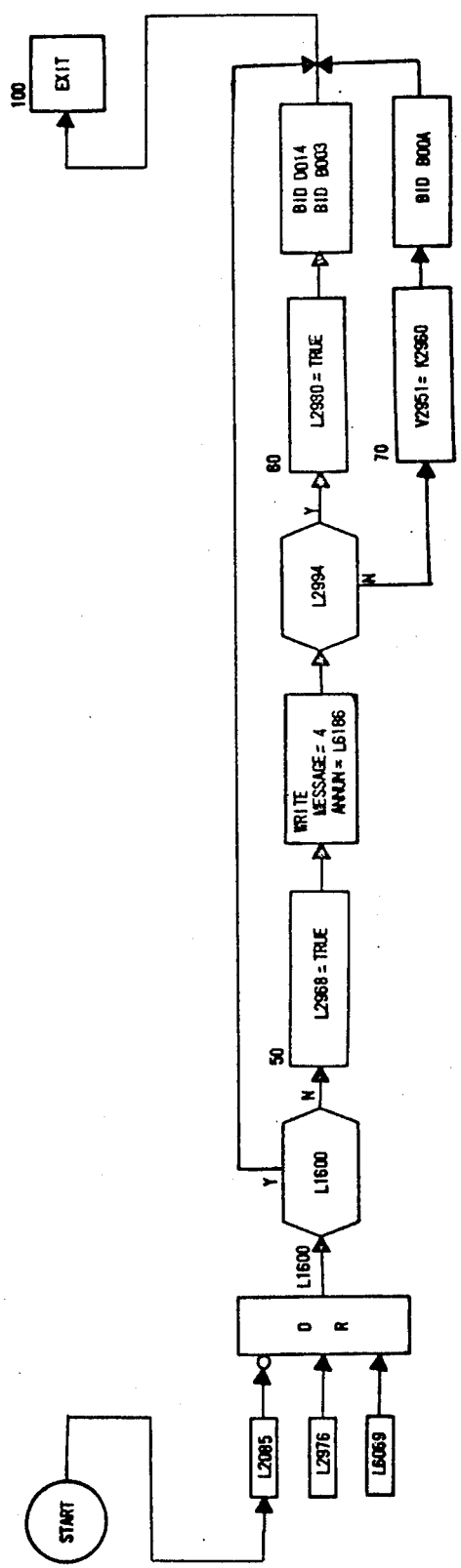
FIG.9H2

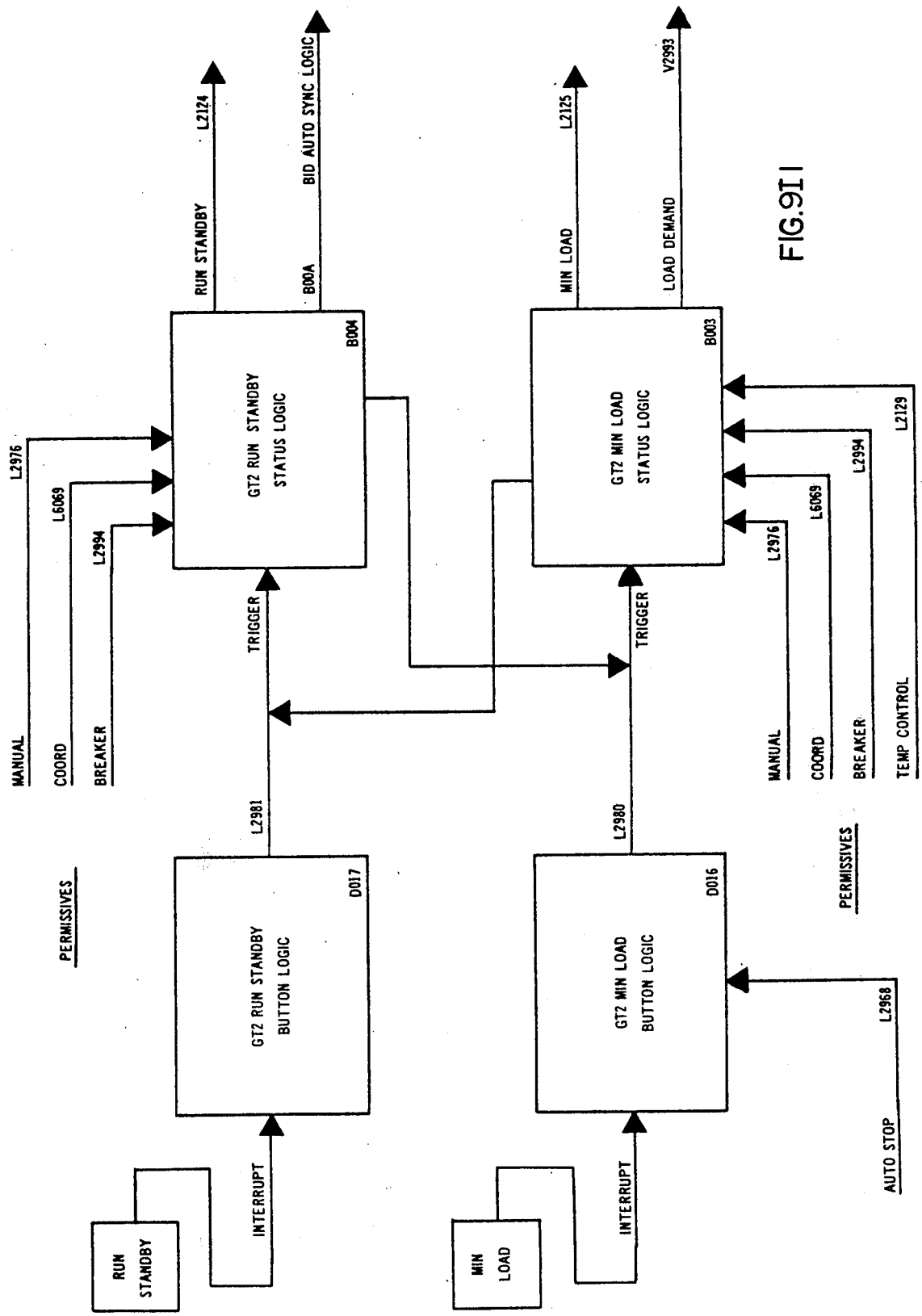
FIG.9I1

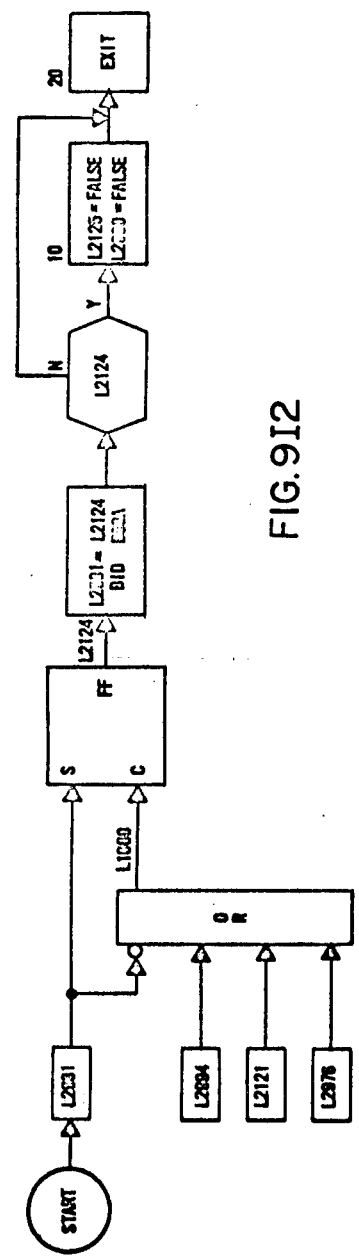
FIG.9I2

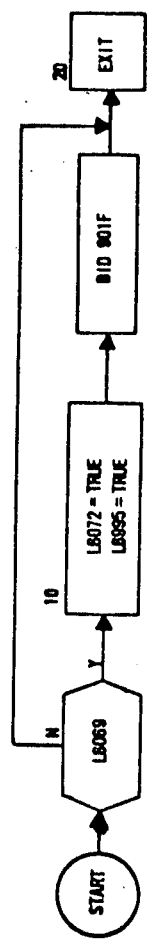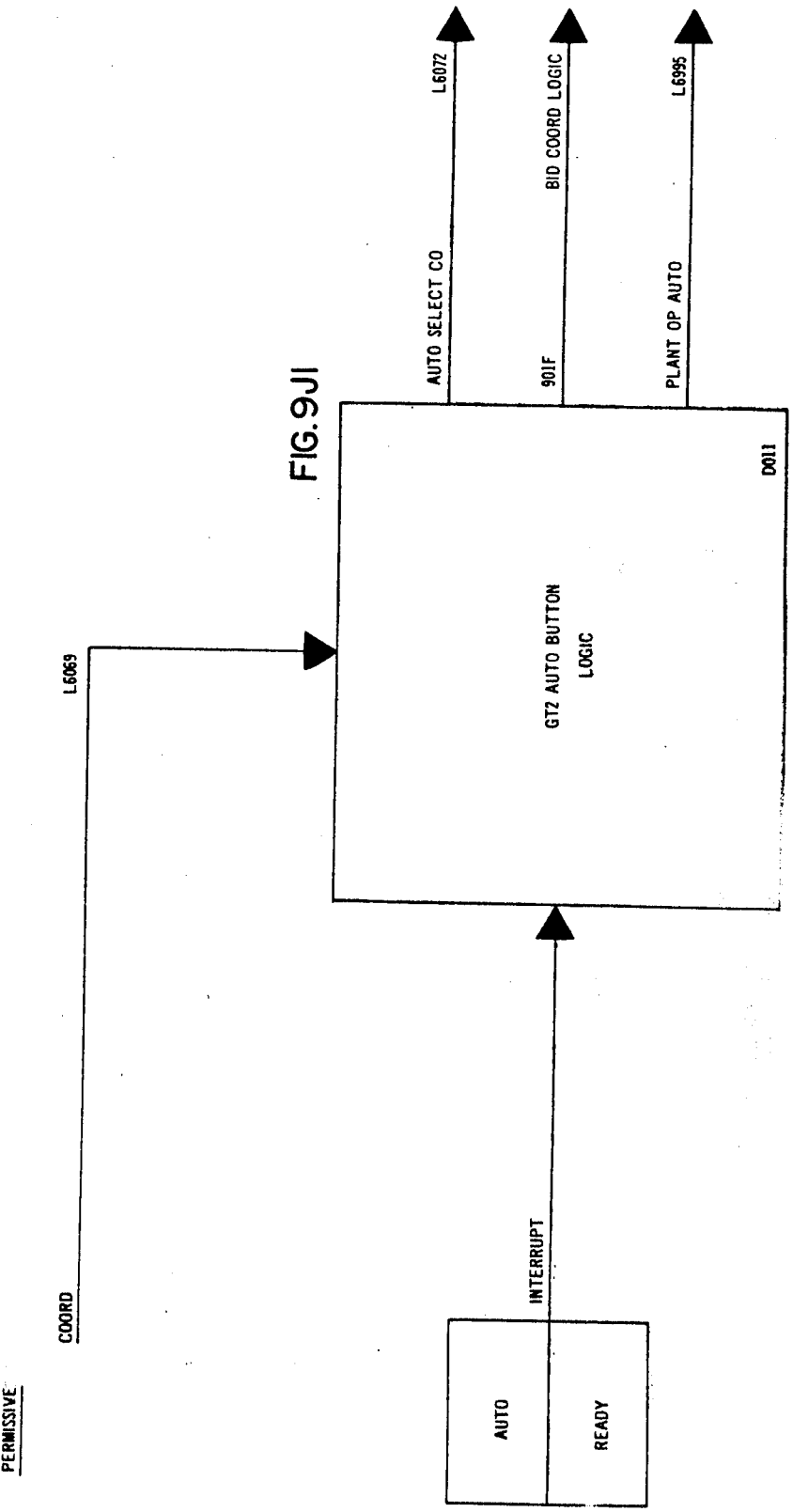

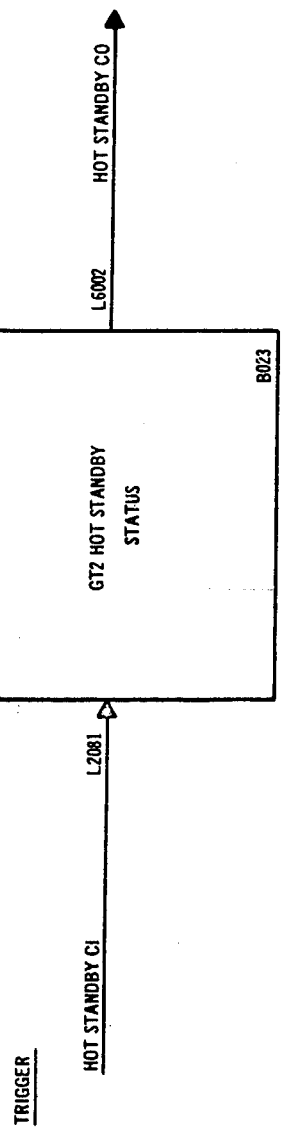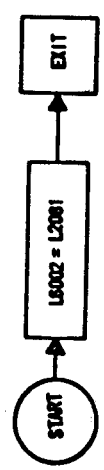

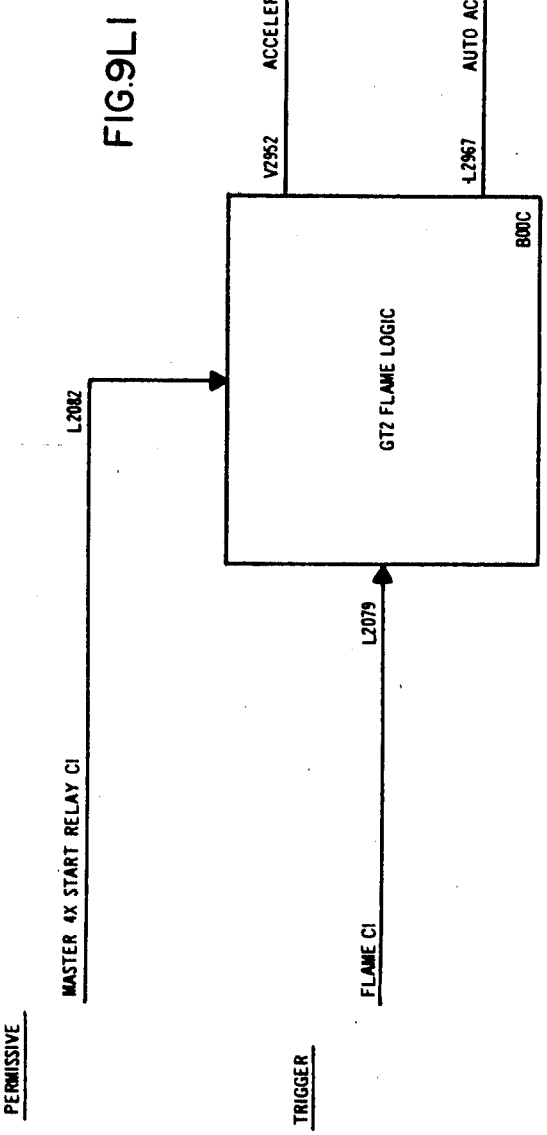
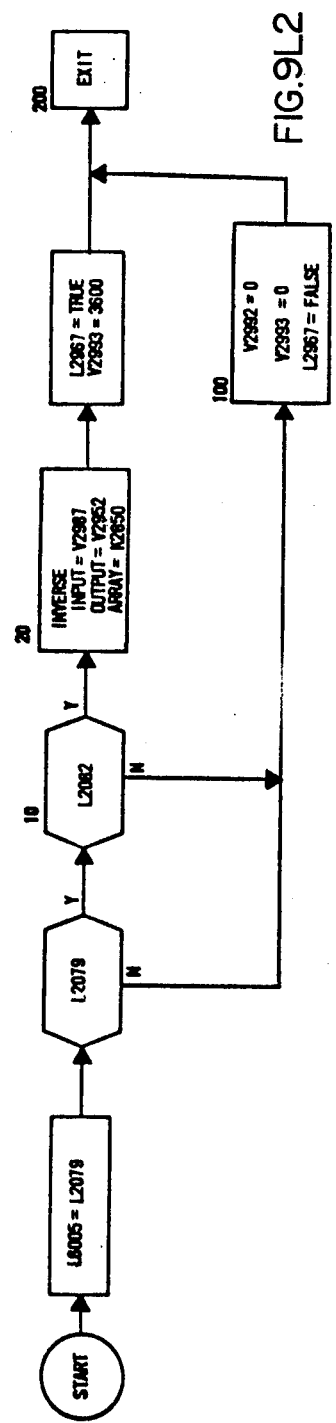
FIG.9L1
FIG.9L2

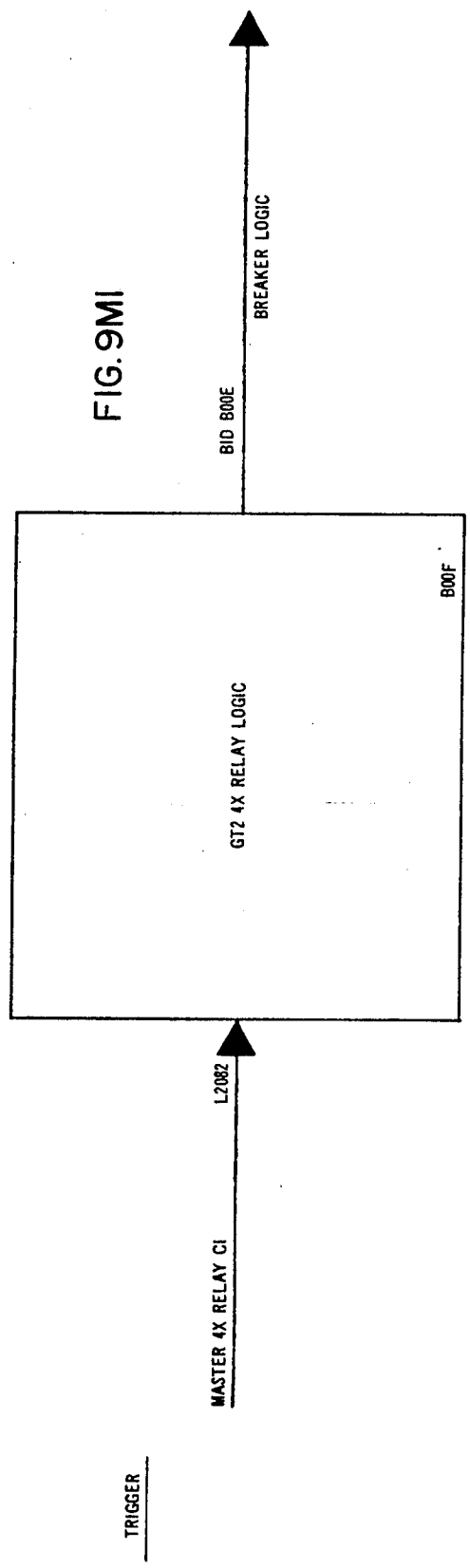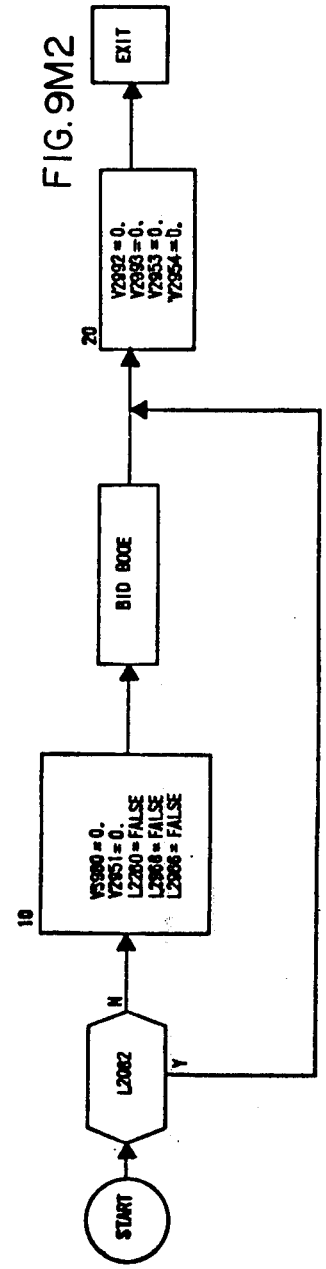

ACCURATE, STABLE AND HIGHLY RESPONSIVE GAS TURBINE STARTUP SPEED CONTROL WITH FIXED TIME ACCELERATION ESPECIALLY USEFUL IN COMBINED CYCLE ELECTRIC POWER PLANTS

CROSS-REFERENCE TO RELATED APPLICATIONS

Reference is made to the following patent applications:

1. Ser. No. 399,790, filed on Sept. 1973 by L. F. Martz, R. W. Kiscaden and R. Uram, entitled "An Improved Gas Turbine And Steam Turbine Combined Cycle Electric Power Generating Plant Having A Coordinated And Hybridized Control System And An Improved Factory Based Method For Making And Testing Combined Cycle And Other Power Plants And Control Systems Therefore," assigned to the present assignee and hereby incorporated by reference.

2. Ser. No. 319,114, filed by T. Giras and J. Reuther on Dec. 29, 1972 as a continuation of an earlier filed application Ser. No. 082,470, entitled "An Improved System And Method For Operating Industrial Gas Turbine Apparatus And Gas Turbine Electric Power Plants Preferably With A Digital Computer Control System" and assigned to the present assignee, and related cases referred to therein.

3. Ser. No. 371,625, filed on June 20, 1973 by R. Yannone and R. A. Shields, entitled "Gas Turbine Power Plant Control Apparatus Having A Multiple Backup Control System," and assigned to the present assignee, and related cases referred to therein.

4. Ser. No. 495,765 filed concurrently herewith by Lyle F. Martz and Richard J. Plotnick, now U.S. Pat. No. 3,953,966 entitled "Combined Cycle Electric Power Plant Having A Control System Which Enables Dry Steam Generator Operation During Gas Turbine Operation," assigned to the present assignee and hereby incorporated by reference.

5. Ser. No. 495,700, filed concurrently herewith by T. J. Reed and J. R. Smith now U.S. Pat. No. 3,943,372 entitled "A Combined Cycle Electric Power Plant And A Gas Turbine Having An Improved Startup Control Especially Useful In A Backup Control System" and assigned to the present assignee.

BACKGROUND OF THE INVENTION

The present invention relates to improved speed controls which provide fixed time acceleration of gas turbines and more particularly to combined cycle electric power plants in which gas turbines are operated with improved fixed time acceleration.

A gas turbine that is used for electric power generation is typically started with a diesel engine or other starting device. When the turbine reaches the ignition speed which may be 20% of synchronous speed, lightoff occurs and the starting device continues to drive the turbine until it reaches a self-sustaining speed which may be 60% of synchronous speed. Thereafter, the turbine is accelerated to synchronous speed and synchronization is performed under automatic or operator control. In combined cycle and other electric power plant applications, it is important that startup occur rapidly without unnecessary foreshortening of turbine life and that the plant availability be highly rated because of the reliability with which turbine startup can be expected to occur.

Various types of startup control have been employed for electric power gas turbines with various types of hardware technologies including relay-pneumatic, analog electropneumatic, and digital/analog electropneumatic. With respect to the different types of controls, it has been common to start a gas turbine with a temperature control loop, i.e. the turbine is caused to accelerate to synchronous speed at a rate allowed by an exhaust temperature limit and in some cases with a surge limit override. Faster startups are permitted on cold days with temperature limit startup control.

In U.S. Loft Pat. No. 3,520,133, an automatic startup control is disclosed in which analog electronic and pneumatic hardware is employed and in which a feedforward startup control is employed with temperature and acceleration limit control. In the Loft patent, the startup control is a part of the primary control system.

Further, in Ser. No. 408,962 entitled "System And Method For Starting, Synchronizing And Operating A Steam Turbine With Digital Computer Control" filed by T. Giras et al on Oct. 23, 1973 as a continuation of an earlier filed patent application and assigned to the present assignee, there is disclosed a steam turbine digital/analog control system in which a digital speed control is provided for steam valve operation. That speed control includes an integrating controller which generates a control output in response to a speed error. However, the speed control does not provide fixed time turbine acceleration and otherwise is directed to steam turbine operation.

Fixed time gas turbine acceleration is desirable generally to provide better predictability in the gas turbine and power plant operation and to make the startup time substantially independent of ambient temperature. In a digital computer/analog hybrid control set forth in a copending and coassigned patent application Ser. No. 252,131, fixed time gas turbine startup is disclosed in which a speed reference is digitally generated and applied to a speed control loop so that startup occurs in a fixed time even though day-to-day ambient temperature variations occur.

In general, the prior hybrid control provides fixed acceleration time startup with the employment of an acceleration control, i.e. a speed reference is generated with a change rate that depends on the present time and the time still available to reach synchronous speed. The present application is directed to another arrangement which achieves fixed time acceleration and which can be more desirable to users or manufacturers than the prior hybrid control in various applications.

The description of prior art herein is made on good faith and no representation is made that any prior art considered is the best pertaining prior art nor that the interpretation placed on it is unrebuttable.

SUMMARY OF THE INVENTION

A combined cycle electric power plant includes a gas turbine and a gas turbine control system having an automatic startup speed control. The speed control includes means for generating a speed error in response to the difference between the actual turbine speed and a speed reference and a controller which preferably provides proportional plus integral action on the speed error to generate an output for turbine fuel control. Means are provided for generating the fuel reference as a function of time such that the turbine normally is accelerated from ignition speed to synchronous speed in a fixed time interval.

BRIEF DESCRIPTION OF THE DRAWINGS

FIGS. 9A–9M show functional block diagrams and flow charts for various logic chains employed in the system.

DESCRIPTION OF THE PREFERRED EMBODIMENT

A. GENERAL PLANT DESCRIPTION

Figure 1:
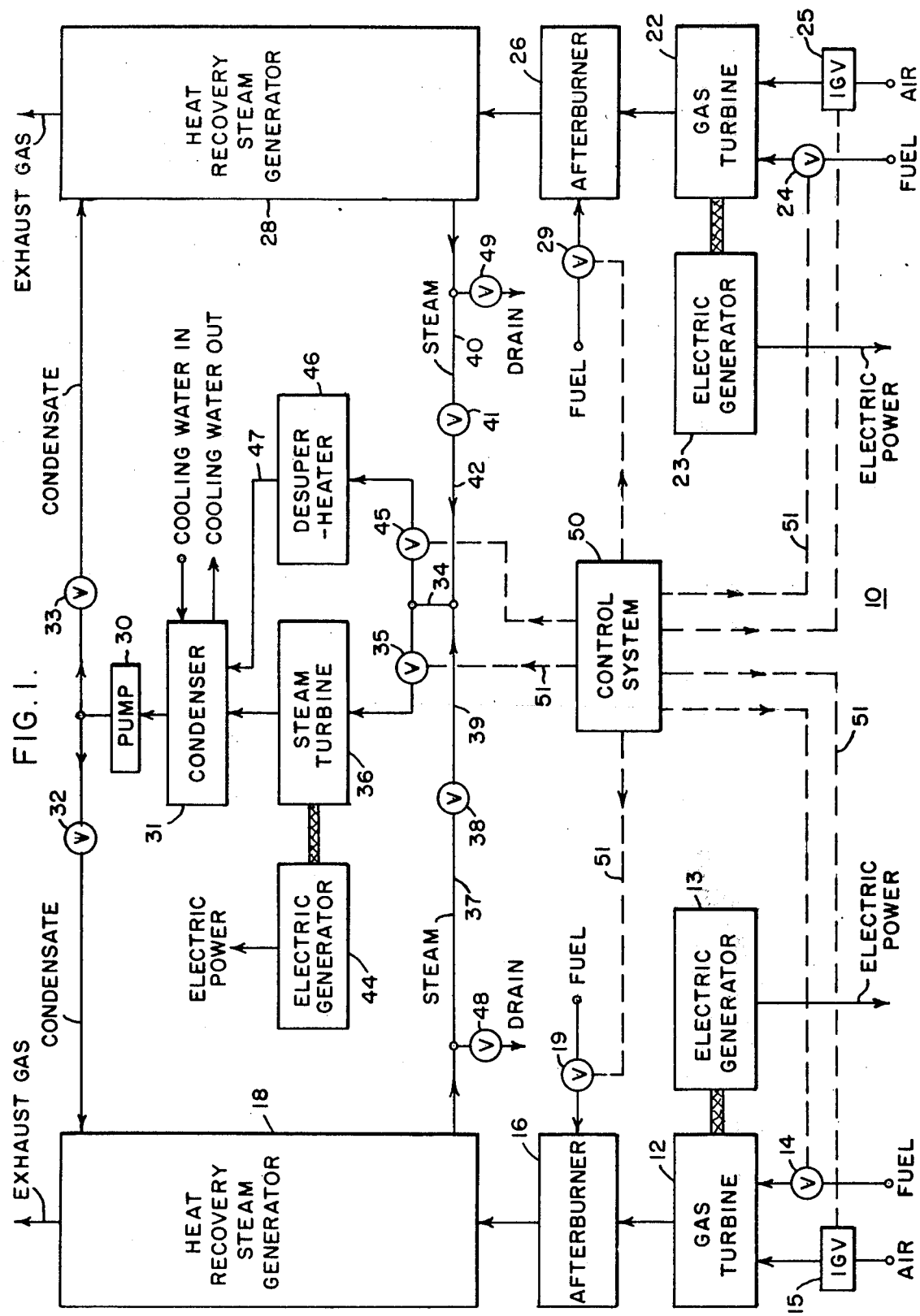
FIG. 1 shows a schematic view of a combined cycle electric power plant in which there is employed a gas turbine in accordance with the principles of the invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of fuel control valve or throttle valve 29. The primary heat source for the steam generator 28 is the gas turbine 22, the afterbuner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent stream leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensation flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate and initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

B. GAS TURBINE MECHANICAL STRUCTURE

Figure 2A:
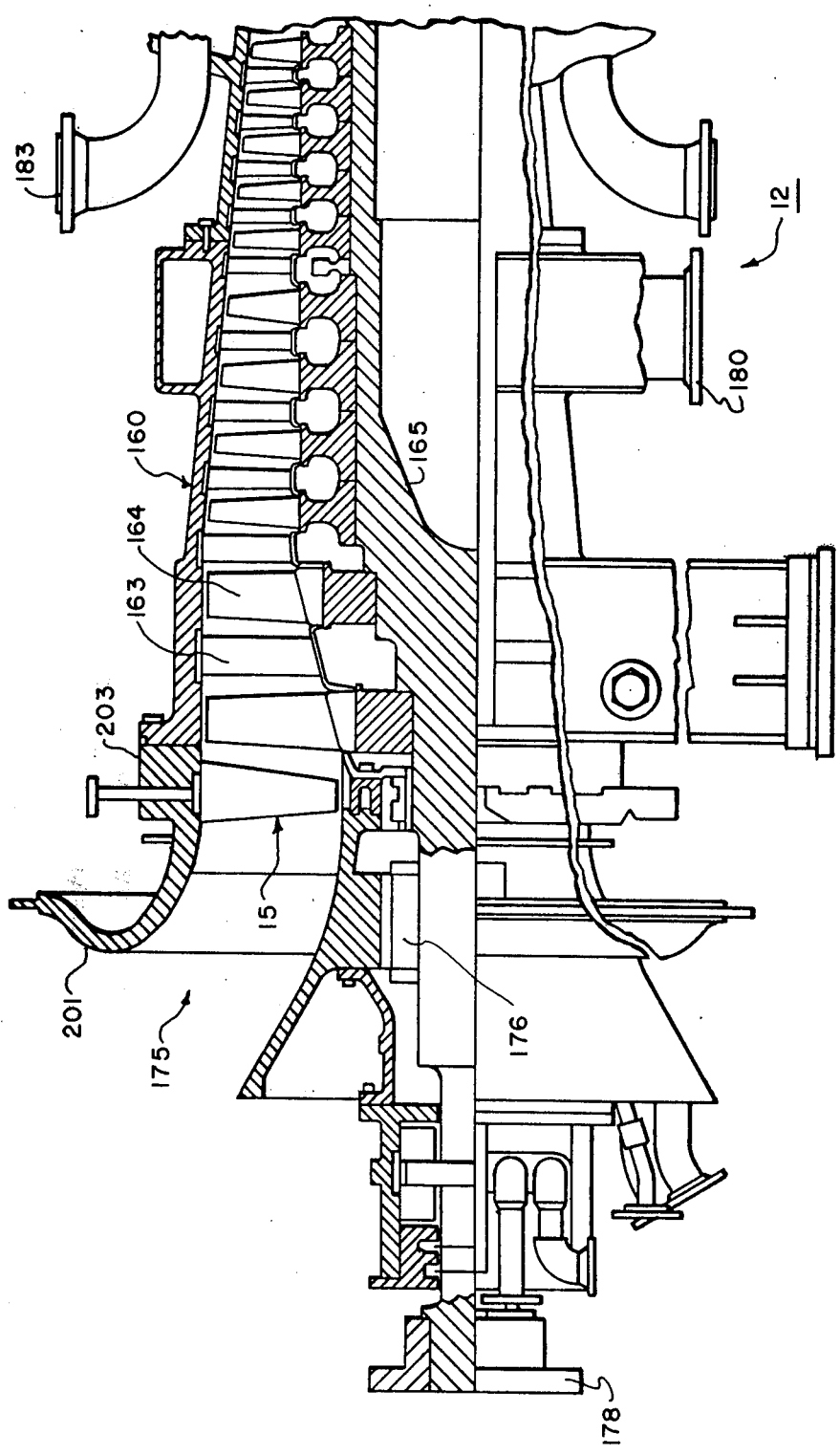
FIGS. 2A and 2B illustrate a gas turbine structure which can be employed in the plant of FIG. 1.
Figure 2B:
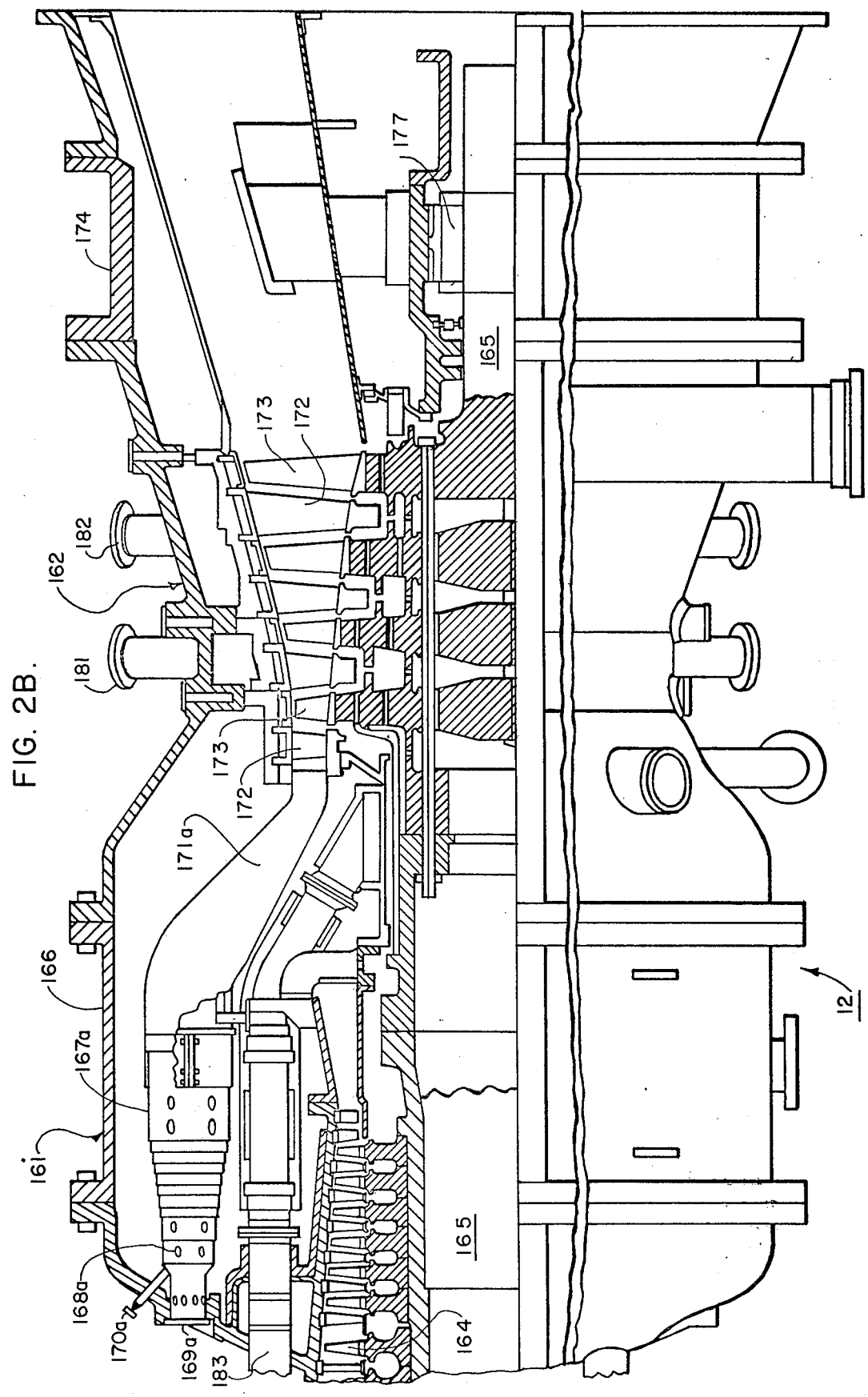

Referring now to FIGS. 2A and 2B, there is shown a longitudinal, partially cross-sectional, elevational view of the No. 1 gas turbine 12. FIG. 2A shows the left-hand half of the view and FIG. 2B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pennsylvania. It is of the simple open cycle type and employs a single-shaft two-bearing construction in which no bearings are located in a high pressure, high temperature zone. It is constructed for operation at a rated speed of 3,600 rpm and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a–167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of a fuel nozzle 169a, a spark plug 170a serving to provide for the initial ignition of the fuel. This fuel is burned in the combustor 167a and the resulting high temperature, high pressure gas is supplied by way of a combustor outlet duct 171a to the inlet of the turbine section 162. The turbine section 162 is a four stage turbine having interspersed sets of stationary blades 172 and rotary blades 173, the latter being located on the rotor structure 165. The high temperature high pressure gas from all of the combustors 167–167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency.

The two bearings which support the single rotor structure 165 of the gas turbine 12 are indicated at 176 and 177. As seen, these bearings 176 and 177 are located outside of any high pressure high temperature zone. The electric generator 13 is coup led to the cold or compressor end 178 of the rotor structure 165 to avoid potential misalignment problems. Some air is removed from the compressor 160 by way of outlet 180, externally cooled and filtered by an air cooler and returned to the turbine section 162 to cool the first two sets of stationary blades 172 and the first set of rotary blades 173. The cooling air for the stationary blades 172 enters through inlets 181 and 182, while the cooling air for the first set of rotary blades 173 enters via inlet 183.

For more detail on the structure of other apparatus in the plant 10, reference is made to No. 495,765, now U.S. Pat. No. 3,953,966.

C. PLANT CONTROL SYSTEM

The plant control system 50 is organized to operate the plant equipment safely through startup and loading with high reliability so that the plant is highly and quickly available to meet power demand from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 3:
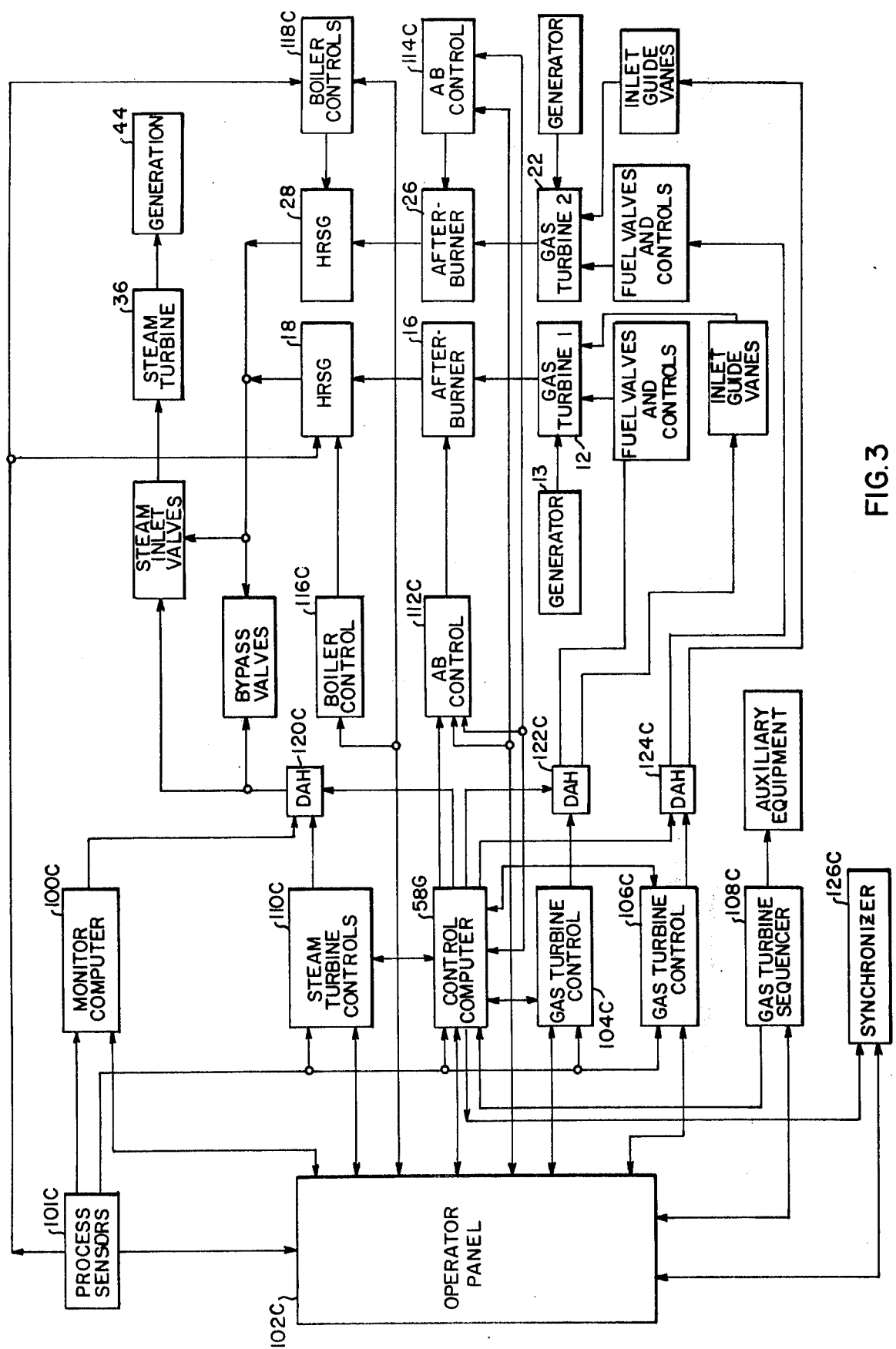
FIG. 3 shows a schematic view of a control system arranged to operate the plant of FIG. 1 in accordance with the principles of the invention.

As shown in FIG. 3, the control system 50 includes a digital control computer 58G, a digital monitor computer 100C and various analog controls for operating the plant equipment in response to process sensors 101C while achieving the described objectives. In this instance an automatic startup control of the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e. they react automatically to operator setpoints and signals generated by the process sensors 101C to control the steam generators according to plant conditions produced by coordinated turbine and after burner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines has been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

D. GAS TURBINE SPEED CONTROL SYSTEM WITH FIXED ACCELERATION TIME

Figure 4A:
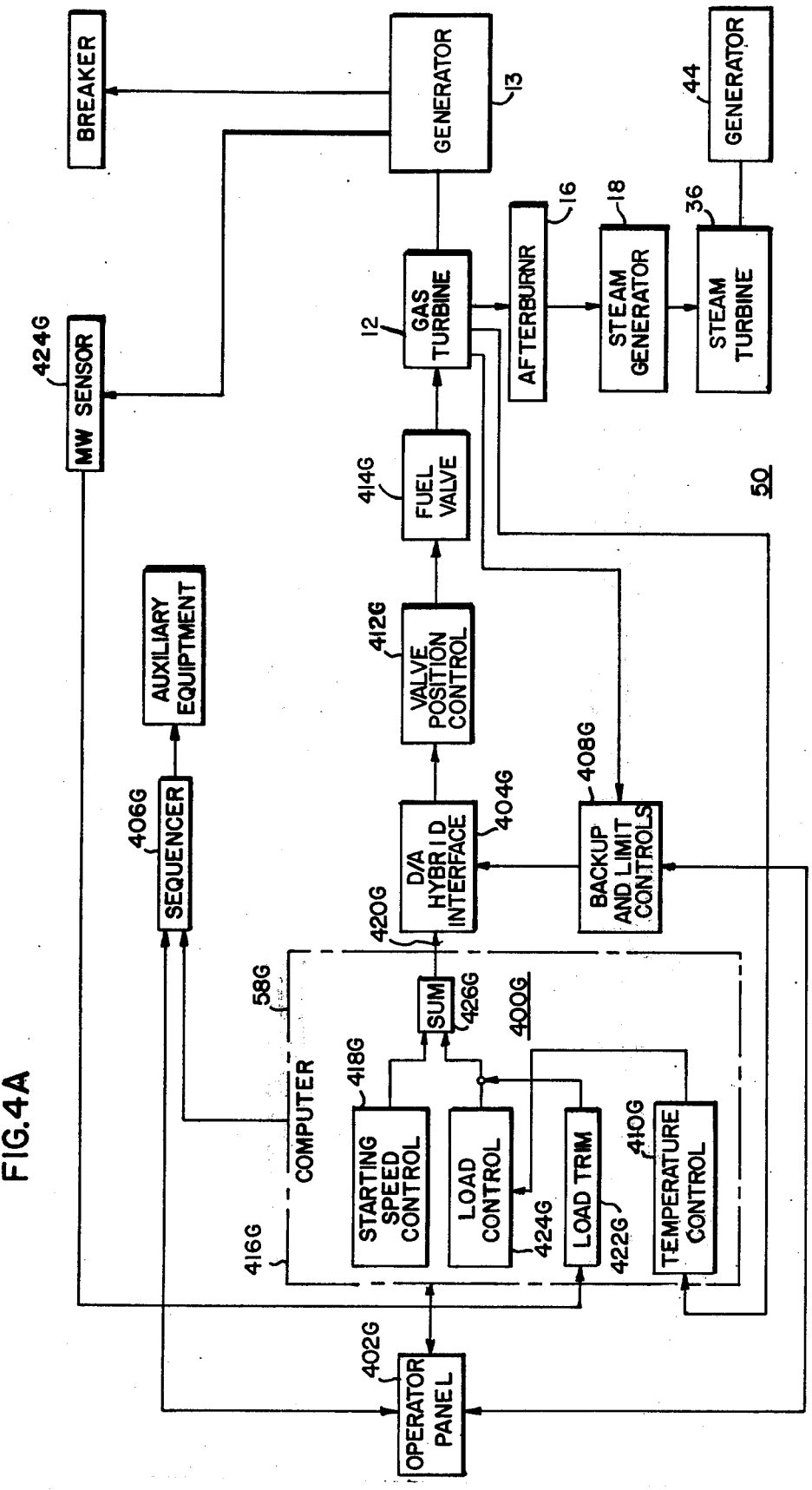
FIG. 4A shows a schematic diagram of the plant control system with elements of a startup speed control illustrated to indicate more particularly the preferred manner of embodying the invention.

As shown in FIG. 4A, the preferred embodiment comprises a startup speed control system 418G which is included in the plant control system 50 normally to provide for gas turbine acceleration from flame on to idle speed in a fixed time, in this case 720 seconds. If a hold or runback occurs during automatic acceleration, a time counter is stopped and then restarted after the hold or runback is terminated and the total acceleration time is then extended from the fixed value. In the alternative, the time counter can continue to run and on termination of the hold or runback the rate of change of the speed reference is increased from the scheduled rate value in a speed versus time curve generator subject to blade path temperature and surge limits. In the latter case, the total acceleration time can be equal to the fixed acceleration time, or it will be greater than that value depending on the length of the hold or the runback action. With fixed time acceleration, startup time variations, otherwise caused by differing ambient temperatures in temperature startup control, are avoided.

The manual/automatic status of the plant control system 50 is fixed by operator selection at an operator panel 402G or by a computer rejection or failure to manual. A digital/analog hybrid interface 404G includes manual/automatic logic circuitry to detect when the gas turbine 12 is to be on manual control and to make bumpless switching operations which implement the applicable control mode.

In automatic control, a programmed digital control computer 58G generates a fuel reference from the hybrid 404G in the coordinated and the operator automatic modes to schedule fuel for automatic startup and to provide megawatt load control. It also initiates turbine startup by a sequencing system 406G under coordinated control. Generally, the sequencer 406G sequences the gas turbine 12 through the startup process by starting and stopping auxiliary equipment when sequencing permissives are generated, and it trips the turbine if certain conditions develop. Further, the sequencer 406G generates logicals for the turbine controls, i.e. a master relay on signal, a fuel on signal, a breaker status signal, a fuel select and transfer signal, and a flame on signal.

Megawatt control is provided only in the automatic modes of operation and it is not available to the operator in the backup modes. Generally, the megawatt level of gas turbine operation in the backup modes is that which results from the manual operation of a feedforward speed/load control through raise and lower pushbuttons.

The operator controls the turbine loading operation by generating a fuel reference from the hybrid interface 404G through backup and limit controls 408G. The backup controls also include a simplified startup speed control which generates a feedforward fuel reference from the hybrid interface 404G during startup. Analog controls including overspeed and surge limit function during the coordinated and operator automatic modes of operation as well as the operator analog and manual modes of operation.

An analog temperature limit control is included in the block 408G to function during the manual and operator analog modes as a limit on the fuel reference. The computer 58G provides a digital temperature limit control function 410G which acts as an override or a hold on the startup speed and load controls during the programmed computer operation in the automatic mode.

The hybrid interface 404G applies its output fuel reference to valve position control circuit 412G which operates fuel valves 414G. As already indicated, the hybrid output fuel reference value is that value resulting from computer control or that value resulting from operator control from the control panel, subject to limit action. Transfer between automatic and manual fuel references is made bumplessly by the functioning of the hybrid interface 404G.

In the backup mode, the temperature limiter circuitry functions to limit bumplessly the fuel reference output signal from the hybrid interface 404G as required to prevent excessive blade path temperature and in turn excessive turbine inlet gas temperature. Surge and overspeed limit controls function in all modes of operation directly through the fuel valve positioning control 412G to limit the fuel demand reference for the purpose of avoiding surge operating conditions and turbine overspeed.

Figure 7:
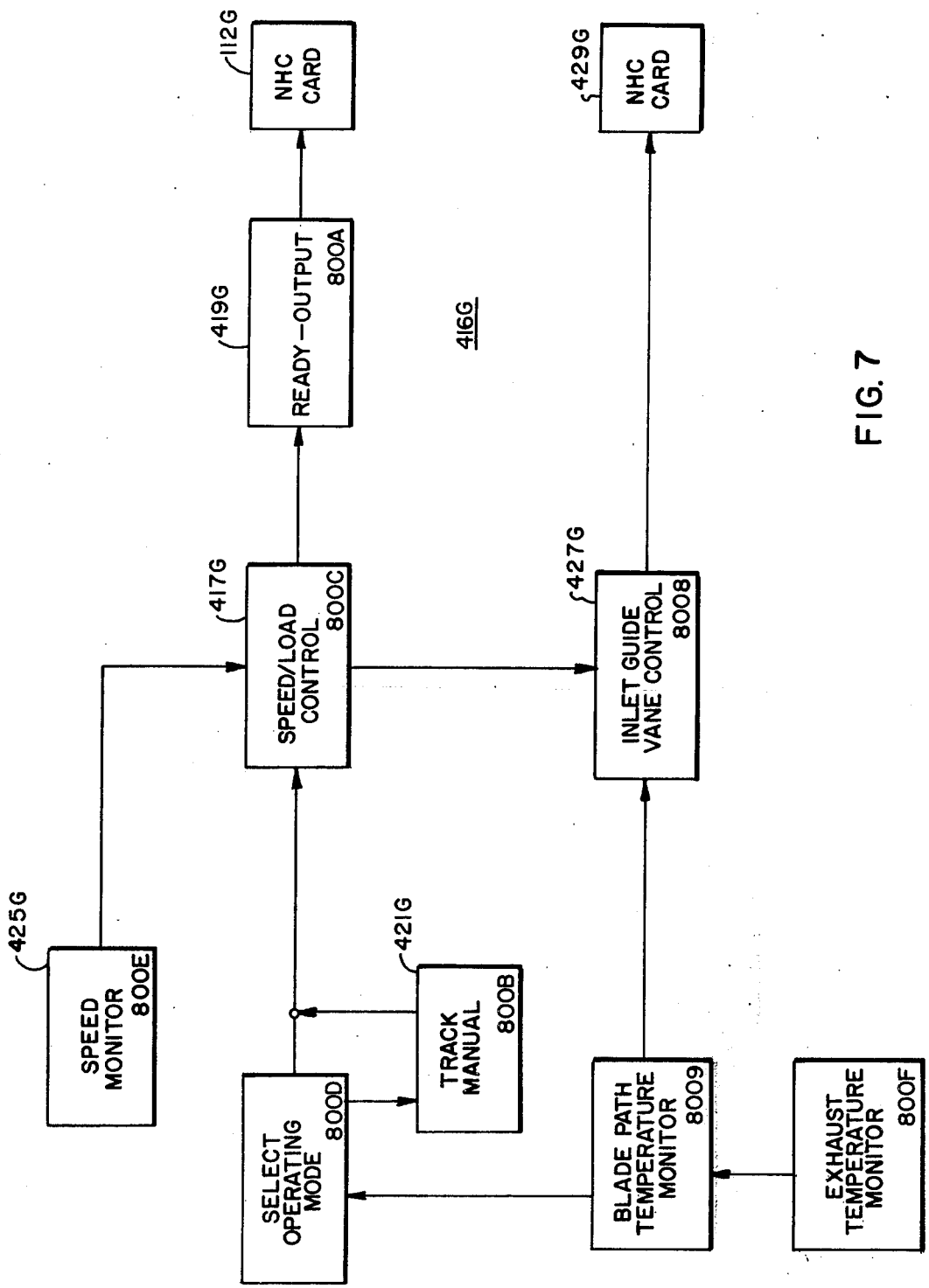
FIG. 7 shows a more detailed functional representation of various elements of the startup speed control.

As shown in FIGS. 4A and 7, a digital fuel control 416G operates automatically and it includes the computer 58G and embodies certain elements in the startup speed control system 418G, a system 415G for limiting blade path temerature, and the megawatt load control system 400G. The megawatt load control system 400G and the startup speed control system 418G together form an automatic speed/load control system 417G (FIG. 4B) which generates a fuel reference through an output block 419G as indicated by the reference character 420G. In the backup control operation, a block 421G tracks the computer fuel reference output to the hybrid interface output, i.e. the output of a fuel control NHC card 112G. In the automatic load mode, an inlet guide vane control 427G operates through another NHC card 429G and improves the plant efficiency as set forth more particularly in copending and coassigned patent application, Ser. No. 495,727, now U.S. Pat. No. 3,973,391 entitled "Control Apparatus For Modulating The Inlet Guide Vanes Of A Gas Turbine Employed In A Combined Cycle Electric Power Generating Plant As A function Of Load Or Inlet Blade Path Temperature," and filed concurrently herewith.

The load control system 400G functions as a feedforward generator, and a megawatt trim control 422G preferably provides a megawatt feedback trim correction to the forward load control channel on the basis of actual megawatts generated by a sensor 424G. The startup speed control preferably functions as a closed loop speed feedback control with the setpoint being varied in accordance with a speed/time characteristic and in accordance with hold and runback actions which may occur during the startup. Speed error is equal to the difference between the reference and a speed feedback from a monitor 425G and it is integrated over time to generate the fuel reference as a function of time.

Generally, once a demand is applied to a load control 424G in the megawatt load control system 400G, the fuel reference is ramped from its present value toward the demand value at a specified rate. The rate can be inserted by the operator or changed dynamically by limit controls. During the time period when the fuel reference is to be ramped toward the demand value, it can be put into a HOLD state where the fuel reference value remains fixed until a GO signal is generated at which time the ramping of the fuel reference toward the demand value is resumed.

The fuel reference can also be increased or decreased as requested by external sources including an automatic synchronizer. The fuel reference can be adjusted to some lower value by a runback request. The computer output fuel reference is tracked to the hybrid output fuel reference when the system is operating in the backup mode to provide for bumpless transfer.

With reference now to the startup speed control system 418G, gas turbine startup in the automatic mode is controlled from an ignition speed of approximately 900 rpm to synchronous speed. At ignition, the fuel reference is set at a fixed value and upon detection of a successful ignition the speed reference is increased to generate an increasing output reference for the fuel control. When the fuel reference from a speed loop equals the minimum fuel allowed for acceleration by a downstream low signal limiter, the speed loop becomes controlling. The fuel reference then increases normally in accordance with the stored speed/time characteristic. The speed control is arranged to make the gas turbine accelerate to synchronous speed normally in the same length of time from startup to startup.

At the end of the acceleration period, the gas turbine is in a run standby state at a speed of approximately 3600 rpm and it is ready to be operated for generator synchronization. The synchronizing procedure can be carried out by the operator, or in the coordinated control mode the procedure is automatically initiated and implemented.

Therefore, during speed control the fuel reference is that value which results from speed control response to speed error and during load control the fuel reference is that value which equals the sum of a stored idle fuel reference and the value generated by the megawatt load control.

Figure 4B:
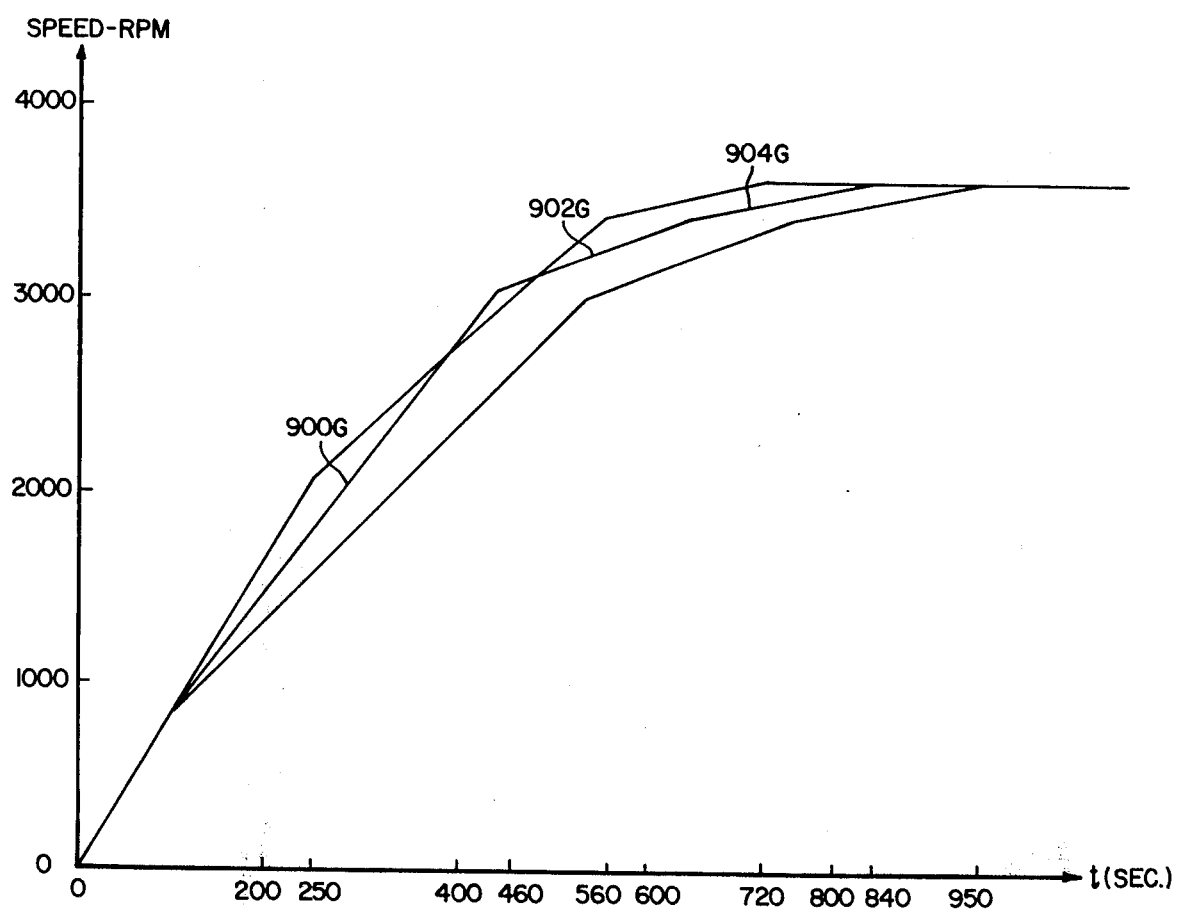
FIG. 4B shows a characterization of speed versus time which is employed in generating a speed reference during turbine speed control.

As shown in FIG. 4B, the stored speed versus time curve employed in generating a speed reference for the speed control loop during wide range speed control comprises three straight line parts 900G, 902G and 904G. Time is zero at the point in time at which the flame goes on (at approximately 900 rpm) during the ignition part of the startup sequence. Time is counted upward to 720 seconds from that point onward, and for each time point a scheduled speed reference is defined by the curve.

The speed schedule is basically made up of the fast rise part 900G to 2,000 rpm at 250 seconds, the slower rise part 902G to 3,400 rpm at 560 seconds, and the still slower rise part 904G to 3,600 rpm at 720 seconds because of the relationship between the time specified for acceleration, the power of the starting device, i.e. an electric induction motor in this case, and the temperature and surge limits on startup operation.

Generally, as illustrated in FIG. 4D, some allowable maximum fuel ramp defined by cycle temperature limits can be defined for a gas turbine. In most cases, starting time from ignition to synchronization as indicated by line 293G is specified for the turbine. To reach synchronization in the specified time, the fuel reference required at synchronous speed must be reached along a fuel reference function which is equivalent to the illustrated average fuel ramp. Each turbine has characteristic power assist requirements and a characteristic self-sustaining speed as represented by dotted line 291G. Starting devices vary significantly in power rating and cost and in how long they can function under maximum drive operation before they must be uncoupled from the turbine as indicated by dotted line 293G. The dotted lines 291G and 293G shift along the abscissa according to the characteristics of particular turbines and starting devices. Therefore, substantial constraint normally exists on the selection of starting devices for a particular gas turbine as indicated by the shaded areas. The speed reference characterization shown in FIG. 4C is structured to reflect the foregoing considerations as well as turbine performance considerations set forth subsequently herein.

Figure 4C:
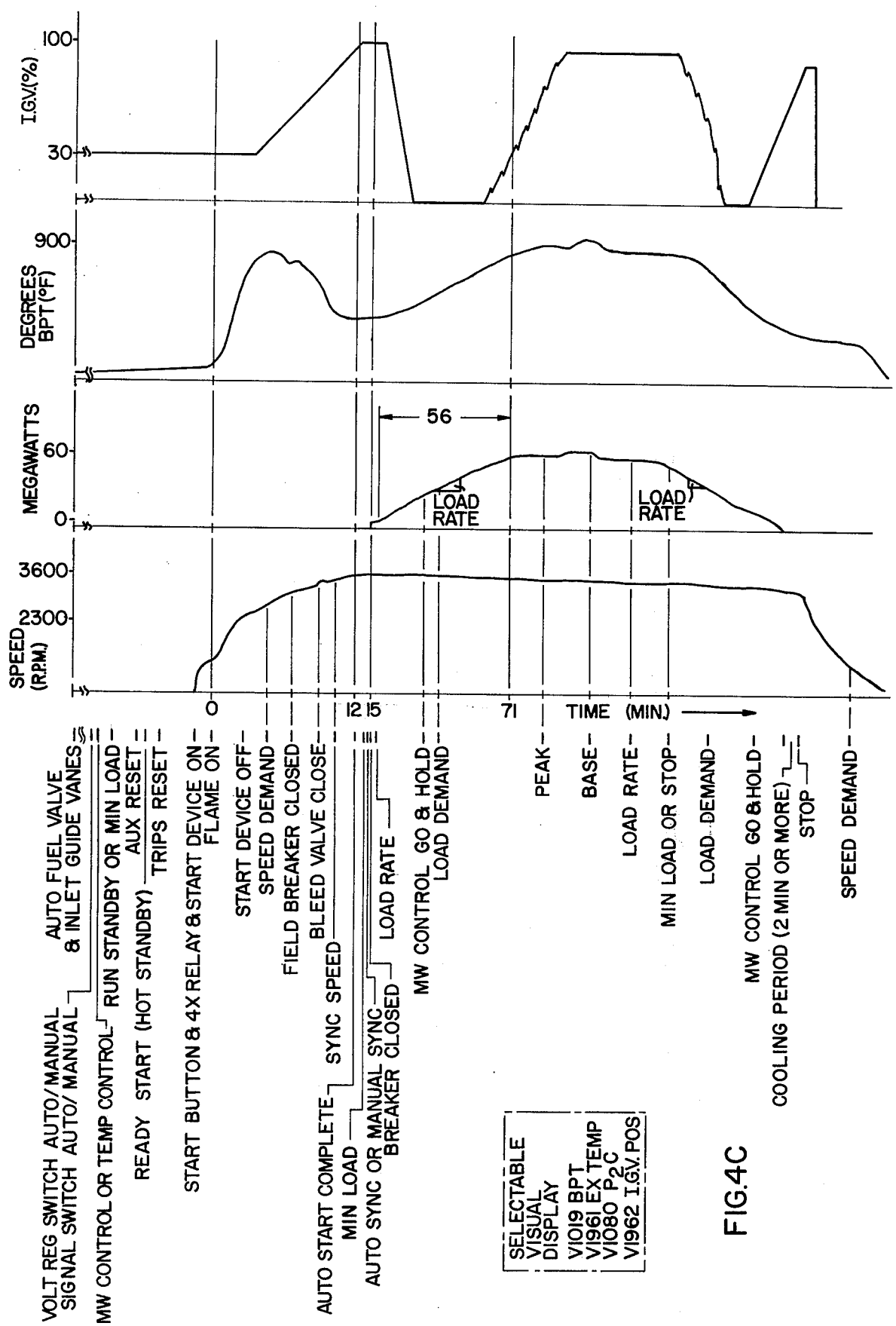
FIG. 4C shows a graph indicating the relationship between speed, blade path temperature, load level and inlet guide vane position as a function of time over the range of turbine speed and load operating levels, and it further indicates the time points at which various events occur.
Figure 5:
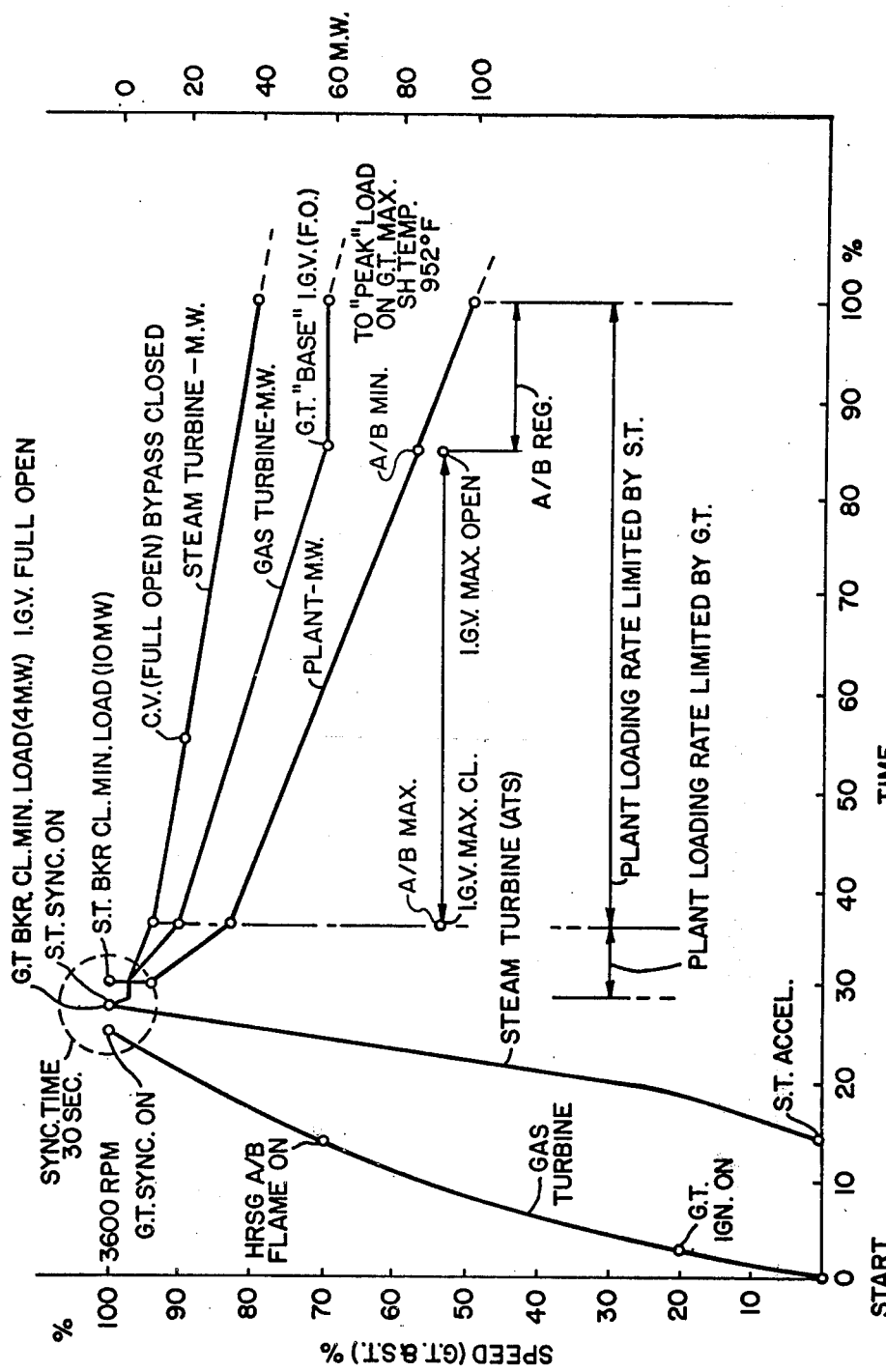
FIG. 5 shows a schematic diagram of the broad sequence of plant operations.
Figure 6:
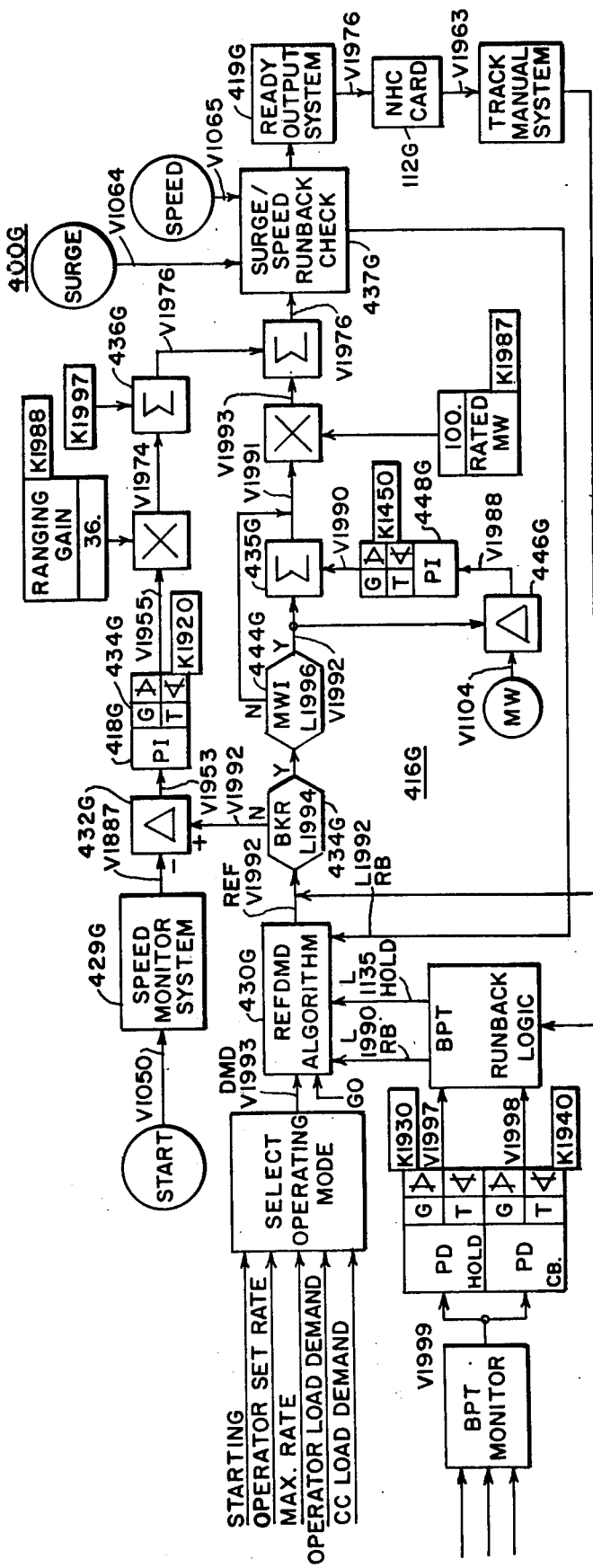
FIG. 6 shows a schematic diagram of a digital fuel control system which provides part of the startup speed control loop.
Figure 6:
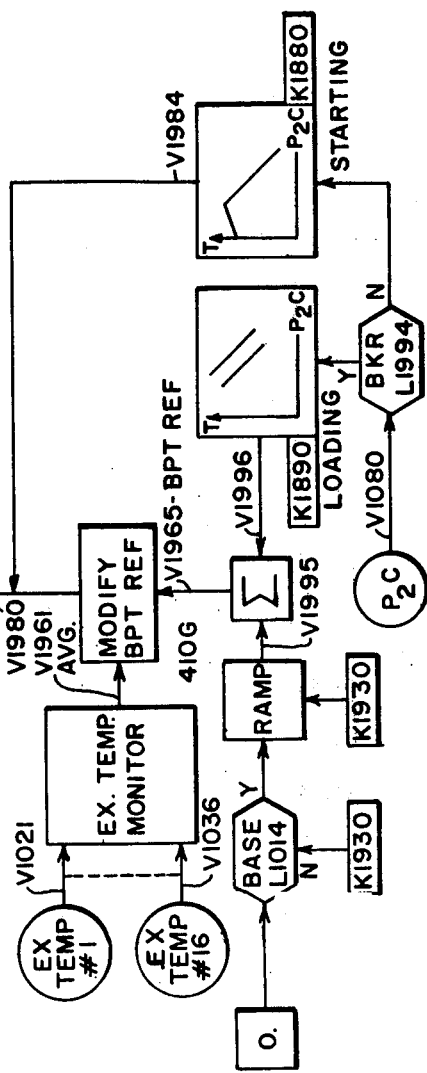

As shown in FIG. 4C, various events occur in the detailed embodiment prior to and during the turbine acceleration to synchronous speed. Once the START button is pressed and the master relay contact 4X is closed, the sequencer starts the starting device and it drives the turbine to about 900 rpm in about 90 seconds. At this point, the fuel is turned on, ignition occurs, and the flame goes on as a transition is made to digital speed control. Many operator button selections can be made prior to or during rolling, but preselection is usually more desirable since the operator has more time for selection prior to rolling. FIG. 4C further shows the behavior of blade path temperature, speed, load and inlet guide vane position as a function of time. FIG. 5 provides an overview of the overall plant sequence of operations.

Since the turbine approaches ignition and flame on with some deceleration, the digital speed control first causes the actual turbine speed to accelerate slightly and smoothly at an increasing rate to bring the turbine on the slope of the curve part 900G (FIG. 4B). Some slight overshoot may then occur but the proportional plus integral controller quickly makes the actual turbine speed follow the slope of the curve part 900G. Thus, a speed error is determined from an actual speed value and the speed reference and integral plus proportional action is applied to the error. Generally, the controller algorithm has a gain G and a reset time T which are tuned to provide good speed curve follow action as well as good response during synchronization. A ranging constant K1988, shown in the detailed speed/load chain flow chart, provides tuning for interfacing the computer output with the NHC card. A minimum ignition fuel value is added to the controller output as a bias since that fuel value exists at the flame on time point.

As a transition occurs between the curve part 900G and the curve part 902G at 250 seconds, some slight turbine speed overshoot again occurs but the speed control quickly and smoothly brings the turbine on the curve part 902G. At about 2,300 rpm, the starting device is turned off and the loss of its torque results in a drop in turbine speed, but again the speed control quickly returns the turbine to the curve part 902G.

At 560 seconds and 3,400 rpm, the transition to the curve part 904G again causes some deviation from the stored speed curve but the digital speed control brings the turbine on the curve part 904G quickly and smoothly. At 3,450 rpm, the turbine bleed valves are closed to cause significantly more air to flow through the turbine. A quick speed rise of 50 to 60 rpm typically occurs, but the speed control quickly backs off the fuel valve to bring the turbine speed smoothly back to the curve part 904G. It is preferred that the curve part 904G be provided with a relatively low slope so that the bleed valve disturbance is stably resolved to regain smooth accurate speed control prior to synchronization. If the scheduled speed change rate were high in this range of operation, the speed controller could cause the turbine to approach the 3,600 rpm speed value too rapidly such that overshoot would occur thereby undesirably preventing a transfer to synchronization control until speed controller action would drop the turbine to idle speed.

In summary, the closed loop speed control normally provides fixed time startup with accurate and smooth following of the scheduled turbine speed by the actual turbine speed. Power generation capacity is accordingly made highly available in the combined cycle plant.

E. CONTROL AND LOGIC CHAINS

The following control and logic chains and algorithms are similar for both gas turbines and are included in the speed control system:

8005 - SELECT OPERATING MODE

In the operating mode selection chain, the speed and load references are generated according to the mode of plant or turbine operation. If the gas turbine is on manual fuel valve operation as indicated by the logical variable L2976, the track manual chain 8003 is bid and the select mode chain 8005 is ended. If automatic digital fuel control is operative, the flow chart path depends on whether the turbine is in wide range speed control, the synchronization process, or load control.

If the breaker is open as indicated by the variable V2994, the turbine is in wide range speed control. In turn, the variable L2967 indicated whether the turbine is under automatic startup speed control and if it is, the time V2952, which starts at the time point of flame on, is advanced by one second and the speed reference V2992 is determined from the stored speed-time curve K2850. If synchronous speed has not yet been reached, the speed/load chain 8004 is then bid to put the new speed reference in the integrator speed control loop and lift the turbine fuel flow to produce an actual turbine speed equal to the speed reference. When the turbine reaches synchronous speed, i.e. when the speed curve time has expired at 720 seconds, auto start L2967 is set false and the reference V2992 is set equal to 3600 rpm for manual or automatic synchronization.

On automatic synchronization, the variable L2971 is true and reference V2992 is set equal to its last value plus or minus 1 rpm according to whether a raise pulse or a lower pulse has been received from the external automatic synchronizer. Further, the demand V2993 is set equal to the new reference and the speed/load chain 8004 is bid to boost or lower the turbine speed by 1 rpm.

If the turbine is on manual synchronization, the auto start variable L2967 is false and the reference change rate V2982 is set equal to a stored manual sync acceleration rate V2982 which can be 1 rpm per second. In manual synchronization, the operator cannot override the reference change rate. The GO and ATS variables L1700 and L1703 are set true, the algorithm REFDMD outputs a changing reference V2992 according to the manual sync rate on and the speed/load chain 8004 is bid. As turbine speed changes and a line match occurs, the operator closes the breaker. If the turbine speed crosses the line speed without breaker closure, the operator puts in a new speed reference which will cause a recrossing of the turbine and line speeds or frequencies.

If a blade path temperature, surge or speed runback exists as indicated by L2992 or L2990, the reference change rate V2982 is made equal to the surge/speed runback rate K2973 or the BPT runback rate K2972, automatic start is bypassed, and the REFDMD algorithm generates the speed reference in accordance with the runback rate. Next, the speed/load chain 8004 is bid to change the turbine speed in accordance with the speed reference runback.

In load control, a runback similarly causes the load reference change rate to be set equal to the surge/speed load runback rate K2995 or the BPT load runback rate K2975. The REFDMD algorithm then implements the load reference runback.

In normal load operation without plant coordination, the load change rate V2982 is set equal to the operator selected load rate V2994 and a check is made to make sure the operator load demand is at least equal to minimum load. If temperature control L2130 is not selected, the algorithm REFDMD generates a load reference V2992 in accordance with the operator load demand V2993 at the operator load rate V1974. The speed/load chain 8004 is bid to operate to change the turbine fuel flow in accordance with the new load demand.

In coordinated control, the load demand and rate are made equal to V2979 and V2978 which are generated at the coordinated control level. If the temp change rate L5056 is excessive, the rate V2982 is made zero. The rate is also made zero in noncoordinated control, i.e. operator automatic control, if the digital temp control becomes limiting in load control as indicated by the variable L2130. As in other cases, the algorithm REFDMD generates the reference in accordance with the coordinated load demand and the coordinated rate or the temperature limiting rate.

In cases where it is desired to provide fixed time startup even though a hold or runback occurs, the select operating mode flow chart is modified as preferably indicated in the flow chart for chain 8005-A. Generally, this flow chart only shows the additional functions needed to provide time makeup. Thus, on a hold or runback, the acceleration timer continues to count, and on release of the hold or runback, a new rate schedule, i.e. a higher speed curve slope is executed until the time is made up or until 3400 rpm at which time the normal speed curve slope applicable at that value is employed to enable stable transition through bleed valve closing and synchronization. In this embodiment, the hold or runback time is only partly made up if it is not made up by the time the turbine reaches 3400 rpm.

8004 - SPEED/LOAD CONTROL

Chain 8004 contains controllers to adjust the gas turbine fuel to attain a desired speed or load setpoint. In order to determine whether speed or load control is selected, the chain first checks the breaker logical variable L2994. If the breaker is open, a speed control path is taken where a speed error is formed by subtracting the actual speed from the speed reference. This error is then fed into a proportional plus integral controller with limits, the output of which is ranged to the proper magnitude for output later to the throttle valve. When the breaker closes the last value of this throttle valve output, i.e. the idle fuel reference, is stored for later addition to the load fuel reference value.

If the breaker is found to be closed it means that the gas turbine is on line generating power and therefore in a loading mode. A check is then made to see if megawatt control has been selected and, if not, the reference from the reference demand REFDMD block is fed forward to summation with the last speed controller output after proper ranging for the throttle valve. This reference is under the control of other chains such as the blade path exhaust temperature control chain 8001 when megawatt control is not active.

If megawatt control is active, a path is taken through the feedforward plus trim megawatt control calculations. In this path the error between the megawatt reference and the actual generated megawatts is calculated and fed to a proportional plus integral control block with limits and its output is then summed with the original reference and ranged for the throttle valve. The resulting ranged signal is then summed with the idle fuel reference before being stored for later output.

At label 200 the speed and load control paths rejoin and the calculated throttle valve signal is checked against the external hardware surge and speed controller outputs providing that the readings of these signals have been found reliable. If the throttle valve signal as calculated by the speed or load controller exceeds either of the two limits, hold or runback logical flags are set provided the proper conditions exist.

Beginning at label 230 the chain checks actual generated megawatts against various load megawatt levels to determine if the gas turbine is at minimum base or peak load. The appropriate logical variables are then set true for output as status lights on the operator control panel and for use by other chains. Chain 8004 exits after bidding for the Ready/Output chain 8002.

8006 - GT2 SPEED MONITOR

The first major section in chain 8006 is a check to see if the auto start or the start logical variables should be set true. These two logicals are set true provided that the following conditions are met: the breaker is open, the unit is in coordinated control, the start relay, 4X, represented as logical variable L2082 is not true and the unit has reached hot standby status. If all these conditions are met the variables L2265, auto start, L2966, L1966, start, are set true.

The chain then proceeds to a section where speed, V2050, is checked for reliability and logical variable L2993, speed unreliable, is set true or false accordingly. The selected speed V2987 is then set equal to speed V2050.

A check is now made on breaker status and if the breaker is found to be closed the chain proceeds to label 220, otherwise a further speed check is performed to determine whether the unit has reached synchronous speed. Logical variables for various panel indicators such as the sync speed lamp and for interface contacts with the syncrhonizer are set true or false as a result of this check. After the synchronous speed check comes a section of the chain which examines the auto stop, L2968 and normal stop L6093, logical variables. If either has been set for some number of passes through the chain a stop logical variable L2260 is set true. The program now goes to label 220 where it bids for the temperature control chain 8001 and checks the megawatt reading for reliability before exiting.

B. REFDMD - REFERENCE/DEMAND CONTROL FUNCTIONAL DESCRIPTION

The REFDMD algorithm provides the PACE control computer system with a controller which moves a turbine or plant reference toward a targeted demand. The algorithm includes additional features to handle runback situations and to manipulate logical variables which, in turn, operate boiler-turbine-generator (BTG) board lamps. REFDMD is normally executed periodically, once a second, by various control system chains.

The operating philosophy of the entire PACE computer control system is based on a reference-demand concept. The demand variable represents a target to which any turbine or the entire plant is set. This may be a speed demand in rpm during wide-range speed control, or it may be a load demand in megawatts during load control. The mechanism for setting the target demand varies with the operating mode of the turbine or plant. During automatic control, for example, the demand may be entered from a keyboard by the operator, or it may be internally computed by control system software. During coordinated control the plant demand is set by the operator from a keyboard, but the various turbine demands are computed by the coordination system. During manual control, the demand is internally computed by software which is continually tracking the manual operation in preparation for bumpless transfer to automatic control.

The reference variable represents the actual turbine or plant condition on a second-by-second basis. The reference is always moving toward the demand at a rate which depends on the operating mode of the turbine or plant. During automatic control the rate, in rpm per minute or MW per minute, may be entered by the operator from a keyboard, or it may be computed by internal software. During cooordinated control the operator sets the plant load rate, but the coordination system computes the individual turbine rates. During manual control the rate is internally set by software which tracks continuously the manual operation in preparation for bumpless transfer to automatic control.

The REFDMD algroithm provides the control computer with the ability to accomplish this reference-demand philosophy. It maneuvers reference at the appropriate rate, responds to runback situations, does the bookkeeping to properly terminate software when reference equals demand, and generates logical signals to place GO and HOLD lamps in appropriate states.

A program using the REFDMD algorithm requires identification of eleven arguments, as follows:

REFDMD

```
DEMAND = VXXXX
REF    = VXXXX
RATE   = KXXXX
GO     = LXXXX
HOLD   = LXXXX
OFF    = LXXXX
ATS    = LXXXX
LIMIT  = LXXXX
RUNBACK = LXXXX
BREAKER = LXXXX
MINLOAD = KXXXX
```

DEMAND — A V number containing the target demand to be achieved by the REFDMD algorithm.

REF — A V number containing the reference which is to be maneuvered by REFDMD to reach demand.

RATE — A V number containing the rate at which the REFDMD is to move the REF toward demand.

GO — An L number indicating the status of the GO button and lamp. When GO is set true, REFDMD moves REF toward demand, when GO is reset false REFDMD does not move REF.

HOLD — An L number indicating the status of the HOLD button and lamp. When HOLD is set true, REFDMD will not move REF, and will turn off HOLD if REF and demand are equal. When HOLD is reset false, REFDMD takes no action as far as HOLD is concerned.

OFF — An L number indicating the status to be used in turning off GO and HOLD. When REFDMD finds REF and demand equal, it sets off true; this triggers a control system chain which turns off both the GO and HOLD lamps.

ATS — An L number indicating the status of the automatic turbine startup (ATS) software, which provides supervision of the steam turbine portion of the PACE plant. When ATS is set true, the REFDMD algorithm does not turn off the GO and HOLD lamps, since these are not operable in the ATS mode. When ATS is reset false, REFDMD takes no action as far as ATS is concerned.

LIMIT — An L number which indicates the status of the valve position limit of the steam turbine computer control system. This is a special logical system which does not allow the steam turbine control valves to be raised above an adjustable setpoint. When REFDMD finds limit set true and REF is attempting to move up towards demand, REFDMD does not raise REF until the limit condition is reset. When limit is set true and REF is attempting to move down toward demand. REFDMD allows REF to decrease. When limit is reset false, REFDMD takes no action as far as limit is concerned.

RUNBACK — An L number which inidcates a contingency status. If runback is set true, REFDMD lowers REF at the rate value; should the breaker on the unit be closed the runback stops at minimum load, while the runback continues to zero if the breaker is open.

BREAKER — An L number indicating the breaker state. This argument is used only when the runback state is set; then for a closed breaker status, the runback proceeds only to minimum load.

MINLOAD — A K number indicating the minimum load which can be requested on the turbine. REFDMD uses this argument only if a runback occurs and the main generator breaker is closed.

FLOW CHART DESCRIPTION

The REFDMD algorithm first checks the runback; argument; if it is true, the reference is decreased by the amount of rate (divided by 60 to convert units per minute to units per second). If the breaker is closed, the new value of REF is compared with minload. Should REF be smaller than minload, REF is then set equal to minload; if REF is greater than or equal to minload, the algorithm exits.

Should runback be false, REFDMD checks the state of the GO argument. If GO is false, another check is made on the equality of REF and demand. Should these be equal and HOLD lamp be on, the OFF argument is set true. This triggers another control system chain which turns off both the Hold and Go lamps. If REF and demand are not equal when go is false, REFDMD simply exits.

If GO is true, then the difference between demand and REF is computed and placed in temperature, and rate is divided by 60 to convert it to units per second, and is placed in both TEMP1 and TEMP2. The value of temperature is then checked against zero; if temperature is greater than zero, demand is greater than REF and the reference must be increased. Therefore an internal logical variable up is set true. If temperature is less than zero, demand is less than REF and the reference must be decreased. Therefore the internal logical variable up is made false and the algebraic sign of temperature and TEMP2 reversed.

Temperature has a positive sign as a result of the above tests, so that it represents the magnitude of the difference between demand and REF. The magnitude in temperature is compared against TEMP1, which contains the size of the step change to be made in REF this second. (This is the result of dividing rate which is in units per minute by 60 to yield units per second, the step change each second.) If temperature is greater than TEMP1, REF is greater than one step from demand; in this case, the VPLIM argument is checked to see if it is true while REF is going up. If so, the reference is at such a level as to cause a valve position limit situation; therefore, REF may not be increased and REFDMD exits at this point.

If there is no valve position limit, the increment in TEMP2 (which now has proper polarity to raise or lower REF as described in the above paragraphs) is algebraically added to the current value of REF. A test is made to determine if this addition has made REF less than 0. If so, REF is set to zero; otherwise REFDMD exits.

If the magnitude test on temperature versus TEMP1 shows that temperatue is equal to or less than TEMP1, the value of reference is within one step size of demand. REF is made exactly equal to demand, and a test made on the state of the ATS argument. If it is false, off is set true; this then triggers a special control system chain which turns off both GO and HOLD lamps, after which REFDMD exits, if the ATS argument is true, REFDMD exits immediately since GO and HOLD lamps are not functional in the ATS control mode.

C. RAMP - RAMP CONTROLLER

FUNCTIONAL DESCRIPTION

The RAMP algorithm provides the PACE control computer system with a controller which ramps an output variable at a linear rate toward an input variable. A sketch of a typical ramp waveshape is shown on the flow chart. The RAMP algorithm is normally executed periodically, once a second, by various control system chains. Its most common use is in tracking schemes, where the ramp function contains the mismatch between a manual system and the automatic system. When control is switched to automatic, a bumpless transfer takes place and the mismatch is slowly removed at a controlled rate by the ramp controller. The RAMP algorithm is also used in situations where switching occurs under normal operating conditions; an example is the change from base to peak operation of the gas turbines, during which a higher operating temperature bias is gradually entered into the control system through the RAMP algorithm.

A program using the ramp algorithm requires identification of three arguments, as follows:

RAMP

DEMAND = VXXXX
REF = VXXXX
RATE = KXXXX

DEMAND — A V number containing the input to the RAMP algorithm; demand represents the ultimate output or target of the ramp controller.

REF — A V number containing the output of the RAMP algorithm, REF will approach demand at a linear rate.

RATE — A K number containing the linear rate at which REF is to approach demand. Rate normally has dimensions of units per minute, such as degrees per minute or percent per minute. The algorithm internally converts these to units per second, since the control system normally executes once per second.

FLOW CHART DESCRIPTION

The RAMP algorithm first computes the difference between the input demand and the output REF and checks whether this is zero; if so the algorithm exits. If not, the rate is divided by 60 to compute the incremental change to be made in REF on a per-second basis, and then this is saved in temporary locations. The non-zero difference between demand and REF is next examined for algebraic sign to determine whether REF has to be raised or lowered in its linear approach to demand. If the difference is negative, the polarities of the temporary locations are reversed, since this indicates REF must decrease to reach demand.

Next the difference between demand and REF, which by now has been converted to a magnitude by the sign operations described above, is compared with the incremental step change computed from rate. If the difference is greater than the increment, the increment is algebraically added to REF and the algorithm exits. If the difference is less than the increment, this means that REF is within one increment of demand; therefore, the RAMP algorithm sets REF exactly equal to demand and then exits.

B024 - GT2 START BUTTON LOGIC

FUNCTIONAL DESCRIPTION

The start button logic responds to the operator pushing the start button on the gas turbine BTG board. This initiates a sequence of events which results in the starting device (a 1,600 HP induction motor) rolling the turbine, provided all analog permissives are satisfied. The start button is wired to both the analog control center and to the digital control computer. If the gas turbine is on manual control, the analog sequencer accepts the start button and initiates the excitation of the starting device if all permissive conditions are set. In this case the control computer simply ignores the start button. On the other hand, if the gas turbine is on automatic control, the analog sequencer ignores the start button while this start button logic chain in the control computer responds by setting up internal computer logical variables which result in a contact output being set in this software. This contact is wired to the sequencer, which accepts it in lieu of the start button and initiates excitation of the starting motor.

The functional diagram indicates that the start button logic is triggered by a contact input L2083 generated by the BTG board hardware circuitry when the start button is pushed. Thus, execution of this chain is on a demand basis only when L2083 changes state. The functional diagram shows that the required permissive conditons for an automatic start include the main generator breaker, the coordinated control state, and manual operation of the gas turbine fuel valve. If these permissives have the proper value the start button logic sets a contact output L2256 to start the turbine, and an internal logical variable L2966 is also set to initiate automatic control of the starting sequence.

FLOW CHART DESCRIPTION

The flow chart for the start button logic shows that the logical OR of the following permissive conditions is computed and stored in the temporary logical variable L1600:

L2083 — The start button contact input not set
L2994 — The main generator breaker closed
L2976 — The fuel valve on manual operation
L6069 — The gas turbine in coordinated control
L2966 — The automatic start state already activated If any of these conditions are true, L1600 is computed as true; an interrogation of L1600 yielding true simply exits from this control chain and the pushing of the start button is ignored by the computer.

A brief note follows on why some of the above conditions are as described. The condition on the start button contact input L2083 not being set is necessary because release of the start button by the operator changes the state of L2083 back to false and this control chain is retriggered. In this case, the open contact input state of L2083 must then be ignored. The coordinated control state L6069 being set implies that the gas turbine is to be controlled completely from the coordination BTG board rather than from the gas turbine panel, so the start button is ignored in such a situation. Finally, if the gas turbine is started automatically as indicated by L2966, pushing the start button again is redundant and thus is ignored. The cases of the main generator breaker being closed (the unit on the line) and the turbine in manual control, are clearly violations of the start button automatic control as discussed above in the functional description.

If the interrogation of L1600 indicates that none of the above conditions exists, this constitutes a valid automatic start. Then at block 50 the start contact output L2256 and the auto start state L2966 are both set true. Then the write algorithm is executed with a message argument set to 3 and an annunciator contact output argument set to L6166. The write algorithm initiates the printing of a message corresponding responding to the third entry in a table of messages, which states "gas turbine 2 automatic start" on the alarm typewriter. The algorithm also resets the contact output L6166; this results in an audible annunciator drop which alerts the operator to the fact that a message from the control computer is being printed on the alarm typewriter.

BOOD - GT2 GO HOLD LOGIC

Functional Description

The GO HOLD logic system responds to a number of conditions in the control computer system which requires evaluation of the GO and/or the HOLD states. Primary among these are bids for execution of this GO HOLD logic issued by the GO button and the HOLD button logic systems. These bids are made when the operator pushes the GO or the HOLD button and certain preliminary criteria for validity of these buttons are satisfied. Then the GO HOLD logic examines the detailed situation with respect to GO and HOLD.

Bids for evaluation of the GO HOLD logic are also made from the fuel valve auto/manual logic system, from the main generator breaker logic system, and from the coordinated control system. These bids are placed mainly to turn off both GO and HOLD when the turbine rejects to manual control, when the main generator breaker opens, and when the gas turbine is placed in coordinated control. During each of these modes of operation, the GO HOLD logic system is not in service.

The GO HOLD logic is also triggered by computed logical variables internally within the control system. These variables consist of a computed HOLD, in which case the control system has concluded that conditions in the turbine require a hold on the fuel reference; and a computed reset of both GO and HOLD, in which case the control system has moved the turbine reference to the demand and therefore has accomplished the objectives of the GO HOLD system.

To functional diagram indicates the interrelationship between the GO HOLD logic system, the GO button, the HOLD button, and the various control system chains which bid the GO HOLD logic. Also shown is the permissive condition involving the temperature control mode, during which the GO and HOLD buttons are not operative. It is only during the MW control mode, when the operator directs the turbine from the keyboard on automatic load control, that GO and HOLD are validly used.

Finally, the GO HOLD logic system executes only on demand when its trigger variables changes state, when the GO or HOLD buttons are pushed, or when turbine operating conditions are such as to require bids of the GO HOLD logic to reject both GO and HOLD due to manual, coordinated, or speed control.

FLOW CHART DESCRIPTION

The flow chart shows that logical flip-flops are kept updated for the GO and the HOLD states. The set signal for the GO flip-flop is the GO button state L2988, while the reset signal for the GO flip-flop is the logical OR of the following conditions:
L2987 — The HOLD button state
L2986 — A computed HOLD
L2976 — The gas turbine is on manual control
L2985 — A computed GO HOLD reset condition
L2994 — The main generator breaker is not closed
L6069 — The gas turbine is in coordinated control
L2130 — The temperature control mode is active Note that from this list any HOLD condition always takes precedence over a GO condition, so that HOLD has priority over GO. After the GO flip-flop is evaluated with the set and reset signals discussed above, the HOLD flip-flop is next computed. The set signal for the HOLD flip-flop is the logical OR of the HOLD button L2987 or the computed HOLD variable L2986, while the reset signal for the HOLD flip-flop is the logical OR of the following conditions:
L2136 — The GO flip-flop is set
L2976 — The turbine is on manual control
L2985 — A computed GO-HOLD reset situation exists
L2994 — The main generator breaker is not closed
L6069 — The turbine is the coordinated control mode
L2130 — The temperature control mode is active After evaluation of the HOLD flip-flop, the GO button L2988 is made logically equal to the new condition of the GO flip-flop L2136, and the HOLD button L2987 is made logically equal to the new condition of the HOLD flip-flop L2135. This is a form of latching, so that the buttons and the flip-flop states are aligned; then both the computed HOLD state L2986 and the GO HOLD reset state L2985 are reset to false, so that they may trigger the GO HOLD logic again if it becomes necessary in other parts of the computer control system.

The last thing which must be accomplished is to determine whether this execution of the GO HOLD logic system has resulted in a situation in which the keyboard has changed state and become valid or invalid. Since GO and HOLD are only operative on automatic load control, it is only necessary to check to see if the load demand button has been pushed. This is done by executing the OPCMODE algorithm for the gas turbine BTG board (Console = 2) and the load demand button (Index = 7). The algorithm returns with the status of load demand in L1600, which is then interrogated. Should L1600 be false the button has not been pushed and the control chain exits. But if L1600 is true the load demand button is in action and further checking must be done. At block 10 the new state of the GO flip-flop L2136 is queried; if it is true, the keyboard is declared invalid by setting L1600 false and executing the keyboard algorithm at block 110. The reason for declaring the keyboard invalid while the control system is in the GO state is primarily one of caution. To change the demand, which must be done from the keyboard, the operator need only push the HOLD button.

Should the interrogation of L2136 at block 10 indicate that GO is false, HOLD is checked at block 20 by examining L2135. Should HOLD be on, the keyboard algorithm is executed at block 110 with L1600 already true. This results in the keyboard being valid on load demand in the HOLD state. However if HOLD L2135 is false at block 120, the logical OR of the following conditions is checked at block 30:
L2976 — The turbine is on manual control
L6069 — The gas turbine is in coordinated control
L2994 — The main generator breaker is not closed
L2130 — The temperature control mode is active If any of these conditions exists, the GO HOLD logic exits, since the keyboard will already have been declared invalid by these other control chains. But if none of these exist, the keyboard algorithm is executed at block 110 with L1600 already true. This sets the keyboard valid on the load demand button with the gas turbine in automatic MW control.

B022 - GT2 START DEVICE OFF STATUS

FUNCTIONAL DESCRIPTION

The start device off status responds to changes in state of the start device off contact input L2084. The starting device is a 1,600 HP induction motor which starts and rolls the gas turbine from zero speed to about 900 rpm, at which point fuel ignition and flame are normally achieved. This brings the fuel valve into the acceleration pattern as the fuel ramp then continues the turbine startup at a fixed rate on the analog control center but at a scheduled speed curve in the control computer. The starting device aids in the acceleration of the turbine until a speed of approximately 2,300 rpm is reached. At this point the starting device is switched off by analog control center circuitry, and the remainder of the acceleration pattern is carried out by the fuel valve. Thus the starting device off is an important step in the overall gas turbine operating range; as such, there is a status lamp assigned to the start device off condition in the plant status array on the vertical part of the coordinated BTG board. The start device off status chain thus provides the internal software bookkeeping to drive this start device off status lamp.

The functional diagram indicates that the start device off contact input L2078 triggers execution of the start device off status chain; therefore this software executes only on demand. As the diagram shows, the start device off status lamp is the primary output of this control chain, while a secondary output is the resetting, or turning off, of the start device on status lamp.

FLOW CHART DESCRIPTION

The flow chart for the start device off status first logically equates the start device off contact output L6006 to the current state of the start device off contact input L2078. Thus the status lamp indicates the state of the contact input, which is next interrogated. If L2078 is false, indicating the starting device is not off, the chain simply exits. But if L2078 is true, at block 10 the starting device on contact output L6004 is reset to false. This turns off the start device on status lamp, thus visually indicating on the status array the startup progression of the gas turbine.

B021 - GT2 START DEVICE ON STATUS

FUNCTIONAL DESCRIPTION

The start device on status responds to changes in state of the start device on contact input L2077. The starting device is a 1,600 HP induction motor which starts and rolls the gas turbine from zero speed to about 900 rpm, at which point fuel ignition and flame normally are achieved. This brings the fuel valve into the acceleration pattern as the fuel ramp then continues the turbine startup at a fixed rate on the analog control center but at a scheduled speed curve in the control computer. The starting device is initiated by the operator pushing the start button on the gas turbine BTG board; then provided all permissives are met the analog sequencer operates relays which energize the starting motor. Thus the start device on status is an important step in the overall gas turbine operating range; as such there is a status lamp assigned to the start device on condition in the plant status array on the vertical part of the coordinated BTG board. The start device on status chain thus provides the internal software bookkeeping to drive the start device on status lamp.

The functional diagram indicates that the start device on contact input L2077 triggers execution of this start device on status chain; therefore this software executes only on demand. As the diagram shows, the start device on status lamp is the primary output of this control chain, while a secondary output is the resetting, or turning off, the hot standby status lamp.

FLOW CHART DESCRIPTION

The flow chart for the start device on status first logically equates the start device on contact output L6004 to the current state of the start device on contact input L2077. Thus the status lamp indicates the state of the contact input, which is next interrogated. If L2077 is false, indicating the starting device is not on, the chain simply exits. But if L2077 is true, at block 10 the hot standby contact input L6002 is reset to false. This turns off the hot standby status lamp, thus visually indicating on the status array the startup progress of the gas turbine.

D046 - GT2 HOLD BUTTON LOGIC

FUNCTIONAL DESCRIPTION

The HOLD button logic responds to the operator pushing the HOLD button on the gas turbine BTG board. This button is operational only during load control (the main generator breaker closed) with the gas turbine on automatic control in the MW control mode. The HOLD button holds (suspends temporarily) the turbine MW reference from moving toward the MW demand, which has been previously entered by the operator from the keyboard. In conjunction with the HOLD button the GO button allows the operator to restart the MW reference moving to demand during automatic control in the MW control mode. The rate in MW/MIN at which the reference ramps to demand is set by the operator through use of the load rate button and the keyboard. Thus with this HOLD and GO ability the operator may move the turbine generator output automatically in a jogging pattern, in a continuous raise or lower pattern, or in various combinations to suit existing circumstances. On automatic control, the computer system always adjusts the fuel valve and the inlet guide vane to produce the MW required by the reference and to keep the turbine temperatures within design limits.

The functional diagram indicates the interrelationship between the HOLD button, the GO button, and the GO HOLD logic system. When the HOLD button is pushed the BTG board hardware circuitry generates an interrupt which is received and decoded by the control computer. The software operating system identifies the interrupt and bids the HOLD button logic. Thus, this chain executes only on demand when the HOLD button is pushed. The HOLD logic then examines turbine operating conditions to determine if the HOLD button is operational. If so, appropriate additional control chains are activated to continue the processing of the HOLD button. If the turbine conditions imply that HOLD is not operational the chain simply exits.

FLOW CHART DESCRIPTION

The flow chart for the HOLD button logic evaluates the logical OR of the following permissive conditions to determine the validity of HOLD, as follows:

L2976 — The gas turbine is on manual control
L2121 — The gas turbine is in coordinated control
L2994 — The main generator breaker is not closed
L2130 — The gas turbine is in the temperature control mode The OR of these conditions is stored in the temporary logical variable L3800, which is then interrogated. If L3800 is true the HOLD button cannot be operational and the chain simply exits and ignores the button. But if L3800 is false, HOLD is tentatively operational. Therefore, at block 10 the logical variable L2987 representing the HOLD button is set true. Then a bid is placed for the GO HOLD the validity of the HOLD request. The GO HOLD logic performs the necessary bookkeeping to manipulate the GO and HOLD lamp and to handle the numerical keyboard valid or invalid state as a result of the new HOLD status.

D017 - GT2 RUN STANDBY BUTTON LOGIC

FUNCTIONAL DESCRIPTION

The run standby button logic responds to the operator pushing the run standby button on the gas turbine BTG board. This button is operational only during acceleration of the turbine, and it maintains the unit at synchronous speed (which is the definition of the run standby state for the gas turbine). Thus, pushing of the run standby button on automatic speed control, inhibits automatic synchronizing; during this time the computer speed control system maintains the turbine at synchronous speed of 3,600 rpm. When the operator wishes to synchronize the unit, he need only push the run standby button again to release the run standby state, thus enabling the automatic synchronizing mode. The run standby button does not inhibit the manual synchronizing mode, however, so the operator may manually synchronize the turbine generator from the keyboard as discussed in the manual sync logic system description, providing all permissive conditions are met.

The functional diagram indicates the interrelationship between the run standy button and other portions of the computer control system. When the button is pushed the BTG board hardware circuitry generates an interrupt, which is received and decoded by the computer. The software operating system identifies the interrupt and bids the run standby button logic, which simply inverts logically the state of the run standby button variable L2981. This results in triggering the execution of the run standby status logic system, which performs the internal computer switching required to process the run standby state if all permissive conditions are satisfied.

The functional diagram indicates a cross-coupling action between the run standby and the min load buttons. The min load button allows the turbine to be synchronized and then holds load on the unit at a minimum value (usually 4 MW). Thus min load and run standby are closely related, and are only separated by the main generator breaker. Min load holds load at a minimum after the breaker closes and the turbine is on line, while run standby holds speed at synchronous value prior to the breaker closing and the unit going on the line.

FLOW CHART DESCRIPTION

The flow chart for the run standby button is quite simple, as the variable L2981 representing the run standby button is logically inverted. The resulting change of state then produces a bid for the run standby status logic, since L2981 is a trigger for that control chain as indicated on the functional diagram. The run standby status logic then completes the processing of the run standby button request.

D035 - GT2 SPEED DEMAND DISPLAY ENTER LOGIC

FUNCTIONAL DESCRIPTION

The speed demand display enter logic responds to the operator pushing the speed demand button on the gas turbine BTG board. This button functions at all times to display the existing turbine speed reference and demand, in rpm as calculated in the computer, and to allow restricted entry of a new speed demand on automatic control in the manual synchronizing mode only. Thus when the speed demand button is pushed, this control chain presents in the left digital display windows the current rpm speed referennce, and places in the right digital display windows the current rpm speed demand. If the operator chooses to change the speed demand, and the gas turbine is in the manual sync mode, he pushes the numerical digits on the keyboard, corresponding to the desired new demand. As these keys are pushed they appear in the right display windows. When the value is keyed in the operator then pushes the enter button, which triggers execution of this control chain to check certain limiting conditions on the new demand. Should these be satisfied the new demand if accepted, and the speed reference begins moving toward this demand at a predetermined rate, adjustable under keylock control. Note that the speed reference immediately begins to adjust to the new demand after the entry is made, without the need for pushing the GO button. As described in other paragraphs, the GO and HOLD buttons are not functional in the gas turbine on speed control.

If the new value exceeds a maximum permissible speed demand, or if any errors are made during the entry process, the right display windows are immediately returned to the original and existing speed demand stored in computer memory, the cancel lamp is flashed, and the keyboard is disabled and ignored for any further entry until the error is acknowledged and the cancel button is pushed. Then a new entry procedure can be started again.

The functional diagram shows the interaction between the speed demand button, the operators console software which responds to this button and the numerical keys, and the speed demand display enter logic control chain. When the speed demand button is initially pushed the BTG board hardware circuitry generates an interrupt, which is received and decoded by the control computer. The software operating system identifies the interrupt and bids the operators console portion of the PROGEN system software. This console program identifies the speed demand button from a diode array which generates a contact input pattern as a digital display button. The console software then turns off the previous display button lamp which had been active, turns on the speed demand button lamp, and bids the speed demand display enter logic control chain. This software then sends back to the console program the identification of V2992 the speed reference and V2993 the speed demand variables, which the console system places in the left and the right digital display windows, respectively. This control chain also alerts the console program at this time to the validity, or the lack of validity, of the keyboard for the existing gas turbine conditions with respect to the speed demand button.

If the operator pushes numerical keys, and thus begins to enter a new value for the speed demand, the console program accepts this value if the keyboard has been previously been declared valid for the existing operating conditions. The values for the buttons on the numerical keyboard are placed in the right display windows as they are keyed in. When the enter button is pushed the console software again bids the speed demand display enter control chain; this time, the control software checks the validity of the new value and passes back to the console program the conclusion as to acceptance or rejection of the new value. The console system then reacts accordingly by either accepting the new demand of flashing the cancel lamp.

FLOW CHART DESCRIPTION

The flowchart for the speed demand display enter logic first executes the OPCENT algorithm to determine whether this bid is the result of an initial push of the speed demand button, and thus is a display, or is this an enter phase as a result of new values being entered on the keyboard. OPCENT answers back by setting the status argument L4999 true if it is an entry and false if it is a display. In addition OPCENT sets the newly entered value in the argument V4999 is such an entry was made. The control chain then interrogates the status argument L4999; if it is false, this means display only so at block 10 the manual sync logic variable L2973 is checked to determine if succeeding entries will be valid. If L2973 is true the logical variable L2982 is set true to enable the keyboard by the console program. Chain then transfers to block 40 to update the digital displays. If L2973 is false, at block 30 the keyboard is implied invalid by resetting L2982 to false. Then the state of the main generator breaker L2994 is queried to determine which variables are to be placed in the digital display windows. If the breaker is open (False value for L2994), this indicates speed control; therefore at block 40 the left display (Device = 3) and the right display (Display = 4) are given the value in the speed reference V2992 and in the speed demand V2993, respectively. In addition, the mnemonic "speed" is placed in the leftmost window of both displays by the argument MESSAGE = SS. The chain then transfers to block 60 for final bookkeeping to be passed on to the console program.

If the main generator breaker is closed (L2994 True) at the interrogation described above, the control chain transfers to block 50 where both digital displays (Device = 3) and (Device = 4) are given the value of 3,600, which is stored in the variable K5999, along with the "speed" mnemonic for the leftmost window of each display via the argument MESSAGE = SS. Finally at block 60 the OPCXIT algorithm is executed with argument ECHO = 0 to notify the console program to terminate this phase of the display process. The keyboard algorithm is then run for the gas turbine BTG board (Console = 2) with the status argument L2982 which was previously computed as described above to indicate the validity of the keyboard in the speed demand mode.

If the interrogation of the status argument L4999 sent back by the console program through OPCENT is true, the operator has entered a new value. Then at block 100 the DENTRY algorithm is executed to determine the validity of the new dedicated entry value for speed demand V4999. The maximum value for the speed demand exists in the argument K2993; if DENTRY finds that the new entry does not violate this maximum it sets the valid argument L2982 true; but if the new entry violates this maximum, then DENTRY sets the valid argument L2982 false.

The speed demand display enter chain then interrogates the valid argument L2982 which has just been computed by execution of the DENTRY algorithm. If L2982 is true, indicating a good new value, the OPCXIT algorithm is run at block 110 with ECHO = 1. This signifies to the console program to place the new entry into V2993 in computer memory as the new speed demand and to accept additional new entries. If the query of L2982 yields a false state, this indicates the DENTRY algorithm has concluded that the new entry has violated the maximum value K2993; therefore at block 120 the OPCXIT algorithm is run with ECH0 = 2. This signifies to the console program that the new entry is invalid, in which case the console returns the original and existing speed demand stored in computer memory to the right display windows, flashes the cancel lamp, and disables and ignores the keyboard until the cancel button is pushed to acknowledge the error.

B025 - GT2 STOP BUTTON LOGIC

FUNCTIONAL DESCRIPTION

The stop button logic responds to the operator pushing the stop button on the gas turbine BTG board. This initiates a sequence of events ulitmately resulting in stopping the turbine, provided all analog permissives are satisfied. The stop button is wired to both the analog control center and to the digital control computer. If the gas turbine is on manual control, the analog sequencer accepts the stop button and initiates the circuitry to stop the unit. In this case the control computer simply ignores the stop button. On the other hand, if the gas turbine is on automatic control, the analog sequencer ignores the stop button while this stop button logic chain in the control computer responds by setting up internal computer logical variables to ultimately stop the turbine. However, the stopping sequence on automatic control depends on the state of the turbine at the moment the stop button is pushed. Should the turbine generator be on the line, the computer first reduces load, at a rate controlled by the operator through the load rate button, to min load; then a contact output is sent to the sequencer to open the main generator breaker after which the turbine is maintained at synchronous speed for a predetermined cooling interval (usually from 2 to 5 min depending on the load level and the blade path temperatures). Finally a contact output is sent to the sequencer to stop the unit. But if the turbine is on speed control with the main generator breaker open when the stop button is pushed on automatic control, the computer immediately sends the contact output to the sequencer to stop the unit.

The functional diagram indicates that the stop button logic is triggered by a contact input L2085 generated by the BTG board hardware circuitry when the stop button is pushed. Thus execution of this control chain is on demand only when L2085 changes state. The functional diagram also shows that the required permissive conditions for an automatic stop include the main generator breaker, the coordinated control state, and manual operation of the gas turbine fuel valve. Should these permissives have the proper state the stop button logic initiates a timing chain to properly stop the unit. The exact sequence of stopping actions within the computer depends on whether the turbine is on the line or if it is in speed control with the breaker open, as described above.

FLOW CHART DESCRIPTION

The flow chart for the stop botton logic shows that the logical OR of the following conditions is computed and stored in the temporary logical variable L1600:

L2085 — The stop button contact input is not set
L2076 — The fuel valve is on manual operation
L6069 — The gas turbine is in coordinated control
L2968 — The automatic stop state is already activated Should any of these conditions be true, L1600 is computed as true. An interrogation of L1600 yielding true simply exits from this control chain; thus ignoring pushing of the stop button in the computer.

A brief note on why some of the above conditions are as described is in order. The condition on the stop button contact input L2085 not being set is necessary because release of the stop button by the operator changes the state of L2085 back to false, and thus this control chain is triggered again. In this case, obviously, the open contact input must be ignored. The coordinated control state L6069 being set implies that the gas turbine is to be coordinated completely from the coordination BTG board rather than from the gas turbine panel, so the stop button is ignored in such a situation. Finally should the gas turbine have been stopped automatically as indicated by L2968, then pushing of the stop button is redundant and thus is ignored. The case of the unit being on manual control is clearly a violation of the basic precept that the computer pays attention only when the turbine is on automatic control.

If the interrogation of L1600 indicates that none of the above conditions, exist, this constitutes a valid automatic stop. Then at block 50 the auto stop state L2968 is set true and the write algorithm is executed with a message argument set to 4 and the annunciator contact output L6166. The write algorithm then initiates the printing of a message, corresponding to the fourth entry in a table of messages, which states "gas turbine 2 automatic stop" on the alarm typewriter. The algorithm also resets the contact output L6166, which results in an audible annunciator drop. This alerts the operator to the fact that a message from the control computer is being printed on the alarm typewriter.

The stop button logic flow chart next indicates that the state of the main generator breaker L2994 is interrogated to determine whether the turbine is to be stopped immediately or whether the unit is on the line and load must first be reduced. If L2994 is closed (True) at block 60 the computer effectively pushes the min load button by setting the logical variable L2980 true. In addition the temperature control logic chain D014 and the min load logic chain B003 are bid. These result in a switch to temperature control and selection of min load as the terminal state of the automatic control system. The chain then exits at block 100.

If the interrogation of the breaker state yields a false conclusion, meaning the breaker is open, at block 70 the stop timing chain counter V2951 is immediately set to the maximum stop count K2960 (which is usually set between 2 and 5 min). This action results in the stop contact output being set in another control computer chain and the turbine will then be stopped. Finally, the auto sync logic chain B00A is bid so that automatic synchronization will be inhibited during the stop cycle. The auto sync chain BOOA in turn bids the manual sync logic system B008 so that manual synchronizing is also inhibited during the stop cycle.

B004 - GT2 RUN STANDBY STATUS LOGIC

Functional Description

The run standby status logic responds to changes of state in the run standby button logical variable L2981. When such a change occurs, normally because the operator has pushed the run standby button, the trigger action of L2981 results in execution of the run standby status logic, so that this control chain runs only on demand. This status logic then determines whether the run standby state requested by the operator can be achieved under the existing turbine conditions. Should the run standby state be active, and the operator pushes the run standby button to deactivate run standby, this request will always be satisfied. Should the run standby state be inactive, and the operator pushed the run standby button to activate run standby, the request may or may not be satisfied depending on conditions in the gas turbine control system.

The functional diagram of the run standby status logic shows the interaction between the run standby and the min load buttons and their associated status logic. The run standby button variable triggers the status logic, which then attempts to carry out the request. To activate run standby certain permissive conditions involving manual operation of the fuel valve, coordinated control, and the state of the main generator breaker must be satisfied. If this is the case then the run standby state L2124 is achieved, the min load button logical variable L2930 is reset to turn off the min load state should it have been on, and the automatic synchronizer logic chain B00A is bid to disable auto sync during run standby. To deactivate run standby, the status logic simply resets a logical flip-flop regardless of permissive conditions, thus always responding properly to an operator request to turn off run standby.

FLOW CHART DESCRIPTION

The flow chart for the run standby status logic indicates that a logical flip-flop is evaluated to determine the new status of run standby. The set signal for the flip-flop is the run standby button L2981 while the reset signal for the flip-flop is the logical OR of the following four turbine variables:

L2981 — Run standby button not set
L2994 — Main generator breaker closed
L6069 — The gas turbine is in the coordinated control mode
L2976 — The gas turbine is on manual control If any of these conditions exist the computer does not accept the run standby state. The evaluation of the flip-flop yields the logical variable L2124, which is a contact output lighting the lamp behind the run standby button. If the flip-flop is set the run standby lamp and state are active, while a reset flip-flop yields an inactive or off run standby state and lamp.

The control chain then equates the run standby button L2981, to the flip-flop L2124; this is to align the button with the flip-flop, and is a form of latching. Next the auto sync control chain B00A is bid so that is may compute its new conditions as a result of this run standby button operation.

The last thing that is necessary to accomplish is to check whether this operation on run standby is to affect the min load button and state. This is done by interrogating the run standby flip-flop L2124; if it is false, meaning the system has just rejected run standby, the control chain simply exits. But if L2124 is true, this means that run standby has been enabled. Then it is necessary to reset both the min load button L2980 and the min load state L2125; this is done at block 10 prior to exit.

D011 - GT2 AUTO BUTTON LOGIC

FUNCTIONAL DESCRIPTION

The auto button logic responds to the operator pushing the auto button on the gas turbine BTG board. If the fuel valve computer control system is ready for automatic control, this button transfers the NHC card from manual to automatic operation bumplessly. The auto button is wired to both the analog control center and to the control computer, and it is the analog system in conjunction with the NHC card which actually transfer the fuel valve to automatic control, if the ready state is set. In this situation the computer ignores the auto button.

However, the auto button input to the computer is necessary in another operating configuration concerning the gas turbine. This involves the case where the gas turbine has been placed in coordinated control from the coordination BTG board. Then at some future time, it may be necessary to reject the turbine from coordinated control. This can now be done easily from the coordinated BTG board, but there will be cases where the operator chooses to return to automatic from coordinated control directy at the gas turbine BTG board. It is in this situation that the auto button must come directly into the control computer, so that the rejection from coordinated control may be carried out properly.

The functional diagram indicates that the auto button generates an interrupt from the BTG board hardware circuitry. This is detected, scanned, and identified by the computer interrupt system, which then causes the software operating system to execute a bid of this auto button logic chain. This control system then takes the proper action of initiating a reject to automatic control from coordinated control, if the gas turbine had been in coordinated control.

FLOW CHART DESCRPTION

The flow chart shows that the coordination state L6069 for the gas turbine is first interrogated; if it is not true the chain exits and ignores the auto button. But if the gas turbine had been in coordinated control, then at block 10 the coordinated auto select button L6072 and the coordinated auto button L6995 logical variables are set true. This effectively does within the computer what the operator would do at the coordination BTG board were he to reject the gas turbine from coordinated control at that panel. Then this chain bids the coordinated control logic system 901F to carry out the mechanics of returning to automatic control on the gas turbine.

B023 - GT2 HOT STANDBY STATUS

FUNCTIONAL DESCRIPTION

The hot standby status responds to changes in state of the hot standby contact input L2081. The hot standby level of the gas turbine represents the last pre-start condition necessary before the turbine can be rolled. Hot standby is a permissive required by the analog control center, which must be satisfied before the start button on the gas turbine BTG board will be accepted for acceleration of the turbine. Thus hot standby is one of the important states of the gas turbine overall operating range, and as such there is a status lamp assigned to the hot standby condition, in the plant status array on the vertical part of the coordinated control BTG board. The hot standby status chain thus provides the internal software bookkeeping to drive this hot standby status lamp.

The functional diagram indicates that the hot standby contact input L2081 triggers execution of the hot standby status chain. Therefore this software executes only on demand. As the diagram shows, the hot standby status lamp is the primary output of the control chain.

FLOW CHART DESCRIPTION

The flow chart for the hot standby status is quite simple, since the chain logically equates the hot standby status contact output L6002 to the current state of the hot standby contact input L2081. Thus, the status lamp simply indicates the state of the contact.

B00C - GT2 FLAME LOGIC

FUNCTIONAL DESCRIPTION

The flame logic responds to changes in state of the flame contact input L2079. When this flame contact closes, it is an indication of successful ignition, and therefore the computer control system speed demand and various acceleration logical variables must be set to proper values by the flame logic. This then initiates the acceleration of the gas turbine, according to a speed profile stored in computer memory. The automatic speed control system continually positions the fuel valve to achieve the scheduled startup function, by using speed feedback and a proportional-plus-reset controller. On the other hand, when the flame contact input L2079 opens, this indicates loss of ignition and therefore requires stopping the gas turbine by the flame logic. This is accomplished by clearing the speed demand and reference to 0, and resetting the automatic acceleration states. These result in closing of the fuel valve and deceleration of the turbine until it stops.

The functional diagram shows that the flame contact input L2079 triggers execution of this control chain, so that the software runs only on demand. The diagram also shows that the 4X start relay contact input L2082 acts as a permissive to proper execution of the flame logic. Thus 4X must be closed before flame software activates the control computer system.

FLOW CHART DESCRIPTION

The flame logic first equates the flame on lamp L6005 on the plant status array to the current state of the flame contact input L2079. Then the flame contact is interrogated for its new state; should L2079 be false, indicating loss of flame and required stopping of the turbine, at block 100 the speed demand V2993 and the speed reference V2992 are set to 0, and the automatic accelerating state L2967 is reset to false.

If the interrogation of flame contact L2079 yields a true or closed result, the state of the 4X start relay L2082 is checked as a permissive to flame actuation. If L2082 is open this indicates a false flame initiation, in which case the turbine speed demand V2993 and speed reference V2992 are cleared to 0 and the automatic acceleration variables are reset to false at block 100 as described immediately above.

Under all normal situations however, the 4X start relay contact L2082 will be closed when flame occurs, thus indicating successful ignition and startup. Then the flame logic will execute at block 20 the inverse algorithm with existing turbine speed V2987 as input and acceleration time V2952 as output. This algorithm enters the speed profile curve stored in array K2850 on the speed axis with the existing speed, and computes the corresponding time in seconds. Then subsequent control system software increments this acceleration time each second and computes the scheduled speed from the same curve, thus generating the desired speed reference.

After this computation, the flame logic sets the gas turbine speed demand V2993 to 3,600 rpm, which is the targeted synchronous speed for the acceleration. An interrogation of the manual state of the fuel valve L2976 is made next. If this logical variable is false, indicating automatic control of the fuel valve, then the automatic acceleration state L2976 is set true for use by aditional control computer software. If L2967 is true, indicating manual control of the turbine fuel valve, then the flame logic simply exits.

B00F - GT2 4X RELAY LOGIC

FUNCTIONAL DESCRIPTION

The 4X relay logic responds to changes in state of the 4X start relay contact input L2082. When this contact input closes, the gas turbine is starting and therefore the computer speed reference and demand, and all speed controller quantities, are initialized to 0. This keeps the fuel valve closed, and these values stay at 0 until the starting motor rolls the turbine to approximately 900 rpm, at which time ignition and flame are normally achieved. When the 4X relay contact input opens, the gas turbine is being stopped, and therefore the speed reference and demand, and all speed controller quantities, are again reset tO 0 to keep the fuel valve closed. In addition, start and stop timers are cleared tO 0, logical states representing auto start and auto stop are reset, and the main generator breaker logic chain is bid so that various breaker status variables may be aligned to the new state of the turbine.

The functional diagram of the 4X relay logic shows that the 4X contact input L2082 triggers execution of this control chain, so that it runs only on demand. The diagram also shows that the 4X logic bids the breaker logic chain B00E, thus indicating the linking mechanism between these two closely related logical functions.

FLOW CHART DESCRIPTION

The 4X relay logic first interrogates the state of the 4X contact input L2082 as a result of its change in state which has triggered this control chain. If L2082 is false, the turbine is to be stopped; consequently all logical and real computer variables which may have been previously set to run the gas turbine must now be reset. This includes the stop counter V2951 and the auto start timer V6980, both of which may or may not have been active prior to loss of 4X, since it is not possible to predict when and under what circumstances L2082 will open. Therefore, this software sets both to 0 to be certain they will have the correct value. Similarly, logical variables representing a computer contact output to stop the turbine L2260, an auto stop logical state L2968, and an auto start state L2966, are all reset to the false condition. Again, these may or may not have been set, but they are all reset to place them in the proper state for L2082 open. Then a bid is placed for the main generator breaker logic chain B00E, so that additional logic variables may be aligned to the new turbine status.

If the 4X contact input L2082 is closed and the interrogation indicates that L2082 is true at the beginning of this chain, the software transfers to block 20. Here V numbers representing the turbine speed reference V2992, the speed demand V2993, the speed controller last input V2953, and the speed controller integral output V2954, are all initialized to 0. Note that this is done whether 4X opened or closed. For the case of 4X opening, these values of 0 keep the fuel valve closed on automatic control while the turbine is stopped. For the case of 4X closed, these values guarantee that the fuel valve will remain closed until ignition and flame are achieved.

INDEX OF VARIABLES FOR DRAWINGS

Figure 8:
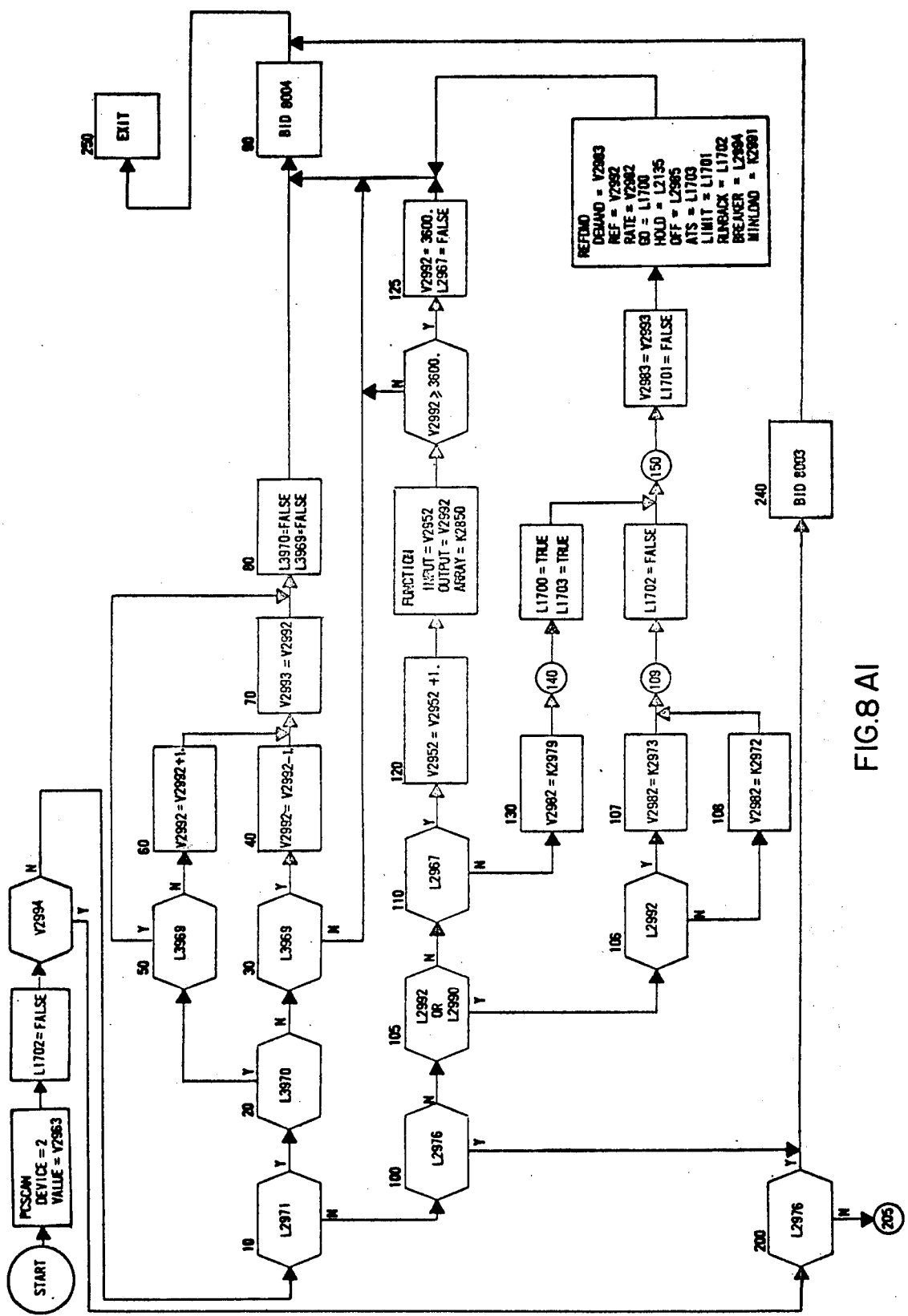
FIGS. 8A–8E show various flow charts for the digital controls and certain algorithms employed in the controls.
Figure 8B:
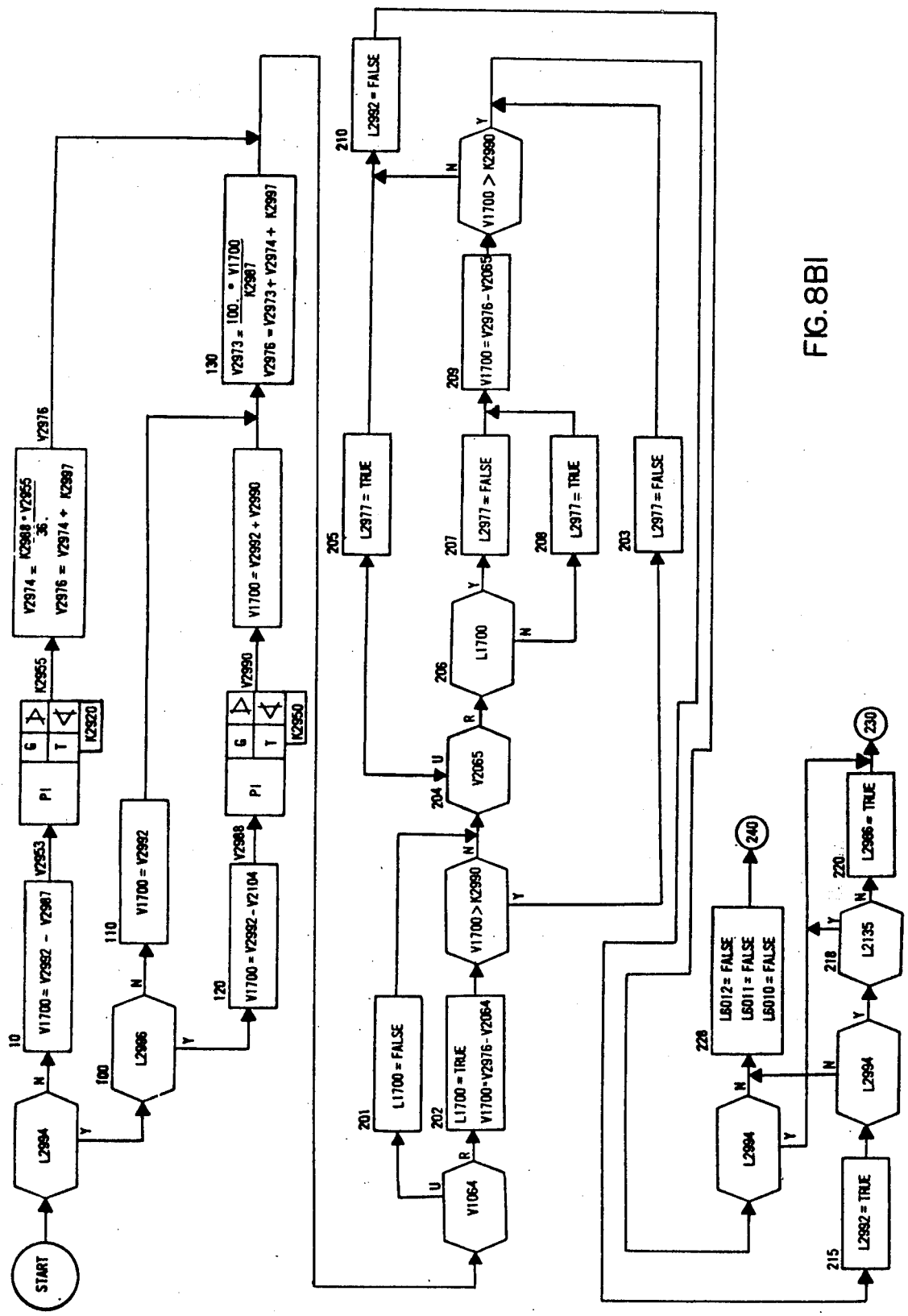
Figure 8C:
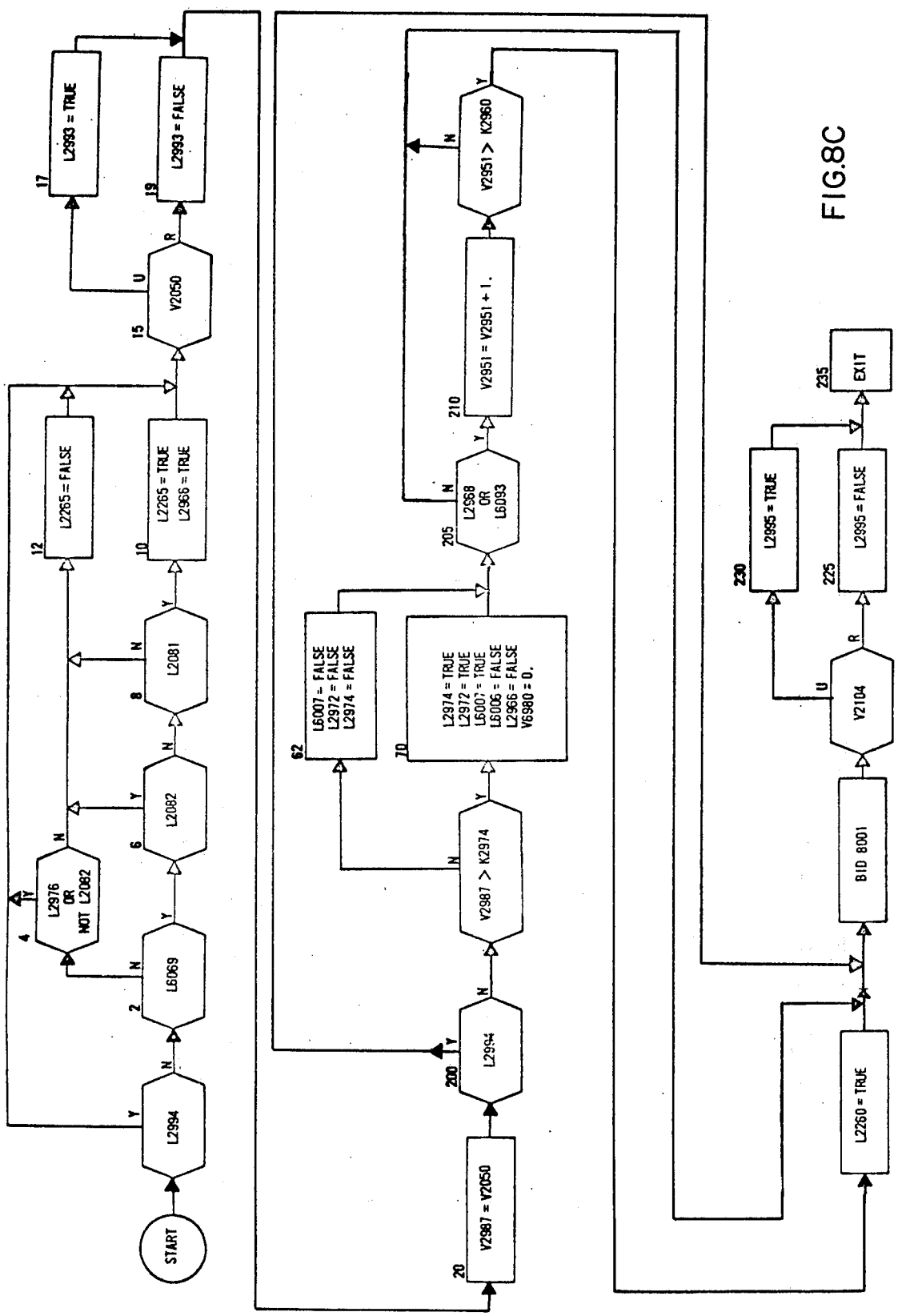
Figure 8D:
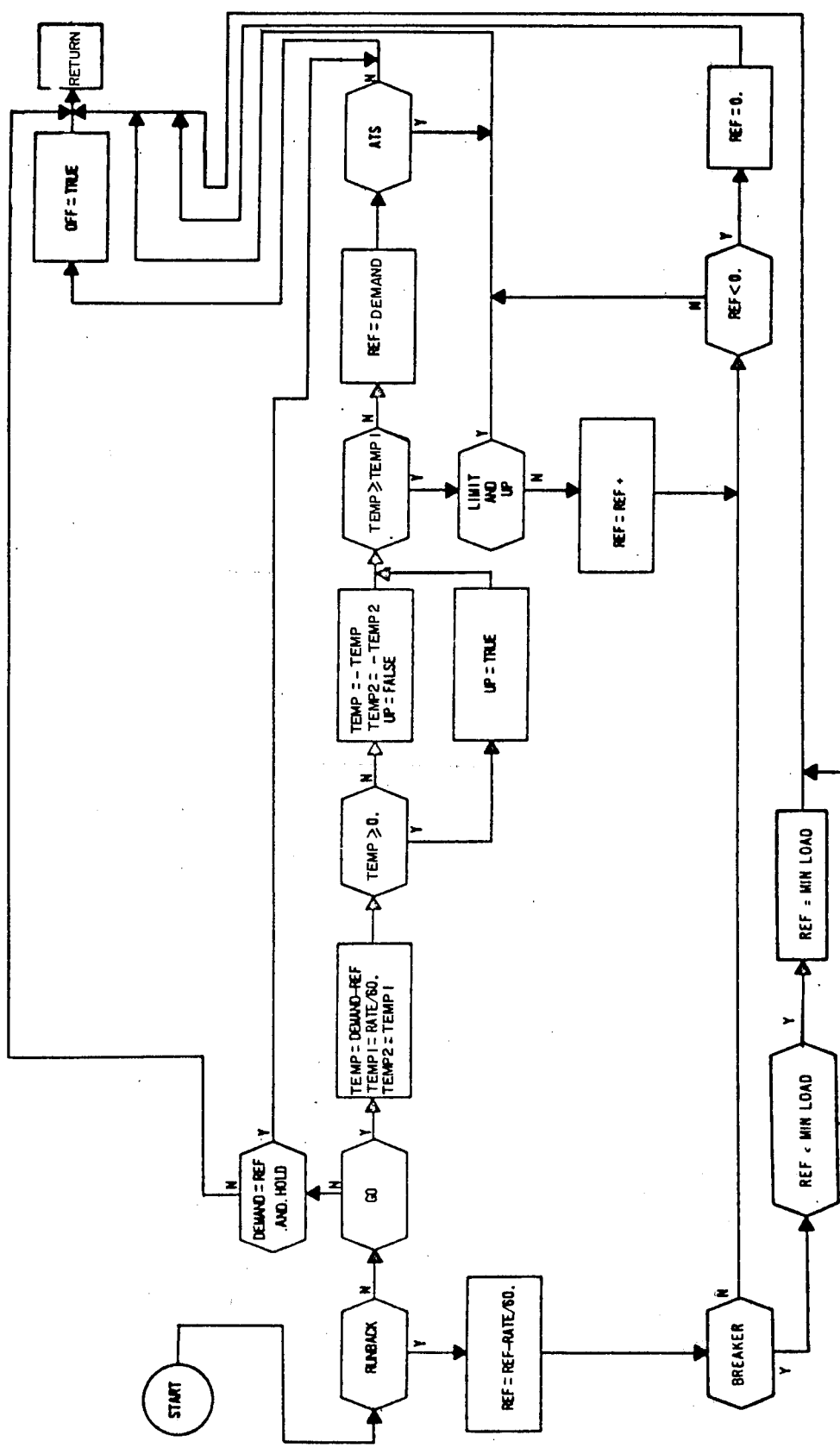
Figure 8F:
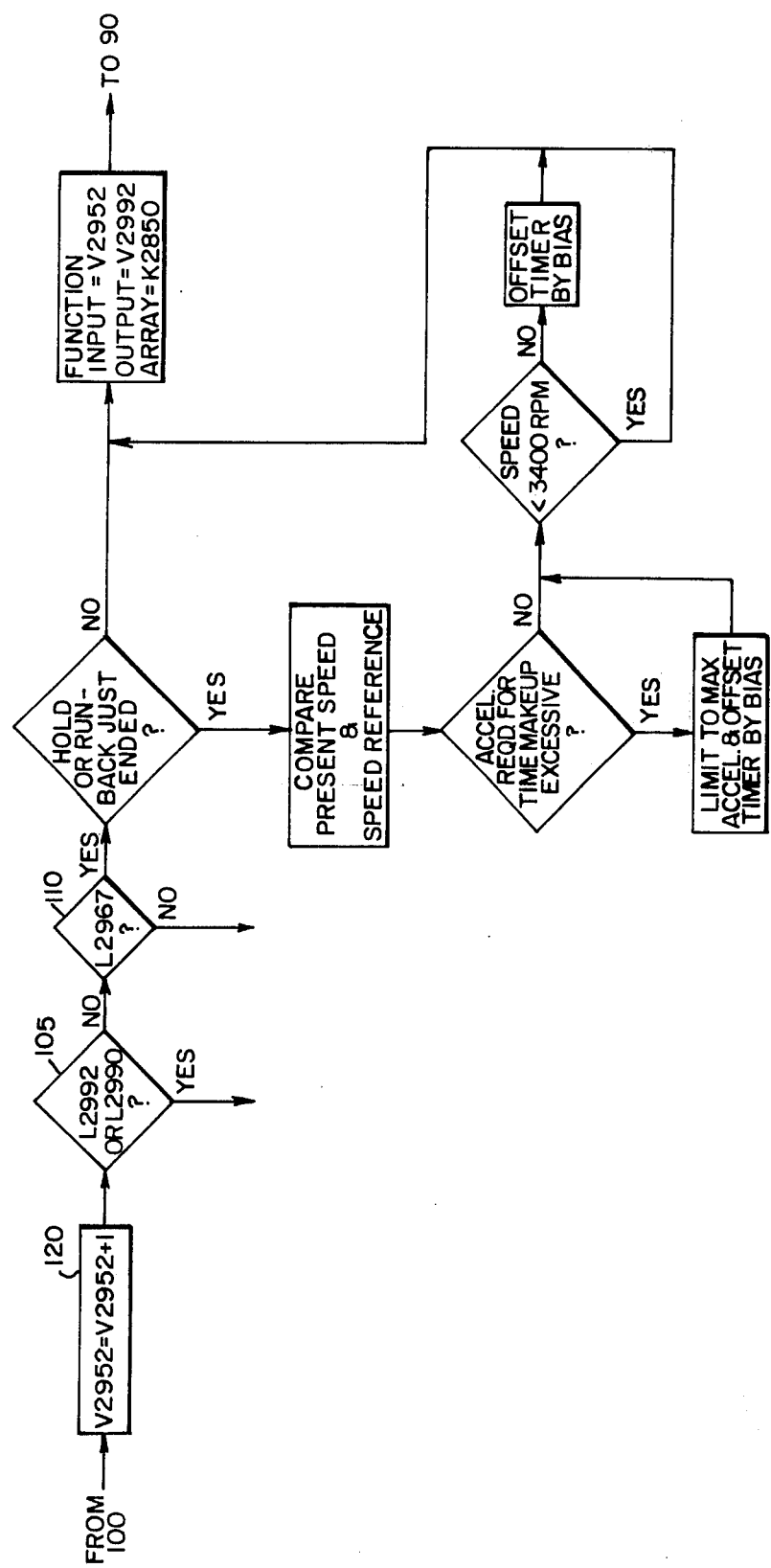

| INDEX OF VARIABLES FOR DRAWINGS | |
|---|---|
| FIG. 8A1 | |
| V2994 | OPERATOR LOAD RATE |
| V2993 | OPERATOR LOAD DEMAND |
| V2992 | REFERENCE |
| V2983 | DEMAND |
| V2982 | RATE |
| V2979 | COORDINATED DEMAND |
| V2978 | COORDINATED RATE |
| V2933 | FUEL VALVE NHC CARD POSITION |
| V2952 | ACCELERATION TIME |
| L2994 | BREAKER FLIPFLOP |
| L3970 | AUTO SYNC RAISE |
| L3969 | AUTO SYNC LOWER |
| L2976 | MANUAL FUEL VALVE |
| L2971 | AUTO SYNC MODE |
| L2121 | COORD LAMP |
| L2136 | GO LAMP |
| L2135 | HOLD LAMP |
| L2985 | COMPUTED GO/HOLD RESET |
| L2992 | SURGE/SPEED RUNBACK |
| L2990 | BPT RUNBACK |
| L2130 | TEMP CONTROL BUTTON/LAMP |
| L5056 | TEMP CHANGE ABOVE 7.5 Cl |
| L2967 | AUTO START |
| L2968 | AUTO STOP |
| L2261 | OPEN MAIN GEN. BREAKER CO |
| L6093 | NORMAL STOP LAMP |
| K2994 | MAXIMUM LOAD RATE |
| K2995 | SURGE/SPEED LOAD RUNBACK RATE |
| K2975 | BPT LOAD RUNBACK RATE |
| K2973 | SURGE/SPEED SPEED RUNBACK RATE |
| K2972 | BPT SPEED RUNBACK RATE |
| K2991 | MINIMUM LOAD |
| K2979 | MANUAL SYNC ACC RATE |
| K2850 | ACCELERATION CURVE ARRAY |
| 8003 | TRACK MANUAL |
| 8004 | SPEED/LOAD CONTROL |

| FIG. 8A2 | |
|---|---|
| V2994 | OPERATOR LOAD RATE |
| V2993 | OPERATOR LOAD DEMAND |
| V2992 | REFERENCE |
| V2983 | DEMAND |

-continued

| | | |
|---|---|---|
| V2982 | RATE | |
| V2979 | COORDINATED DEMAND | |
| V2978 | COORDINATED RATE | |
| V2963 | FUEL VALVE NHC CARD POSITION | |
| V2952 | ACCELERATION TIME | |
| L2994 | BREAKER FLIPFLOP | |
| L3970 | AUTO SYNC RAISE | |
| L3978 | AUTO SYNC LOWER | |
| L2976 | MANUAL FUEL VALVE | |
| L2971 | AUTO SYNC MODE | |
| L2121 | COORD LAMP | |
| L2136 | GO LAMP | |
| L2135 | HOLD LAMP | |
| L2985 | COMPUTED GO/HOLD RESET | |
| L2992 | SURGE/SPEED RUNBACK | |
| L2990 | BPT RUNBACK | |
| L2130 | TEMP. CONTROL BUTTON/LAMP | |
| L5056 | TEMP. CHANGE ABOVE 7.5 C1 | |
| L2967 | AUTO START | |
| L2968 | AUTO STOP | |
| L2261 | OPEN MAIN GEN. BREAKER C0 | |
| L6093 | NORMAL STOP LAMP | |
| K2994 | MAXIMUM LOAD RATE | |
| K2995 | SURGE/SPEED LOAD RUNBACK RATE | |
| K2975 | BPT LOAD RUNBACK RATE | |
| K2973 | SURGE/SPEED SPEED RUNBACK RATE | |
| K2972 | BPT SPEED RUNBACK RATE | |
| K2991 | MINIMUM LOAD | |
| K2979 | MANUAL SYNC ACC RATE | |
| K2850 | ACCELERATION CURVE ARRAY | |
| 8003 | TRACK MANUAL | |
| 8004 | SPEED/LOAD CONTROL | |

FIG. 8B1

| | | |
|---|---|---|
| V2992 | REFERENCE | |
| V2990 | MW CONTROLLER TOTAL OUTPUT | |
| V2974 | SPEED FUEL REFERENCE | |
| V2104 | GENERATOR MW | |
| V2973 | LOAD FUEL REFERENCE | |
| V2976 | FUEL VALVE SET POINT | |
| V2988 | MW CONTROLLER LAST INPUT | |
| V2989 | MW CONTROLLER INTEGRAL OUTPUT | |
| V2065 | SPEED CONTROLLER OUTPUT | |
| V2064 | SURGE CONTROLLER OUTPUT | |
| V2987 | SELECTED SPEED | |
| V2955 | SPEED CONTROLLER TOTAL OUTPUT | |
| V2954 | SPEED CONTROLLER INTEGRAL OUTPUT | |
| V2953 | SPEED CONTROLLER LAST INPUT | |
| L2994 | BREAKER FLIPFLOP | |
| L2996 | MW FLIPFLOP | |
| L2992 | SURGE/SPEED RUNBACK | |
| L2986 | COMPUTED HOLD | |
| L2135 | HOLD LAMP | |
| L6010 | MIN LOAD LAMP | |
| L6011 | BASE LAMP | |
| L6012 | PEAK LAMP | |
| L2977 | ANALOG SURGE/SPEED UNRELIABLE | |
| K2988 | OUTPUT RANGING GAIN-SPEED | |
| K2987 | OUTPUT RANGING GAIN-LOAD | |
| K2950 | MW CONTROLLER ARRAY | |
| K2990 | SURGE/SPEED RUNBACK DEADBAND | |
| K2991 | MINIMUM LOAD | |
| K2920 | SPEED CONTROLLER ARRAY | |
| K2964 | BASE MW | |
| K2997 | INITIAL FUEL VALVE POSITION | |
| 8002 | READY/OUTPUT | |

FIG. 8B2

| | | |
|---|---|---|
| V2992 | REFERENCE | |
| V2990 | MW CONTROLLER TOTAL OUTPUT | |
| V2974 | SPEED FUEL REFERENCE | |
| V2104 | GENERATOR MW | |
| V2973 | LOAD FUEL REFERENCE | |
| V2976 | FUEL VALVE SET POINT | |
| V2988 | MW CONTROLLER LAST INPUT | |
| V2989 | MW CONTROLLER INTEGRAL OUTPUT | |
| V2065 | SPEED CONTROLLER OUTPUT | |
| V2064 | SURGE CONTROLLER OUTPUT | |
| V2987 | SELECTED SPEED | |
| V2955 | SPEED CONTROLLER TOTAL OUTPUT | |
| V2954 | SPEED CONTROLLER INTEGRAL OUTPUT | |
| V2953 | SPEED CONTROLLER LAST INPUT | |

-continued

| | | |
|---|---|---|
| L2994 | BREAKER FLIPFLOP | |
| L2996 | MW FLIPFLOP | |
| L2992 | SURGE/SPEED RUNBACK | |
| L2986 | COMPUTED HOLD | |
| L2135 | HOLD LAMP | |
| L6010 | MIN LOAD LAMP | |
| L6011 | BASE LAMP | |
| L6012 | PEAK LAMP | |
| L2977 | ANALOG SURGE/SPEED UNRELIABLE | |
| K2988 | OUTPUT RANGING GAIN-SPEED | |
| K2987 | OUTPUT RANGING GAIN-LOAD | |
| K2950 | MW CONTROLLER ARRAY | |
| K2990 | SURGE/SPEED RUNBACK DEADBAND | |
| K2991 | MINIMUM LOAD | |
| K2920 | SPEED CONTROLLER ARRAY | |
| K2964 | BASE MW | |
| K2997 | INITIAL FUEL VALVE POSITION | |
| 8002 | READY/OUTPUT | |

FIG. 8C

| | | |
|---|---|---|
| V2050 | SPEED | |
| V2987 | SELECTED SPEED | |
| V2951 | STOP COUNTER | |
| V6980 | START TIMER | |
| V2104 | GENERATOR MW | |
| L2994 | BREAKER FLIPFLOP | |
| L2972 | REQUEST FOR AUTO SYNC | |
| L6007 | SYNC SPEED LAMP | |
| L2974 | REQUEST FOR MANUAL SYNC | |
| L6008 | START DEV OFF LAMP | |
| L6089 | COORD LAMP | |
| L2082 | MASTER 4X RELAY C1 | |
| L2081 | HOT STANDBY C1 | |
| L2256 | START C0 | |
| L2966 | AUTO START | |
| L2976 | MANUAL FUEL VALVE | |
| L2260 | STOP C0 | |
| L2968 | AUTO STOP | |
| L6093 | NORMAL STOP LAMP | |
| L2993 | SPEED UNRELIABLE | |
| L2995 | MW UNRELIABLE | |
| K2974 | SYNC SPEED | |
| K2960 | MAX. STOP COUNT | |
| 8001 | (BP-EXHAUST) TEMPERATURE CONTROL | |

FIG. 9A2

| | | |
|---|---|---|
| L2083 | START BUTTON C1 | |
| L2994 | BREAKER FLIPFLOP | |
| L2976 | MANUAL FUEL VALVE | |
| L6069 | COORD LAMP | |
| L2256 | START C0 | |
| L2966 | AUTO START | |
| L6166 | CONTROL MESSAGE ANN. C0 | |
| 3 | GT2 AUTOMATIC START | |

FIG. 9B2

| | | |
|---|---|---|
| L2988 | GO BUTTON PUSHED | |
| L2987 | HOLD BUTTON PUSHED | |
| L2986 | COMPUTED HOLD | |
| L2985 | COMPUTED GO-HOLD RESET | |
| L2136 | GO LAMP | |
| L2135 | HOLD LAMP | |
| L2976 | MANUAL FUEL VALVE | |
| L2994 | BREAKER FLIPFLOP | |
| L2121 | COORD LAMP | |
| L2130 | TEMP CONTROL BUTTON/LAMP | |

FIG. 9C2

| | | |
|---|---|---|
| L2078 | START DEVICE OFF C1 | |
| L6006 | START DEV OFF LAMP | |
| L6004 | START DEV ON LAMP | |

| FIG. 9D2 | |
|---|---|
| L2077 | START DEVICE ON Cl |
| L6004 | START DEV ON LAMP |
| L6002 | HOT STANDBY LAMP |

| FIG. 9E2 | |
|---|---|
| L2987 | HOLD BUTTON PUSHED |
| L2976 | MANUAL FUEL VALVE |
| L2121 | COORD LAMP |
| L2994 | BREAKER FLIPFLOP |
| L2130 | TEMP CONTROL BUTTON/LAMP |
| B00D | GO/HOLD LOGIC |

| FIG. 9F2 | |
|---|---|
| L2981 | RUN STANDBY BUTTON PUSHED |

| FIG. 9G2 | |
|---|---|
| V4999 | KEYBOARD ENTERED VALUE |
| V2993 | OPERATOR LOAD DEMAND |
| V2992 | REFERENCE |
| L4999 | NEW VALUE ENTERED |
| L2982 | KEYBOARD VALID |
| L2973 | MANUAL SYNC MODE |
| L2994 | BREAKER FLIPFLOP |
| K2993 | MAXIMUM SPEED DEMAND |
| K5999 | RATED SPEED=3600. |
| SS | SPEED |

| FIG. 9I2 | |
|---|---|
| L2981 | RUN STANDBY BUTTON PUSHED |
| L2994 | BREAKER FLIPFLOP |
| L2121 | COORD LAMP |
| L2976 | MANUAL FUEL VALVE |
| L2125 | MIN LOAD LAMP |
| L2124 | RUN STANDBY LAMP |
| L2980 | MIN LOAD BUTTON PUSHED |
| B00A | AUTO SYNC LOGIC |

| FIG. 9L2 | |
|---|---|
| V2993 | OPERATOR LOAD DEMAND |
| V2992 | REFERENCE |
| V2987 | SELECTED SPEED |
| V2952 | ACCELERATION TIME |
| L2082 | MASTER 4X RELAY Cl |
| L2079 | FLAME Cl |
| L6005 | FLAME ON LAMP |
| L2967 | AUTO START |
| K2850 | ACCELERATION CURVE ARRAY |

| FIG. 9M2 | |
|---|---|
| V2992 | REFERENCE |
| V2993 | OPERATOR LOAD DEMAND |
| V2951 | STOP COUNTER |
| V2953 | SPEED CONTROLLER LAST INPUT |
| V2954 | SPEED CONTROLLER INTEGRAL OUTPUT |
| V6980 | AUTO START TIMER |
| L2082 | MASTER 4X RELAY Cl |
| L2260 | STOP CO |
| L2968 | AUTO STOP |
| L2966 | AUTO START |
| B00E | BREAKER LOGIC |

| FIG. 9K2 | |
|---|---|
| L4081 | HOT STANDBY Cl |
| L6002 | HOT STANDBY LAMP |

| FIG. 9H2 | |
|---|---|
| V2951 | STOP COUNTER |
| L2085 | STOP BUTTON Cl |
| L2976 | MANUAL FUEL VALVE |
| L6069 | COORD LAMP |
| L2968 | AUTO STOP |
| L2994 | BREAKER FLIPFLOP |
| L2980 | MIN LOAD BUTTON PUSHED |
| L6166 | CONTROL MESSAGE ANN. CO |
| K2960 | MAX STOP COUNT |
| D014 | TEMP CONTROL BUTTON |
| B003 | MIN LOAD LOGIC |
| B00A | AUTO SYNC LOGIC |
| 4 | GT2 AUTOMATIC STOP |

What is claimed is:

1. A gas turbine electric power plant comprising a compressor section and a turbine section, a plurality of combustors for energizing the driving gas flow for the turbine section, means for generating electric power under the driving power of the turbine, a gas turbine control system including means for controlling the flow of fuel to the turbine combustors, means for generating a representation of gas turbine speed, means for generating a gas turbine speed reference so that the reference increases from a first predetermined value substantially to the synchronous value normally in a substantially fixed period of time during turbine startup, means for generating a speed error output representing the difference between the speed reference and the actual turbine speed, and means for generating a fuel control signal in response at least to the integral of the speed error so that the actual turbine speed normally increases from the first speed value to the synchronous value in the fixed time period.

2. A gas turbine electric power plant as set forth in claim 1 wherein the first speed value is the actual turbine speed existing at a preselected point in time during the ignition period.

3. A gas turbine electric power plant as set forth in claim 2 wherein the preselected time period is substantially the time at which a flame on condition is detected.

4. A gas turbine electric power plant as set forth in claim 1 wherein said speed reference generating means includes means for generating a speed versus time function which includes at least two connected straight line segments with the second segment having a lower slope than the first segment and starting at a point in time just prior to gas turbine bleed valve opening and continuing to the synchronous speed time point.

5. A gas turbine electric power plant as set forth in claim 4 wherein the generated function includes at least three connected straight line segments with the third segment having a lower slope than the second segment and starting at a point in time just prior to gas turbine bleed valve opening and continuing to the synchronous speed time point, and with the second segment having a lower slope than the first segment.

6. A gas turbine electric power plant as set forth in claim 1 wherein said fuel control signal generating means includes an integral plus proportional controller which generates a fuel control output in response to the speed error.

7. A gas turbine electric power plant as set forth in claim 3 wherein said fuel control signal generating means includes an integral plus proportional controller which generates a fuel control output in response to the speed error.

8. A gas turbine electric power plant as set forth in claim 4 wherein said fuel control signal generating means includes an integral plus proportional controller which generates a fuel control output in response to the speed error.

9. A gas turbine electric power plant as set forth in claim 1 wherein said gas turbine control system includes a digital computer and said computer system includes said speed reference generating means and said speed error generating means, and said fuel control signal generating means.

10. A gas turbine electric power plant as set forth in claim 9 wherein said speed reference generating means includes means for generating a speed versus time function which includes at least two connected straight line segments with the second segment having a lower slope than the first segment and starting at a point in time just prior to gas turbine bleed valve opening and continuing to the synchronous speed time point.

11. A gas turbine electric power plant as set forth in claim 10 wherein the generated function includes at least three connected straight line segments with the third segment having a lower slope than the second segment and starting at a point in time just prior to gas turbine bleed valve opening and continuing to the synchronous speed time point, and with the second segment having a lower slope than the first segment.

12. A gas turbine electric power plant as set forth in claim 10 wherein said fuel control signal generating means includes an integral plus proportional controller which generates a fuel control output in response to the speed error.

13. A gas turbine electric power plant as set forth in claim 9 wherein said computer system includes means for generating a representation of a desired load level during the turbine load mode, said fuel control signal generating means additionally responding to said load representation generating means.

14. A gas turbine electric power plant as set forth in claim 9 wherein an analog circuit is provided for generating a backup startup fuel control signal, means for coupling said analog startup circuit to said fuel controlling means, and means for controlling whether said analog startup circuit or said digital computer operates said controlling means.

15. A gas turbine electric power plant as set forth in claim 9 wherein means are provided for limiting the fuel control signal to limit the gas turbine blade path or exhaust temperature.

16. A combined cycle electric power plant comprising at least one gas turbine, means for generating steam in response to heat energy from said gas turbine, a steam turbine driven by steam supplied to it from said steam generating means, means for generating electric power under the driving power of said turbines, means for controlling the operation of said turbines and said steam generating means, said controlling means including a gas turbine control system having means for controlling the flow of fuel to said gas turbine, means for generating a representation of gas turbine speed, means for generating a gas turbine speed reference so that the reference increases from a first predetermined value substantially to the synchronous value normally in a substantially fixed period of time during turbine startup, means for generating a speed error output representing the difference between speed reference and the actual turbine speed, and means for generating a fuel control signal at least in response to the integral of the speed error so that the actual turbine speed normally increases from the first speed value to the synchronous value in the fixed time period.

17. A combined cycle electric power plant as set forth in claim 16 wherein said speed reference generating means includes means for generating a speed versus time function which includes at least two connected straight line segments with the second segment having a lower slope than the first segment and starting at a point in time just prior to gas turbine bleed valve opening and continuing to the synchronous speed time point.

18. A combined cycle electric power plant as set forth in claim 16 wherein said fuel control signal generating means includes an integral plus proportional controller which generates a fuel control output in response to the speed error.

19. a combined cycle electric power plant as set forth in claim 18 wherein the first speed value is the actual turbine speed existing at a preselected point in time during the ignition period.

20. A combined cycle electric power plant as set forth in claim 17 wherein said gas turbine control system includes a digital computer and said computer system includes said speed reference generating means and said speed error generating means and said fuel control signal generating means.

21. A combined cycle electric power plant as set forth in claim 20 wherein said fuel control signal generating means includes an integral plus proportional controller which generates a fuel control output in response to the speed error.

22. A control system for an electric power plant gas turbine comprising means for controlling the flow of fuel to the gas turbine, means for generating a representation of gas turbine speed, means for generating a gas turbine speed reference so that the reference increases from a first predetermined value substantially to the synchronous value normally in a subtantially fixed period of time during turbine startup, means for generating a speed error output representing the difference between speed reference and the actual turbine speed, and means for generating a fuel control signal in response to the speed error so that the actual turbine speed normally increases from the first speed value to the synchronous value in the fixed time period.

23. A control system as set forth in claim 22 wherein said speed reference generating means includes means for generating speed versus time function which includes at least two connected straight line segments with the second segment having a lower slope than the first segment and starting at a point in time just prior to gas turbine bleed valve opening and continuing to the synchronous speed time point.

24. A control system as set forth in claim 23 wherein the generated function includes at least three connected straight line segments with the third segment having a lower slope than the second segment and starting at a point in time just prior to gas turbine bleed valve opening and continuing to the synchronous speed time point, and with the second segment having a lower slope than the first segment.

25. A control system as set forth in claim 22 wherein said fuel control signal generating means includes an integral plus proportional controller which generates a fuel control output in response to the speed error.

26. A control system as set forth in claim 23 wherein said fuel control signal generating means includes an integral plus proportional controller which generates a fuel control output in response to the speed error.

27. A control system as set forth in claim 22 wherein said gas turbine control system includes a digital computer and said computer system includes said speed reference generating means and said speed error generating means, and said fuel control signal generating means.

28. A control system as set forth in claim 27 wherein said speed reference generating means includes means for generating a speed versus time function which includes at least two connected straight line segments with the second segment having a lower slope than the first segment and starting at a point in time just prior to gas turbine bleed valve opening and continuing to the synchronous speed time point.

29. A control system as set forth in claim 28 wherein said fuel control signal generating means includes an integral plus proportional controller which generates a fuel control output in response to the speed error.

30. A control system as set forth in claim 27 wherein means are provided for holding or running back the speed reference applied to said speed controller under predetermined conditions and means are provided for generating the speed reference at a faster than normal rate once the hold or runback has been released.

* * * * *